(12) United States Patent
Brusberg et al.

(10) Patent No.: US 10,782,474 B2
(45) Date of Patent: Sep. 22, 2020

(54) DETACHABLE OPTICAL CONNECTORS FOR OPTICAL CHIPS COMPRISING A CONNECTOR SUPPORT AND METHODS OF FABRICATING THE SAME

(71) Applicant: CORNING RESEARCH & DEVELOPMENT CORPORATION, Corning, NY (US)

(72) Inventors: Lars Martin Otfried Brusberg, Corning, NY (US); Douglas Llewellyn Butler, Painted Post, NY (US); Michael de Jong, Colleyville, TX (US); Alan Frank Evans, Beaver Dams, NY (US); Andreas Matiss, Berlin (DE); James Scott Sutherland, Corning, NY (US)

(73) Assignee: Corning Research & Development Corporation, Corning, NY (US)

( * ) Notice: Subject to any disclaimer, the term of this patent is extended or adjusted under 35 U.S.C. 154(b) by 0 days.

(21) Appl. No.: 16/197,845

(22) Filed: Nov. 21, 2018

(65) Prior Publication Data

US 2019/0094460 A1    Mar. 28, 2019

Related U.S. Application Data

(63) Continuation-in-part of application No. PCT/US2018/022091, filed on Mar. 13, 2018.
(Continued)

(51) Int. Cl.
*G02B 6/26* (2006.01)
*G02B 6/36* (2006.01)
(Continued)

(52) U.S. Cl.
CPC ............. *G02B 6/122* (2013.01); *G02B 6/136* (2013.01); *G02B 6/30* (2013.01); *G02B 6/3885* (2013.01);
(Continued)

(58) Field of Classification Search
CPC ........ G02B 6/122; G02B 6/30; G02B 6/3885; G02B 6/4292; G02B 6/403; G02B 6/136; G02B 6/421; G02B 6/3893; G02B 6/3883
(Continued)

(56) References Cited

U.S. PATENT DOCUMENTS 6,767,141 B1   7/2004   Dudek et al.
7,366,380 B1   4/2008   Peterson et al.
(Continued)

FOREIGN PATENT DOCUMENTS

JP   2004347811 A   12/2004
WO   1997034176 A1   9/1997

OTHER PUBLICATIONS

Brusberg et al; "Optical Couplers for Evanescent Coupling of Polymer Clad Fibers to Optical Waveguides Using Alignment Features"; U.S. Appl. No. 15/844,622, filed Jan. 31, 2018; 89 pages.
(Continued)

*Primary Examiner* — Kaveh C Kianni
*Assistant Examiner* — Hung Q Lam
(74) *Attorney, Agent, or Firm* — Grant A. Gildehaus

(57) ABSTRACT

Detachable optical connectors including a connector support for optical chips and methods of their fabrication are disclosed. In one embodiment, an optical assembly includes an optical chip including a surface, an edge extending from the surface, and at least one chip waveguide proximate the surface and terminating at the edge. The optical assembly further includes a waveguide support having a chip coupling surface, and at least one waveguide disposed within the
(Continued)

waveguide support and terminating at the chip coupling surface, wherein the chip coupling surface is coupled to the edge of the optical chip such that the at least one waveguide within the waveguide support is optically coupled to the at least one chip waveguide of the optical chip. The optical assembly further includes a connector support having a first portion coupled to the optical chip, and a second portion coupled to the waveguide support.

20 Claims, 40 Drawing Sheets

Related U.S. Application Data

(60) Provisional application No. 62/472,025, filed on Mar. 16, 2017.

(51) Int. Cl.
*G02B 6/122* (2006.01)
*G02B 6/42* (2006.01)
*G02B 6/38* (2006.01)
*G02B 6/30* (2006.01)
*G02B 6/136* (2006.01)
*G02B 6/40* (2006.01)

(52) U.S. Cl.
CPC ........ *G02B 6/403* (2013.01); *G02B 6/4292* (2013.01); *G02B 6/3883* (2013.01); *G02B 6/3893* (2013.01); *G02B 6/421* (2013.01)

(58) Field of Classification Search
USPC .................. 385/14, 15, 49–51, 129–132
See application file for complete search history.

(56) References Cited

U.S. PATENT DOCUMENTS

| | | |
|---|---|---|
| 9,261,656 B2 | 2/2016 | Qi et al. |
| 9,389,362 B1 | 7/2016 | Brunschwiler et al. |
| 9,477,055 B1 | 10/2016 | Lin |
| 2004/0175079 A1* | 9/2004 | Goto .................. G02B 6/3636 385/92 |
| 2005/0018993 A1 | 1/2005 | Rolston et al. |
| 2006/0002665 A1 | 1/2006 | Kiani et al. |
| 2006/0291782 A1* | 12/2006 | Carpenter ............. G02B 6/30 385/49 |
| 2008/0298743 A1 | 12/2008 | Saravanos et al. |
| 2014/0105612 A1 | 4/2014 | Wu et al. |
| 2015/0037044 A1 | 2/2015 | Peterson et al. |
| 2015/0166395 A1 | 6/2015 | Marjanovic et al. |
| 2016/0004021 A1 | 1/2016 | Pelletier et al. |
| 2016/0062066 A1 | 3/2016 | Lee et al. |
| 2016/0116695 A1 | 4/2016 | Nekado et al. |
| 2017/0205583 A1 | 7/2017 | Bennett et al. |

OTHER PUBLICATIONS

International Search Report and Written Opinion of the International Searching Authority; PCT/US2018/022091; dated Jun. 22, 2018; 11 Pages; European Patent Office.

* cited by examiner

DETACHABLE OPTICAL CONNECTORS FOR OPTICAL CHIPS COMPRISING A CONNECTOR SUPPORT AND METHODS OF FABRICATING THE SAME

PRIORITY

This application is a continuation-in-part of PCT/US18/22091 filed on Mar. 13, 2018, which claims the benefit of priority under 35 § 119 of U.S. Provisional Application Ser. No. 62/472,025 filed on Mar. 16, 2017, the contents of which are relied upon and incorporated herein by reference in their entirety.

BACKGROUND

The present disclosure generally relates to optical communication and, more particularly, to optical connectors for connecting optical fibers to waveguides of an optical chip and methods of their manufacture.

Benefits of optical fiber include extremely high bandwidth and low loss operation. Because of these advantages, optical fiber is increasingly being used for a variety of applications, including, but not limited to, broadband voice, video, and data transmission. Connectors are often used in data center and telecommunication systems to provide service connections to rack-mounted equipment and to provide inter-rack connections. Accordingly, optical connectors are employed in both optical cable assemblies and electronic devices to provide an optical-to-optical connection wherein optical signals are passed between an optical cable assembly and an electronic device. Optical connectors may also provide optical-to-electrical connections and vice-versa.

In silicon-based photonic devices, such as hybrid-silicon lasers and silicon optical modulators, optical signals are propagated through an optical chip within optical waveguides. In some photonic devices, the laser signals exit the device through a side facet such that the laser signal does not turn prior to being emitted. The alignment of the waveguides at the side facet to optical fibers requires an expensive and time consuming active alignment process. Such active alignment processes add significant costs, and severely reduces throughput. Further, present methods permanently affix the optical fibers to the optical chip. Because standard coatings of optical fibers cannot withstand elevated temperatures of a solder reflow process utilized to fabricate optical communication module, the optical fibers must be attached to the optical chip after the final assembly of the optical communication module is completed. Therefore, the optical communications module cannot be tested until after the time consuming and expensive process of aligning and bonding the optical fibers to the waveguides of the optical chip.

Accordingly, alternative detachable optical connections for optically coupling optical fibers to optical chips are desired.

SUMMARY

Embodiments of the present disclosure are directed to optical connectors that provide for detachable optical connections at an optical chip, such as a passive light wave circuit or an active optical chip providing active optical components such as laser diodes, modulators, multiplexers, and/or photodiodes. Embodiments provide an optical connector receptacle at an optical chip that allows for repeatable mating and demating of a plug connector at the optical chip. Embodiments may further include a connector support to improve mechanical characteristics between an optical connector and the optical chip.

In this regard, in one embodiment, an optical assembly includes an optical chip including a surface, an edge extending from the surface, and at least one chip waveguide proximate the surface and terminating at the edge. The optical assembly further includes a waveguide support having a chip coupling surface, and at least one waveguide disposed within the waveguide support and terminating at the chip coupling surface, wherein the chip coupling surface is coupled to the edge of the optical chip such that the at least one waveguide within the waveguide support is optically coupled to the at least one chip waveguide of the optical chip. The optical assembly further includes a connector support having a first portion coupled to the optical chip, and a second portion coupled to the waveguide support.

In another embodiment, an optical assembly includes an optical chip, an optical connector and a connector support. The optical chip includes a surface, an edge, and at least one chip waveguide proximate the surface and terminating at the edge. The optical connector includes a ferrule having a first surface and a second surface, at least one bore extending from the first surface, a first alignment pin and a second alignment pin extending from the second surface of the ferrule, a waveguide support at the second surface of the ferrule, the waveguide support having a chip coupling surface, and at least one waveguide disposed within the at least one bore of the ferrule and within the waveguide support such that a first end of the at least one waveguide is exposed at the first surface of the ferrule and a second end of the at least one waveguide is exposed at the chip coupling surface of the waveguide support. The chip coupling surface of the waveguide support is coupled to the edge of the optical chip such that the at least one waveguide is optically coupled to the at least one chip waveguide. The first alignment pin and the second alignment pin extend over the surface of the optical chip. The connector support is coupled to the surface of the optical chip, the first alignment pin, and the second alignment pin.

In yet another embodiment, an optical assembly includes an optical connector including a ferrule having a first surface, a second surface and a cavity between the first surface and the second surface, wherein the cavity is open at the second surface, and at least one bore extending from the first surface to the cavity. The optical connector further includes a first alignment pin and a second alignment pin extending from the second surface of the ferrule, and a waveguide support coupled to the second surface of the ferrule. The waveguide support includes a groove portion having at least one optical fiber groove, a first alignment pin groove, and a second alignment pin groove, a fiber support portion coupled to the groove portion, and an alignment pin support portion. The fiber support portion is between the groove portion and the fiber support portion. The first alignment pin is disposed within the first alignment pin groove, the second alignment pin is disposed within the second alignment pin groove, and the first alignment pin and the second alignment pin are disposed between the groove portion and the alignment pin support portion. At least one optical fiber is disposed within the at least one bore of the ferrule, the cavity, and the waveguide support such that the at least one optical fiber is disposed within the at least one optical fiber groove and between the groove portion and the fiber support portion. A first end of the at least one optical fiber is exposed at the first surface of the ferrule and a second end of the at least one optical fiber is exposed at a chip coupling surface of the waveguide support.

It is to be understood that both the foregoing general description and the following detailed description are merely exemplary, and are intended to provide an overview or framework to understanding the nature and character of the claims. The accompanying drawings are included to provide a further understanding, and are incorporated in and constitute a part of this specification. The drawings illustrate embodiments, and together with the description serve to explain principles and operation of the various embodiments.

DETAILED DESCRIPTION

Embodiments described herein are directed to optical connectors that provide for detachable optical connections at an optical chip, such as a passive light wave circuit or an active optical chip providing active optical components such as laser diodes and/or photodiodes. As used herein, the term "optical chip" means any component having optical waveguides. Embodiments provide an optical connector receptacle at an optical chip that allows for repeatable mating and demating of a plug connector at the optical chip. Because of this detachable optical connection, the optical assembly that includes the optical chip may be tested prior to final assembly and thus prior to any solder reflow processes. After testing the optical chip and/or optical assembly with the plug connector connected to the receptacle optical connector, subsequent solder reflow or other bonding processes may be performed. Following the final assembly of the optical assembly, the plug optical connector may be re-connected to the receptacle optical connector.

In the embodiments described herein, the optical connector may be permanently bonded to a surface of the optical chip. The optical connector includes one or more waveguides within a ferrule that are aligned to one or more chip waveguides of the optical chip. The coefficient of thermal expansion (CTE) mismatch at higher operation temperatures up to 80° C. between conventional polymer based mechanical transfer (MT) ferrules and glass or silicon of an optical chip may misalign the waveguides at the interface area dependent on temperature. Such misalignment may add additional coupling loss. Embodiments of the present disclosure addresses CTE mismatch between a polymer based MT ferrule and glass or silicon material by incorporating a glass component into the ferrule. The CTE of the glass is matched to the CTE of silicon to avoid misalignment due to CTE mismatch. Additionally, some embodiments of the present disclosure utilize a connector support coupled to the optical chip and the glass component to maintain a robust mechanical connection between the optical chip and the MT ferrule that minimizes optical losses due to CTE mismatch (e.g., due to elevated temperatures of a solder reflow process) or mechanical coupling and decoupling between the MT ferrule and the optical chip.

Various embodiments of optical connectors and method of their manufacture are described in detail below.

Figure 1A:
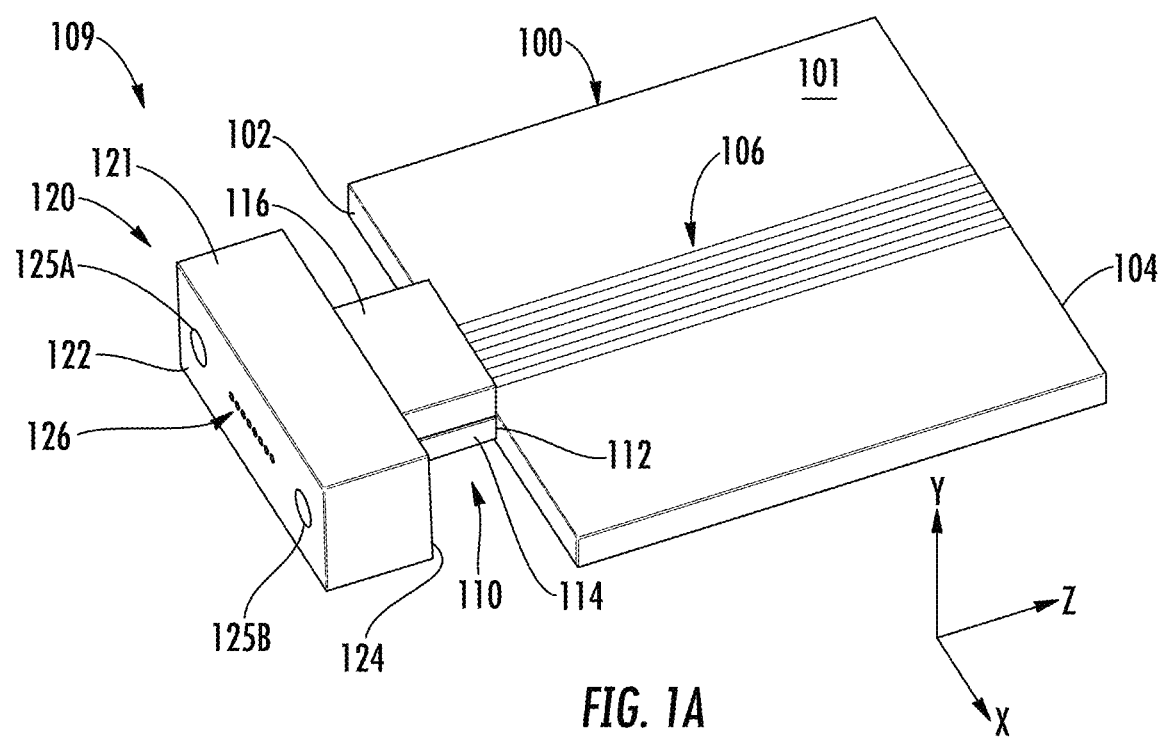
FIG. 1A schematically depicts a perspective view of an example optical assembly including an optical connector and an optical chip according to one or more embodiments described and illustrated herein.
Figure 1B:
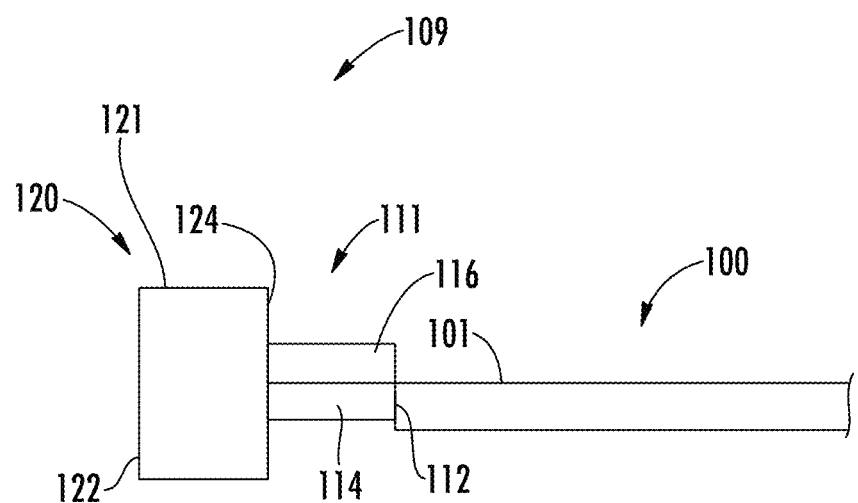
FIG. 1B schematically depicts a side view of the example optical assembly depicted in FIG. 1A according to one or more embodiments described and illustrated herein.

Referring now to FIGS. 1A and 1B, an example optical assembly for use in optical communications applications is schematically depicted. FIG. 1A schematically depicts a perspective view of the example optical assembly, while FIG. 1B schematically depicts a side view of the example optical assembly depicted in FIG. 1A. Generally, the optical assembly comprises an optical chip 100 and an optical connector 109 coupled to an edge 102 of the optical chip 100. The optical chip 100 may be further mounted on a base substrate (not shown), such as a circuit board, for example. In some embodiments, the base substrate may be configured as a daughter board operable to be coupled to a motherboard or, in other embodiments, the base substrate may be configured as a motherboard.

As an example and not a limitation, the optical chip 100 may be configured as an optical communications component capable of passing optical signals. In a non-limiting example, the optical chip 100 may be a photonic integrated circuit (PIC) including integrated active components (e.g., lasers) or a planar lightwave circuit. As shown in FIG. 1A, the optical chip 100 has one or more chip waveguides 106 proximate a surface 101 that terminate at least one edge 102. The one or more chip waveguides 106 are optical waveguides capable of guiding optical signals propagating therein. In the example shown in FIG. 1A, the one or more chip waveguides 106 extend from a first edge 102 to a second edge 104. In one example, the second edge 104 is coupled to an additional active optical chip (not shown) that includes one or more active optical components (not shown) capable of transmitting (e.g., using laser diodes) and/or receiving (e.g., using photodetectors) optical signals. In such embodiments, optical signals are passed between the one or more chip waveguides 106 and the active optical components of the active optical chip. In other embodiments, the active optical components are provided directly on the optical chip 100 without the use of an additional active optical chip (e.g., the optical chip 100 is configured as a PIC). It should be understood that the optical assembly may further include additional drive circuitry (not shown) to control the active optical components to effectuate the conversion of optical signals into electrical signals and vice-versa.

The optical chip 100 may be fabricated from any material capable of having optical waveguides disposed thereon or therein. As non-limiting examples, the optical chip 100 may be fabricated from a glass-based material (e.g., glass, glass-ceramic, and fused silica) or a semiconductor material (e.g., silicon). The chip waveguides may be configured as any known or yet-to-be-developed optical waveguides. Non-limiting example optical waveguides include thin-film deposition, photolithographic masking and etching processes, laser written waveguides, ion-exchanged waveguides, among others. It should be understood that the one or chip waveguides 106 may be suitably configured for the operations of the optical chip 100 and are merely schematically depicted in a straight-line configuration.

In the example depicted in FIGS. 1A and 1B, the optical chip 100 comprises eight chip waveguides 106 proximate an upper surface 101 that terminate at the edge 102. Any number of chip waveguides 106 may be provided. Each waveguide may be configured to send and/or receive optical signals to/from active optical components. In one example, the optical signals may be wavelength-multiplexed, e.g., each chip waveguide 106 may propagate optical signals at, without limitation, four wavelengths.

The example optical assembly depicted in FIGS. 1A and 1B comprises an optical connector 109 operable to optically couple optical fibers from a mated optical connector to the chip waveguides 106. As used herein, the term "optically coupled" means that that optical signals may pass between two components. In the example depicted in FIGS. 1A and 1B, the optical connector 109 is configured to receive and cooperate with a mated plug optical connector, thereby making an optical connection with the optical chip 100. In the illustrated example, the optical connector 109 comprises a ferrule 120 having a ferrule body 121, a first surface 122, and a second surface 124. The example optical connector 109 further comprises a waveguide support 110 coupled to the ferrule 120. In some embodiments, the waveguide support 110 extends from the second surface 124 of the ferrule 120. The waveguide support 110 may comprise a chip coupling surface 112 for cooperating with the optical chip 100 for optical coupling. Ferrule body 121 may also comprise one or more alignment bores 125A, 125B for aligning and mating a complementary optical connector thereto.

Figure 2:
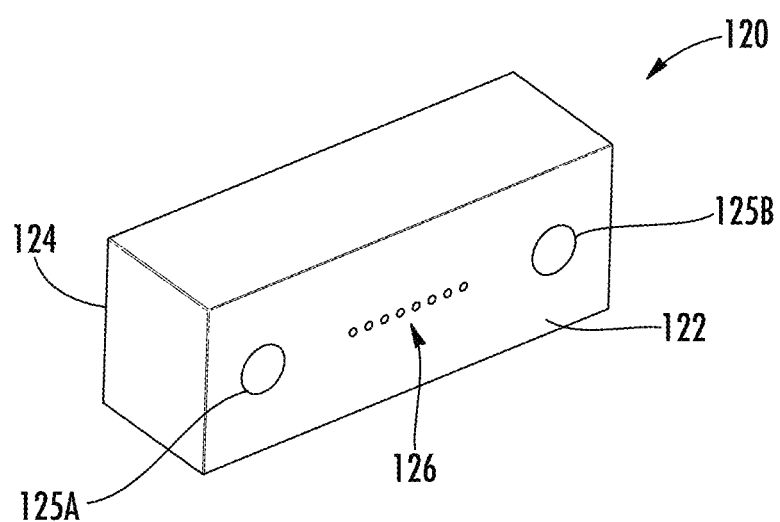
FIG. 2 schematically depicts a front perspective view of an example ferrule of an example optical connector according to one or more embodiments described and illustrated herein.
Figure 3:
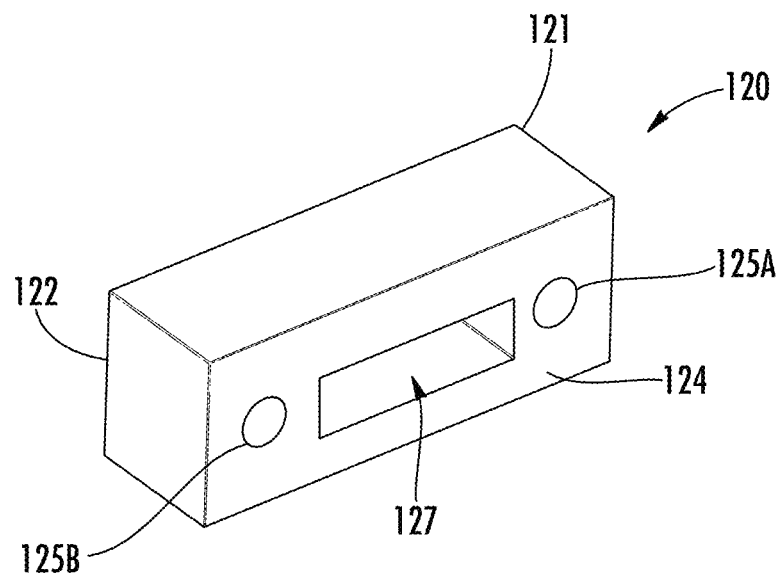
FIG. 3 schematically depicts a rear perspective view of the example ferrule depicted in FIG. 2 in an unassembled state according to one or more embodiments described and illustrated herein.
Figure 4:
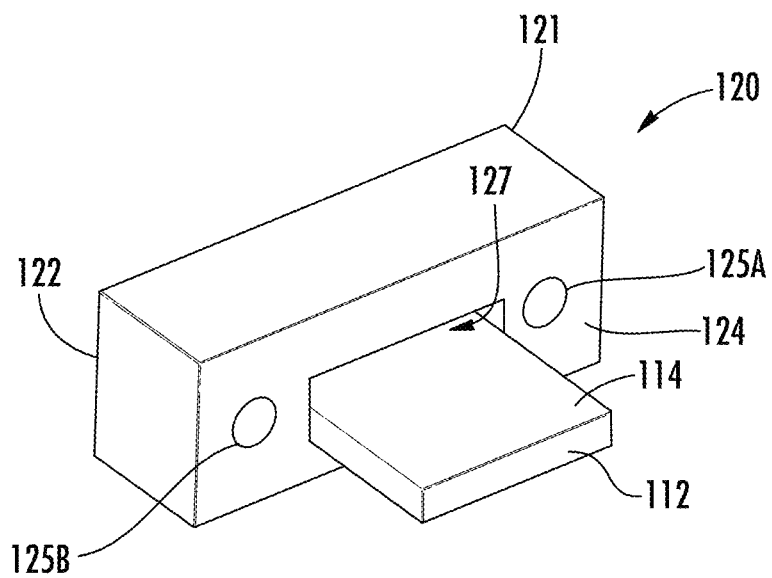
FIG. 4 schematically depicts a rear perspective view of the example ferrule depicted in FIG. 2 with a support portion of a waveguide support according to one or more embodiments described and illustrated herein.
Figure 5:
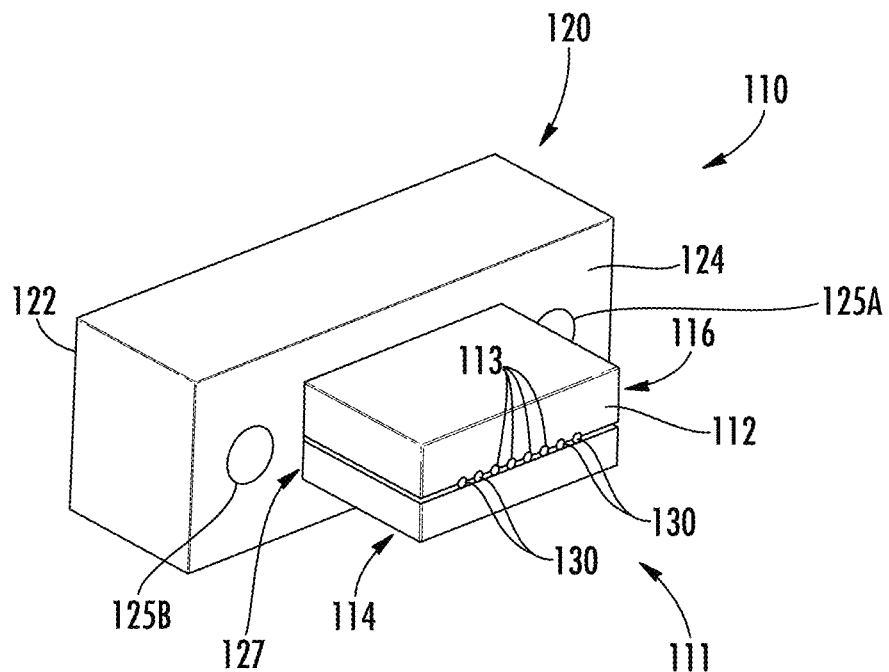
FIG. 5 schematically depicts a rear perspective view of the optical connector depicted in FIGS. 1A and 1B according to one or more embodiments described and illustrated herein.
Figure 6:
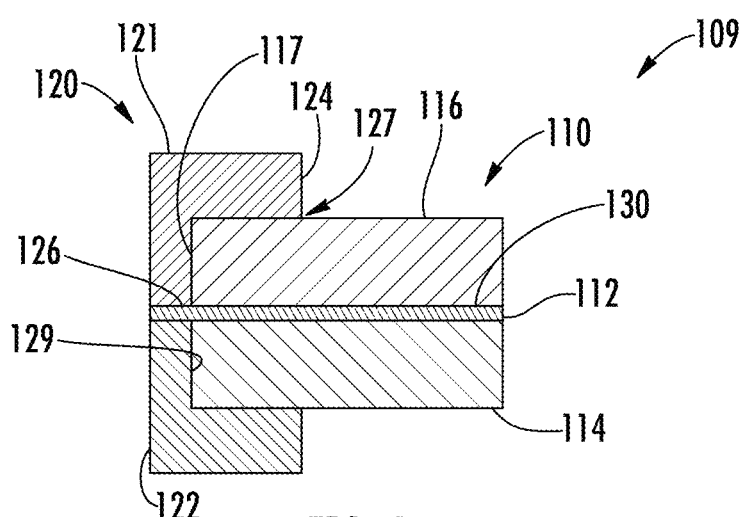
FIG. 6 schematically depicts a cross sectional view of the optical connector depicted in FIGS. 1A and 1B according to one or more embodiments described and illustrated herein.

FIGS. 2-6 schematically illustrate additional related views of the optical connector 109 depicted in FIGS. 1A and 1B. FIG. 2 is a front perspective of the example ferrule 120 in an unassembled state, and FIG. 3 is a rear perspective view of the example ferrule 120 in an unassembled state. FIG. 4 is a rear perspective view of the example ferrule 120 in a partially assembled state, while FIG. 5 is a rear perspective view of the example ferrule 120 in an assembled state. FIG. 6 is a cross sectional view of the ferrule 120 in an assembled state.

Ferrule 120 may have any suitable configuration with an opening 127 disposed at the second surface 124 for receiving and securing a portion of at least one waveguide support 110 such as depicted in FIG. 4. The waveguide support 110 aligns the optical waveguides with the ferrule 120 and comprises a chip coupling surface 112 for cooperating with the optical chip 100. Further, the CTE characteristics of the at least one waveguide support 110 or ferrule 120 may be selected to match the materials of the optical chip 100 within a suitable range. By way of explanation, if the optical chip 100 comprises a silicon material having a CTE of 2.6 parts per million per degree Celsius, then the material of the waveguide support 110 or ferrule 120 may be matched within a predetermined range of the optical chip 100. By way of example, the waveguide support may have a CTE such as 2.6±0.5 parts per million per degree Celsius, but other ranges for the CTE are possible as well. Further, the materials may be selected such that the waveguide support material has a CTE with a closer match to the optical chip material CTE than the ferrule material CTE match. The waveguide support material may have a closer CTE match since it has a chip coupling surface that abuts the optical chip material. Further, it may be desirable to use different materials for the waveguide support and the ferrule such as a glass or ceramic material for the waveguide support and a polymer for the ferrule. However, any suitable materials may be selected for the waveguide support or the ferrule as desired.

Referring generally to FIGS. 1A, 1B and 2-6, the example ferrule 120 is configured as a multifiber ferrule such as a MT type ferrule. It should be understood that although example ferrule 120 is configured as a multi-fiber ferrule, the ferrule 120 may be configured to maintain any number of optical waveguides (i.e., one or more), such as optical fibers as described in more detail below. As such, embodiments are not limited to MT-type ferrules. Design parameters may include low insertion force to prevent damage or misalignment of the optical fiber-optical chip junction, receptacle materials capable of solder reflow temperatures, size and mechanical robustness scaled to the end application, and thermal stability.

In embodiments, the ferrule 120 is fabricated from a material having a CTE that is similar to the CTE of the optical chip such that positions of the waveguides 130 disposed within the ferrule 120 and the waveguide support 110 do not shift during the fabrication process (e.g., during the application of heat for a solder reflow process) or during operable of the optical assembly (e.g., heat caused by the operation of active optical components such as laser diodes and photodetectors. As non-limiting examples, the ferrule 120 may be fabricated from a glass material, a ceramic material, a glass-ceramic material, a metal material, or a glass-filled polymer material.

The example ferrule 120 includes a first alignment bore 125A and a second alignment bore 125B operable to receive first and second alignment pins, respectively, of a mated optical connector (not shown). As described in more detail below, the alignment bores and the alignment pins may provide alignment between the waveguides 130 of the optical connector 109 and the chip waveguides 106 of the optical chip 100. It should be understood that the optical connector 109 may include the first and second alignment pins, or each of the optical connector 109 and the mated optical connector may comprise one alignment bore and one alignment pin. In yet other embodiments, the optical connector 109 does not include an alignment pin(s) or an alignment bore(s).

The ferrule 120 further includes at least one bore 126 extending from the first surface 122 into the ferrule body 121. The example ferrule 120 depicted in FIGS. 1A, 1B, and 2-6 comprises a plurality of bores 126 such as eight bores operable to receive eight waveguides 130. However, any suitable number of bores 126 and waveguides 130 may be provided. The one or more bores 126 and the first and second alignment bores 125A, 125B may be formed within the ferrule by any known or yet-to-be developed process. As a non-limiting example, the one or more bores 126 may be formed within a glass ferrule 120 by a laser-damage-and-etch process in which an ultrafast pulsed laser damages the glass material at the desired location of a through-hole. The damaged region(s) of the glass material etch at a significantly faster rate than the non-damaged region(s). Thus, with selective etching, precision through-holes may be created within the glass material.

Any laser-damage-and-etch process may be utilized to fabricate the bores 126 within the ferrule 120 comprising a glass material or any other suitable ferrule material. In one non-limiting process, a short-pulse laser in combination with line focus optics is used to drill a pilot hole or laser damage region, completely through the body of the glass with each laser pulse. The line focus optics creates a focal line that is equal to or greater than the thickness of the ferrule 120. An advantage of this process is that each laser pulse fully forms a pilot hole or laser damage region. Thus, the time to make a pilot hole or laser damage region is extremely short (e.g., approximately, 10 psec with a single pulse, for example, or approximately hundreds of nanoseconds even with a complete burst pulse). The ferrule 120 may then be exposed to an etching solution, such as a hydrofluoric acid-based etching solution, to preferentially etch the pilot hole or damage line within the glass faceplate, thereby forming a glass fiber through-hole having the desired diameter. More detail regarding example laser line focus and etching processes is provided in U.S. Pat. Publ. No. 2015/0166395, which is hereby incorporated by reference in its entirety. Of course, other methods for forming the bores 126 in the ferrule 120 are possible such as molding.

The bores 126 may have any suitable diameter depending on the type of waveguide inserted therein. Additionally, the bores 126 may have any defined pitch such as, without limitation, 125 µm, 127 µm and 250 µm. The ferrule 120 may take on any dimensions as desired per the end application. The optical connector 109 may advantageously have a low-profile design due to the relatively small size of the ferrule. In one non-limiting example, the ferrule 220 has a length of 8 millimeters (mm), a width of 6.4 mm, and a height of 2 mm.

In some embodiments, the first surface 122 may be non-orthogonal with respect to the optical axis of the ferrule 120 (i.e., non-orthogonal to the z-axis). In one non-limiting example, the first surface may be tilted 8° with respect to normal to the optical axis of the ferrule 120. Angling the first surface 122 reduces optical reflections at the mating surface.

Referring now to FIG. 3, the example ferrule 120 includes an opening 127 at the second surface 124 for receiving a portion of the waveguide support 110. The opening 127 may be fabricated by any known or yet-to-be-developed process. As non-limiting examples, the opening 127 may be formed during a molding process, by mechanical machining, bye an etching process, or by a laser damage and etching process. The shape of the opening 127 may take on any configuration, and may depend on the shape of the waveguide support 110. Referring briefly to FIG. 6, the opening 127 terminates at a back wall 129. The one or more bores 126 may extend between the first surface 122 and the back wall 129 of the opening 127 as shown.

The opening 127 is configured to receive a portion of the waveguide support 110. Waveguide support 110 may have any suitable configuration desired for securing and aligning the optical waveguides 130. As a non-limiting example, the waveguide support 110 comprises a support portion 114 and a cover portion 116, but the waveguide support may be a single component in other embodiments. Referring to FIG. 4, the support portion 114 is illustrated as inserted into the opening 127. The support portion 114 supports waveguides 130 disposed within the ferrule 120. In embodiments, the waveguides 130 are optical fibers that have been stripped of all coatings and outer layers, such that the cladding layers of the optical fibers are exposed. By removing the coatings and outer layers, the optical fibers may be inhibited from deforming or shifting in position during the solder reflow process that is performed to connect electrical components of the optical assembly to respective circuit boards. During fabrication, the stripped optical fibers are inserted into respective bores 126 such that they extend through the opening 127 of ferrule 120.

Referring to FIGS. 5 and 6, the cover portion 116 is inserted into the opening 127 and secured to the support portion 114. The cover portion 116 may be secured to the support portion 114 by a suitable adhesive, but other materials are possible. The waveguide support 110 defined by the support portion 114 and the cover portion 116 has an end 117 that abuts the back wall 129 of the opening 127. In the illustrated embodiment, the cover portion 116 comprises one or more grooves 113, and is secured to the support portion 114 such that the one or more waveguides 130 (e.g., stripped optical fibers) are disposed within the one or more grooves 113. The one or more grooves may be formed by any suitable process, such as precision machining, etching, or the like and may have any suitable shape such as v-grooves, u-grooves or the like. The waveguides 130 may also be secured within the grooves by a suitable adhesive, for example. In other embodiments, the support portion 114 comprises the one or more grooves 113 and the cover portion 116 is substantially planar. In other embodiments, both the support portion 114 and the cover portion 116 comprise grooves. Suitable adhesives for securing the waveguide support or optical waveguides may be tolerant to withstand the heat applied during the solder reflow process while still maintaining suitable performance.

The waveguide support 110 may be secured within the opening 127 using any suitable adhesive such as a thermally-cured adhesive or a UV cured adhesive. Other examples of adhesives include a thermo stable adhesive, such as a polymer, an organic-inorganic hybrid polymer, or by a thereto stable adhesive free bonding material such as, without limitation a sol-gel.

Other variations of optical connectors according to the concepts are possible. In alternative embodiments, the waveguide support may be configured as a single piece rather than two pieces that is inserted into an opening of the ferrule. It still other embodiments, the grooves for the optical waveguides in the waveguide support are omitted. In such embodiments, a plurality of optical fibers are pressed between the support portion 114 and the cover portion 116 such that they directly contact one another and their pitch is determined by their diameter. In other embodiments the waveguide support 110 may not be configured as one or more components separate from the ferrule 120 but rather integral with the ferrule. For example, the waveguide support 110 may be an integral component extending from the second surface of the ferrule 120. In such embodiments, the waveguide support may include bores rather than grooves for maintaining waveguides such as optical fibers.

As shown in FIGS. 5 and 6, the waveguide support 110 includes a chip coupling surface 112. The waveguides 130 have a first end terminating at the chip coupling surface 112 of the ferrule and the chip coupling surface 112 of the waveguide support 110. A portion of each waveguide is disposed within a bore 126 of the ferrule 120 and a portion is disposed within the waveguide support 110. The chip coupling surface 112 and the chip coupling surface 112 may be polished and/or cleaved.

After the waveguides 130 are secured within the ferrule 120 and the waveguide support 110, the optical connector 109 is coupled to the optical chip 100 such that the chip coupling surface 112 of the waveguide support 110 abuts the edge 102 of the optical chip 100 (FIGS. 1A and 1B). The chip coupling surface 112 may be secured to the edge 102 of the optical chip 100 by an adhesive that is transmissive to the wavelength(s) of light of the optical signals and is capable of withstanding the elevated temperatures of the solder reflow process (e.g., up to 260° C.) or elevated temperatures of a thermo-compression bonding (up to 300° C. for several seconds). The optical connector 109 is coupled to the optical chip 100 such that the one or more waveguides 130 are substantially aligned with the one or more chip waveguides 106. The one or more waveguides 130 may be aligned with the one or more chip waveguides 106 by an active alignment process, for example. In one example, a vision system is utilized to substantially align the one or more waveguides 130 with the one or more chip waveguides 106. As used herein, the term "substantially aligned" means that the one or more waveguides 130 are aligned with the one or more chip waveguides 106 such that optical signals may pass therebetween without a predetermined amount of insertion loss such as, without limitation, 0.5 dB.

Figure 7:
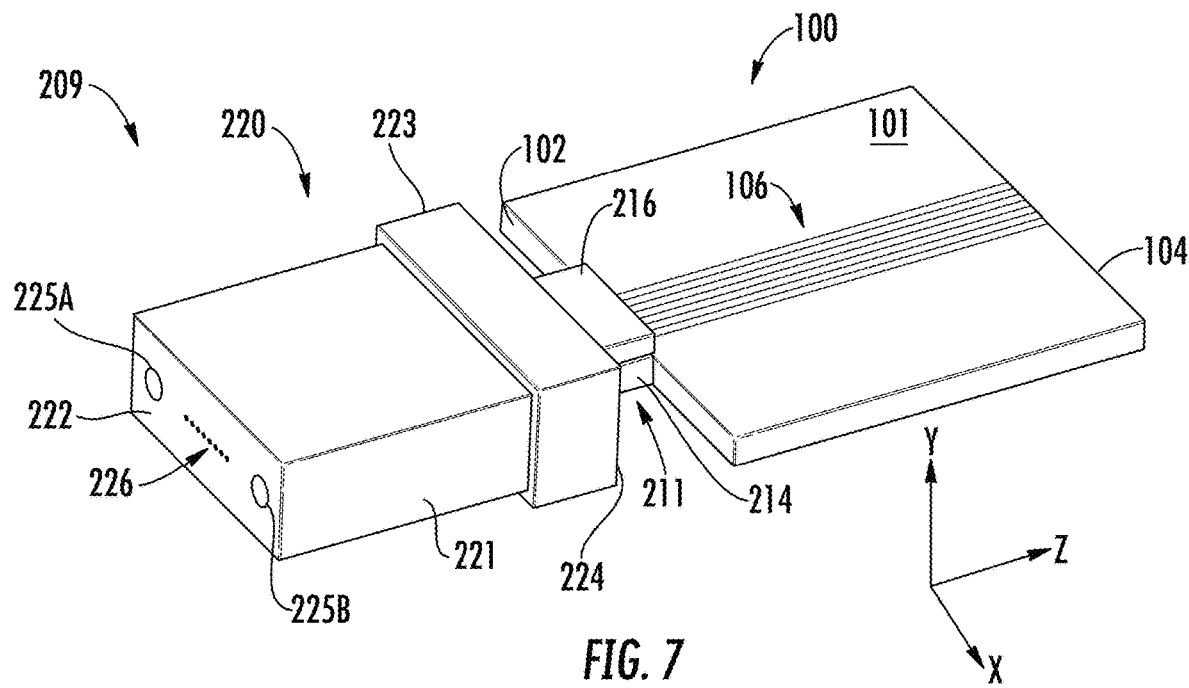
FIG. 7 schematically depicts a perspective view of another example optical assembly according to one or more embodiments described and illustrated herein.
Figure 8:
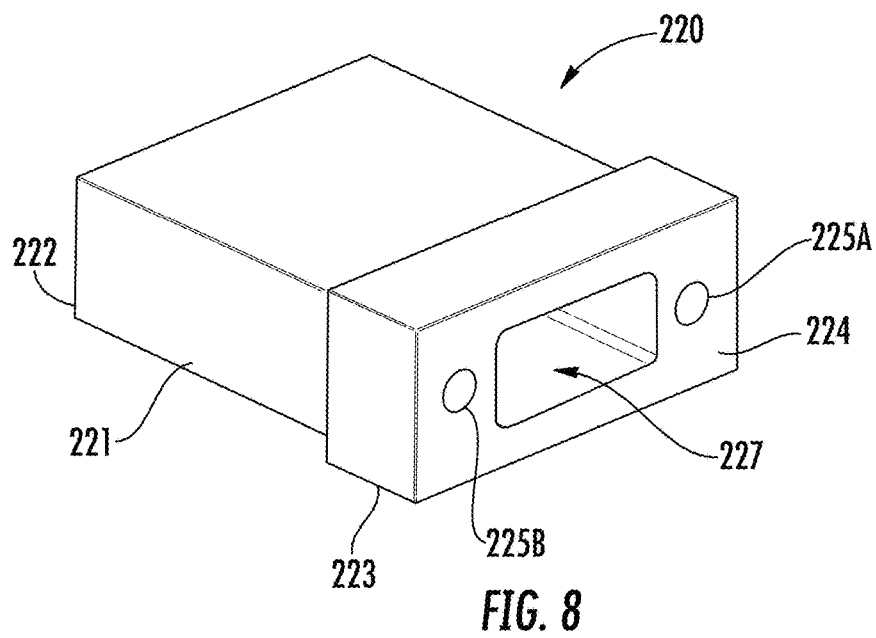
FIG. 8 schematically depicts a rear perspective view of an example ferrule of the example optical assembly depicted in FIG. 7 according to one or more embodiments described and illustrated herein.
Figure 9:
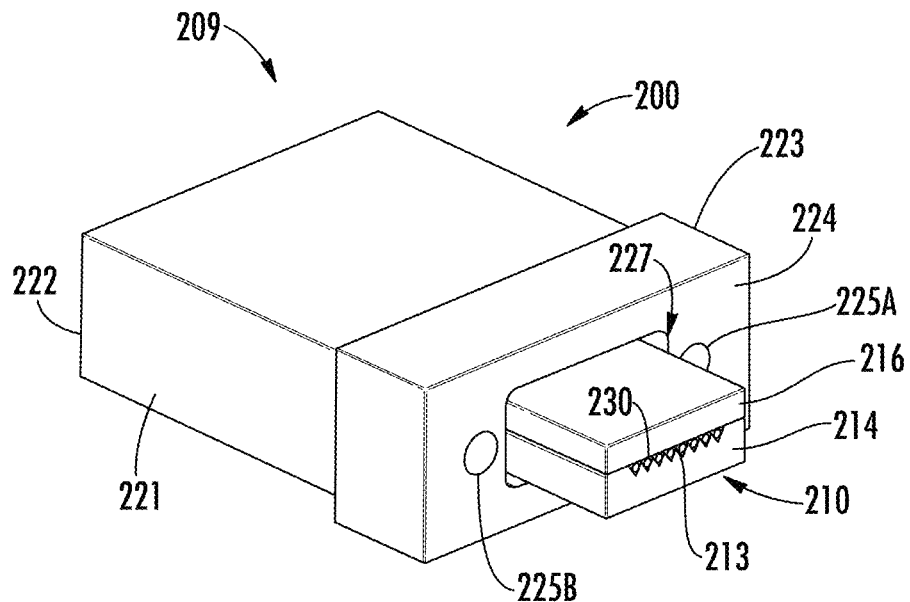
FIG. 9 schematically depicts a rear perspective view of an example optical connector of the example optical assembly depicted in FIG. 7 according to one or more embodiments described and illustrated herein.

As stated above, the ferrule 120 may be made out of any suitable material such as glass or a non-glass material. FIGS. 7-10A schematically illustrate another example optical connector 209 comprising a standard MT ferrule 220 with a waveguide support 210 inserted therein. FIG. 7 depicts a perspective view of an optical assembly comprising an optical connector coupled to an optical chip 100. The ferrule 220 may take on any suitable dimensions. In one non-limiting example, the ferrule 220 has a length of 8 mm, a width of 6.4 mm, and a length of 2 mm. The example optical connector 209 is coupled to an edge of the optical chip 100. FIG. 8 depicts a rear perspective view of a ferrule 220 of the optical connector 209 depicted in FIG. 7 in an unassembled state. FIG. 9 depicts a rear perspective view of the ferrule 220 of the optical connector 209 depicted in FIG. 7 in an assembled state. FIG. 104 depicts a longitudinal cross section of the optical connector 209 depicted in FIG. 7.

The example ferrule 220 depicted in FIGS. 7-10A includes a body portion 221 and a flange portion 223. The body portion 221 has a first surface 222 and the flange portion 223 has a second surface 224. In the illustrated embodiment, the ferrule 220 is configured as an MT ferrule that is fabricated from a suitable thermoplastic material. By way of explanation, the thermoplastic material may be a thermoset or a thermoplastic material capable of withstanding the elevated temperatures of a solder reflow process (e.g., up to 260° C.) without unsuitable deformation that causes excess misalignment. In some examples, the ferrule 220 is made from a thermoset or thermoplastic material that is filled with glass fibers or glass particles. The filler materials can improve or change performance characteristics such as thermal properties or CTE. The ferrule 220 may be fabricated by a molding process as known. Of course, ferrule 220 may comprise other polymer materials or any other suitable materials, such as glass, ceramic, glass-ceramic, or metal.

Referring to FIG. 7, the ferrule 220 comprises a first alignment bore 225A and a second alignment bore 225B configured to receive a first and second alignment pin of a mated plug connector (not shown) for making an optical connection. Different schemes are possible for the corresponding pins and bores. For instance, optical connector 209 may include the first and second alignment pins, or each of the optical connector 209 and the mated plug connector may comprise one alignment bore and one alignment pin. In yet other embodiments, the optical connector 209 does not include an alignment pin(s) or an alignment bore(s).

The ferrule 220 further includes at least one bore 226 extending from the first surface 222 into the body portion 221. The example ferrule 220 depicted in FIGS. 7-10A comprises eight bores 226 operable to receive eight waveguides 230. However, ferrules may have any number of bores 226 for receiving any number of waveguides 230 may be provided. As an example and not a limitation, the one or more bores 226, as well as the first and second alignment bores 225A, 225B may be fabricated by a precision molding process. Further, the bores 226 may open to a common pocket or slot disposed on the first surface 222 of the body portion 221 of ferrule 220. Using a common pocket or slot allows for a strong bond between the optical fibers and the ferrule 220.

In some embodiments, the first surface 222 may be non-orthogonal with respect to the optical axis of the ferrule 220 (i.e., non-orthogonal to the z-axis). In one non-limiting example, the first surface may be tilted 8° with respect to normal to the optical axis of the ferrule 220. Other tilt angles may be utilized for the first surface.

Figure 10A:
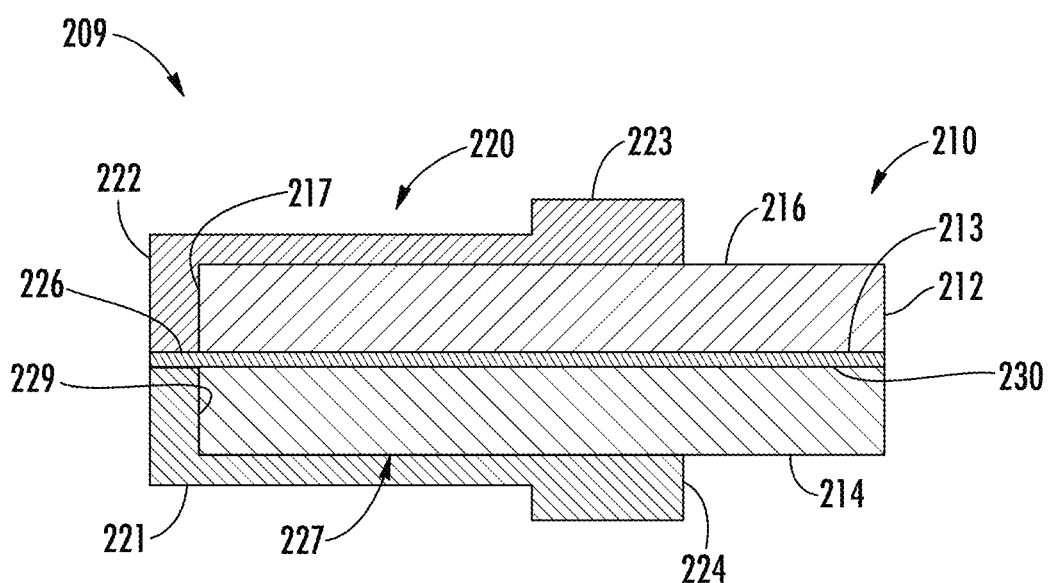
FIG. 10A schematically depicts a cross sectional view of the example optical connector depicted in FIG. 9 according to one or more embodiments described and illustrated herein.

Referring to FIG. 8, the example ferrule 220 includes an opening 227 at the second surface 224 for receiving the waveguide support 210. The opening 227 extends through the flange portion 223 and into the body portion 221. The opening 227 may be fabricated during a molding process, for example. Referring now to FIGS. 9 and 10A, the waveguide support 210 is inserted into the opening 227. In this embodiment, an end 217 of the waveguide support 210 abuts a back wall 229 of the opening 227 of the ferrule 220. The opposite end of the waveguide support provides a chip coupling surface 212. The waveguide support 210 should be fabricated from a material that has a CTE for the application such as one that substantially matches the CTE of the material of the optical chip 100 within a suitable range for the desired performance such as within ±0.5 parts per million per degree Celsius, but other ranges are possible as well. In one non-limiting example, the waveguide support 210 is fabricated from glass. In other embodiments, the waveguide support 210 is made of glass-ceramic, fused silica or silicon.

The example waveguide support 210 includes a support portion 214 and a cover portion 216. In the illustrated embodiment, the support portion 214 includes one or more grooves 213 to receive and align one or more waveguides 230, such as one or more optical fibers. It should be understood that either, both or neither of the support portion 214 and the cover portion 216 may include grooves 213. The cover portion 216 may be secured to the support portion 214 by use of an adhesive, for example. The waveguide support 210 may also be secured within the opening 227 by an adhesive. The adhesives utilized in the optical connector 209 should be thermo stable, such as such as a polymer, an organic-inorganic hybrid polymer, or by a thermo stable adhesive free bonding material such as, without limitation, a sol-gel. The adhesive can be selected that maintains suitable alignment and securing after being processed through a solder reflow process.

Referring to FIG. 10A, the one or more waveguides 230 are disposed within the one or more bores 226 of the ferrule 220 and within the one or more grooves 213 of the waveguide support 210. As described above, the one or more waveguides 230 may be configured as one or more optical fibers having any coatings and outer layers stripped therefrom. The first surface 222 of the ferrule 220 and the chip coupling surface 212 may be polished and/or laser cleaved.

The construction advantageously allows the polished optical connector 209 allows testing and performance evaluation before being attached to an optical chip if desired. The shape, dimension, number of parts, and/or the material of the ferrule, the waveguide(s), the waveguide support, and other parts of the optical connector may be changed and customized dependent on the optical assembly requirements and specifications.

Referring again to FIG. 7, after the waveguides 230 are secured within the ferrule 220 and the waveguide support 210, the optical connector 209 is coupled to the optical chip 100 such that the chip coupling surface 212 of the waveguide support 210 is adjacent or abuts the edge 102 of the optical chip 100. The chip coupling surface 212 may be secured to the edge 102 of the optical chip 100 by an adhesive that is transmissive to the wavelength(s) of light of the optical signals and is also capable of withstanding the elevated temperatures of the solder reflow process e.g., up to 260° C.). The optical connector 209 is coupled to the optical chip 100 such that the one or more waveguides 230 are substantially aligned with the one or more chip waveguides 106. The one or more waveguides 230 may be aligned with the one or more chip waveguides 106 by an active alignment process, for example. In one example, a vision system is utilized to substantially align the one or more waveguides 130 with the one or more chip waveguides 106.

Variations of the optical assemblies depicted in FIGS. 1A, 1B and 2-10A are contemplated. FIGS. 10B and 10C schematically depict cross sectional views of alternative optical connectors 209', 209''. Referring to FIG. 10B, an example optical connector 209' comprises a ferrule 220' and a waveguide support 210'. The ferrule 220' may be fabricated from a suitable plastic material such as, without limitation, a thermoset plastic. The ferrule 220' generally comprises a flange portion 223' and a body portion 221'. The ferrule 220' further comprises an opening 227' at a second surface 224' of the ferrule 220' at the flange portion 223'. The opening 227' terminates at a back wall 229' within the body portion 221'.

Figure 10B:
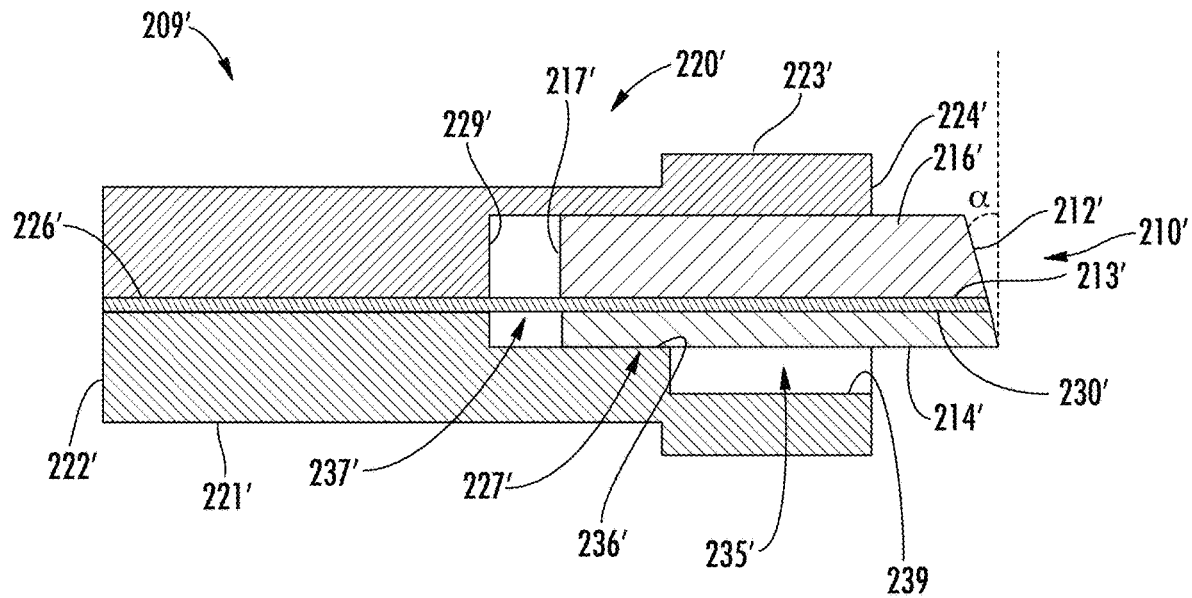
FIG. 10B schematically depicts a cross sectional view of an example optical connector having a gap between a second surface of a waveguide support and an interior surface of a ferrule according to one or more embodiments described and illustrated herein.

The example waveguide support 210' generally comprises a support portion 214' and a cover portion 216' that cooperate to provide one or more grooves 213', as described above. The waveguide support 210' may be fabricated from a glass-based material or other suitable material as discussed. The support portion 214' and the cover portion 216' define a chip coupling surface 212. In the example of FIG. 10B, the chip coupling surface 212' is tilted at a tilt angle α to avoid back reflections. However, it should be understood that embodiments may have a non-titled (i.e., vertical) chip coupling surface 212'.

The waveguide support 210' is disposed within the opening 227' of the ferrule 220' such that a gap 237' is present between an end 217' of the waveguide support 210' and the interior back wall 229' of the ferrule 220'. In some embodiments, one or more mechanical stop features (not shown) may be fabricated in the walls of the opening 227' to provide a back-stop for the end 217' of the waveguide support 210'. The support portion 214' may rest on a support surface 236' within the opening 227'. In the illustrated embodiment, the opening 227' is larger proximate the second surface 224' of the ferrule such that a recessed region 235' is defined between support portion 214' and a surface 239 of the opening. The waveguide support 210' may be secured within the opening 227' by any means such as, without limitation, an interference fit and/or use of an adhesive.

The ferrule 220' further includes one or more bores 226' that extend between the first surface 222' and the back wall 229'. One or more waveguides 230' are disposed within the one or more grooves 213' of the waveguide support 210' and the one or more bores 226' of the ferrule 220' such that the one or more waveguides 230' traverse the gap 237'.

Figure 10C:
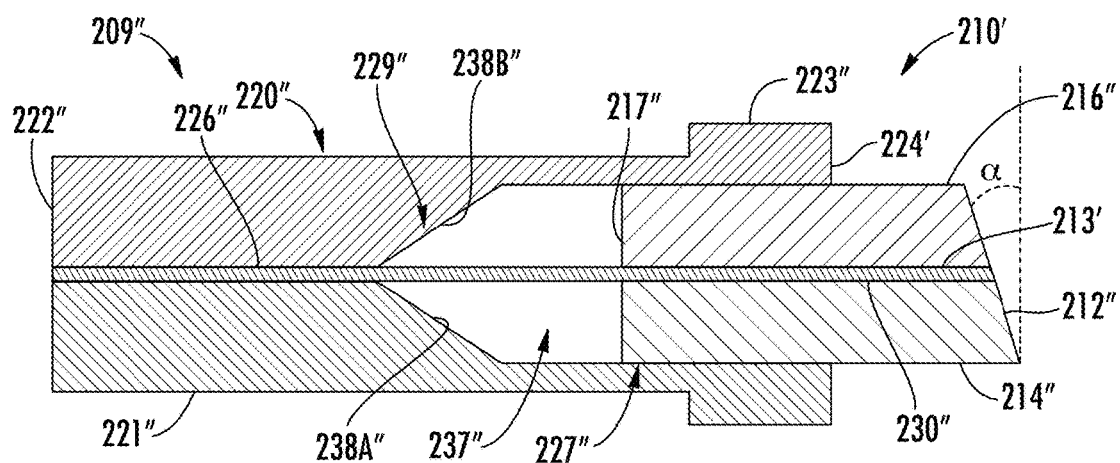
FIG. 10C schematically depicts a cross sectional view of an example optical connector comprising a ferrule having a tapered interior surface for receiving one or more waveguides according to one or more embodiments described and illustrated herein.

Referring to FIG. 10C, an example optical connector 209" comprises a ferrule 220" and a waveguide support 210". The ferrule 220" may be fabricated from a plastic material such as, without limitation, a thermoset plastic. The ferrule 220" generally comprises a flange portion 223" and a body portion 221". The ferrule 220' further comprises an opening 227" at a second surface 224" of the ferrule 220" at the flange portion 223". The opening 227" terminates at a back wall 229" within the body portion 221". In the illustrated embodiment, the back wall 229" has a tapered surface, such as a first tapered surface 238A" and a second tapered surface 238B". One or more bores 226" extend between the first surface 222" to the tapered back wall 229".

The example waveguide support 210" generally comprises a support portion 214" and a cover portion 216" that cooperate to provide one or more grooves 213", as described above. The waveguide support 210" may be fabricated from a glass-based material. The support portion 214" and the cover portion 216" define a chip coupling surface 212". In the example of FIG. 10C, the chip coupling surface 212" is tilted to avoid back reflections. However, it should be understood that embodiments may have a non-titled (i.e., vertical) chip coupling surface 212".

The waveguide support 210" is disposed within the opening 227" of the ferrule 220" such that a gap 237" is present between an end 217" of the waveguide support 210" and the tapered back wall 229". In some embodiments, one or more mechanical stop features (not shown) may be fabricated in the walls of the opening 227" to provide a back-stop for the end 217" of the waveguide support 210". The waveguide support 210" may be secured within the opening 227" by any means such as, without limitation, an interference fit and/or use of an adhesive. One or more waveguides 230" are disposed within the one or more grooves 213" of the waveguide support 210" and the one or more bores 226" of the ferrule 220" such that the one or more waveguides 230' traverse the gap 237". The first tapered surface 238A' and the second tapered surface 238B" may assist in guiding the one or more waveguides 230" into the one or more bores 226" of the ferrule 220".

Figure 11:
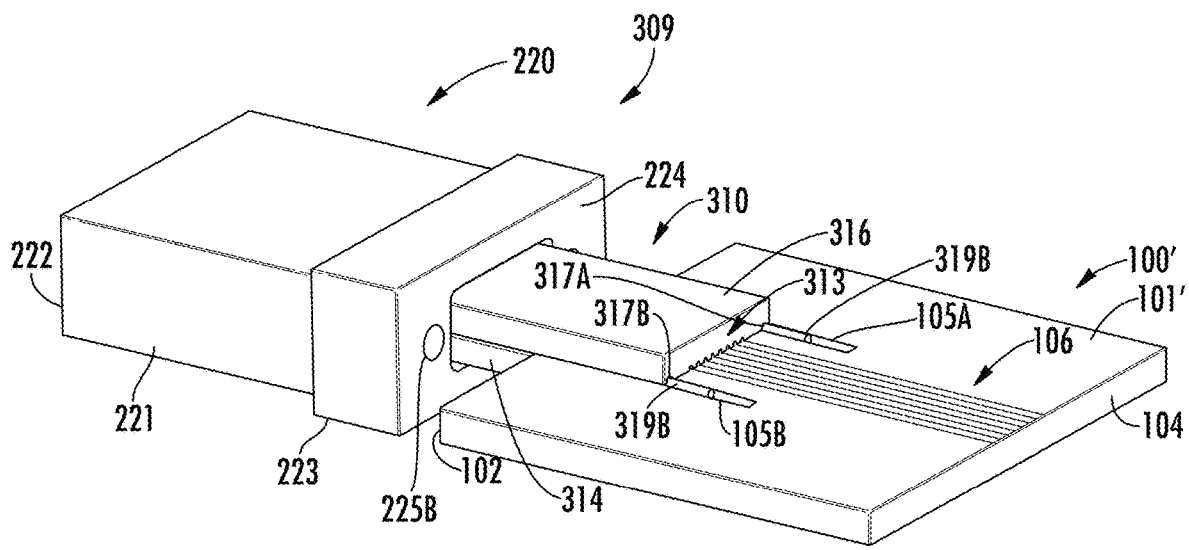
FIG. 11 schematically depicts a perspective view on another example optical assembly according to one or more embodiments described and illustrated herein.
Figure 12:
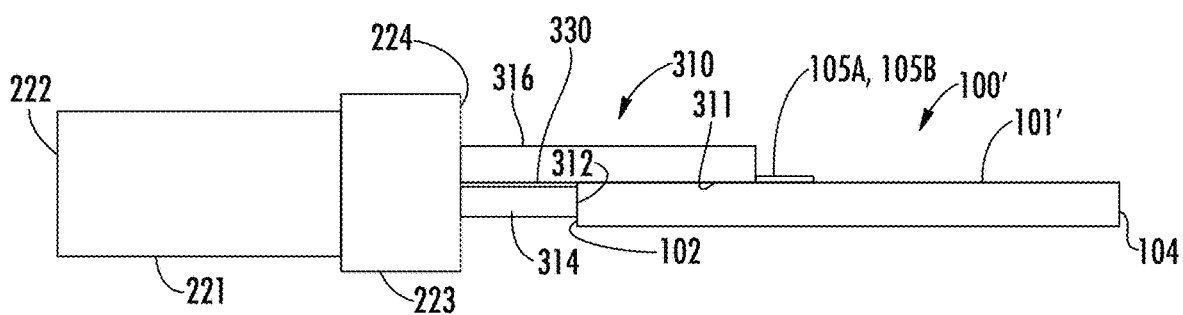
FIG. 12 schematically depicts a side view of the example optical assembly depicted in FIG. 11 according to one or more embodiments described and illustrated herein.

Further variations of optical assemblies are also contemplated. Referring now to FIGS. 11 and 12, an example optical assembly comprising an optical connector 309 coupled to an edge 102 of an optical chip 100' is schematically illustrated. FIG. 11 is a perspective view of the example optical assembly and FIG. 12 is a side view of the example optical assembly. The optical connector 309 includes a ferrule 220 similar to the ferrule depicted in FIGS. 7-10A. The waveguide support 310 of the example optical connector 309 includes a support portion 314 and a cover portion 316. In the illustrated embodiment, the cover portion 316 is longer in length than the support portion 314 such that a bottom surface 311 is disposed on an upper surface 101' of the optical chip 100'. The example optical chip 100' comprises a first chip alignment groove 105A and a second chip alignment groove 1059 disposed on the upper surface 101', outboard of a plurality of chip waveguides 106, and terminating at the edge 102 of the optical chip 100'. The bottom surface 311 of the cover portion 316 comprises a plurality of grooves 313 for receiving a plurality waveguides 330, and a first alignment groove 317A and a second alignment groove 317B outboard of the plurality of grooves 313. The first chip alignment groove 105A, the second chip alignment groove 105B, the first alignment groove 317A, and the second alignment groove 317B may be fabricated by a precision etching process, but other methods of forming are possible.

A first alignment pin 319A is disposed within the first chip alignment groove 105A and the first alignment groove 317A, and a second alignment pin 319B is disposed within the second chip alignment groove 105B and the second alignment groove 317B as depicted. The first and second alignment pins 319A, 319B may be fabricated of any suitable material. In one non-limiting example, the first and second alignment pins 319A, 319E are fabricated from glass cylinders. The alignment pins and alignment grooves provide for passive alignment between the plurality of waveguides 330 of the optical connector 309 and the plurality of chip waveguides 106 of the optical chip 100'. Additionally, disposing the cover portion 316 on the upper surface 101' of the optical chip 100' provides a larger bonding area between the cover portion 316 and the optical chip' than just the edge 102 of the optical chip 100'.

In other embodiments, the upper surface 101' comprises ridges rather than the first and second chip alignment grooves 105A, 105B and first and second alignment pins 319A, 319B. The ridges may be disposed within alignment grooves of the cover portion 316. Alternatively, the bottom surface 311 of the cover portion 316 may include ridges that are disposed within chip alignment grooves on the upper surface 101' of the optical chip 100'. Other configurations are also possible. For example, the support portion 314 may be longer than the cover portion 316 such that the support portion 314 is disposed on a bottom surface of the optical chip 100'. Alternatively, the support portion 314 and the cover portion 316 may be notched such that support portion 314 and the cover portion 316 may contact the bottom and upper surfaces of the optical chip 100', respectively. Still further, alignment pins (not shown) may be embedded within the optical chip 100' such that the embedded alignment pins are inserted into the first and second alignment bores 225A, 225B of the ferrule 220.

Other methods of aligning the respective waveguides of the optical connector and the optical chip are also possible. In one example, unused chip waveguides are provided outboard of the chip waveguides used for optical communication. These unused chip waveguides are fabricated using the same process as the chip waveguides used for optical communication. The unused chip waveguides may then be utilized as alignment features when coupling the optical connector to the edge of the optical chip. In another example, fiducial marks are provided on one or more surfaces of the optical chip. As a non-limiting example, the fiducuals may be photolithographically defined on the optical chip.

It should be understood that the waveguide support 310 depicted in FIGS. 11 and 12 and the various alignment techniques and features described above may also be utilized using the ferrule 120 depicted in FIGS. 1A, 1B, and 2-6.

Instead of butt-coupling the one or more waveguides of the optical connector to the one or more chip waveguides of the optical chip, the one or more waveguides of the optical connector may be configured to be optically coupled to the one or more chip waveguides of the optical chip by evanescent coupling.

Figure 13:
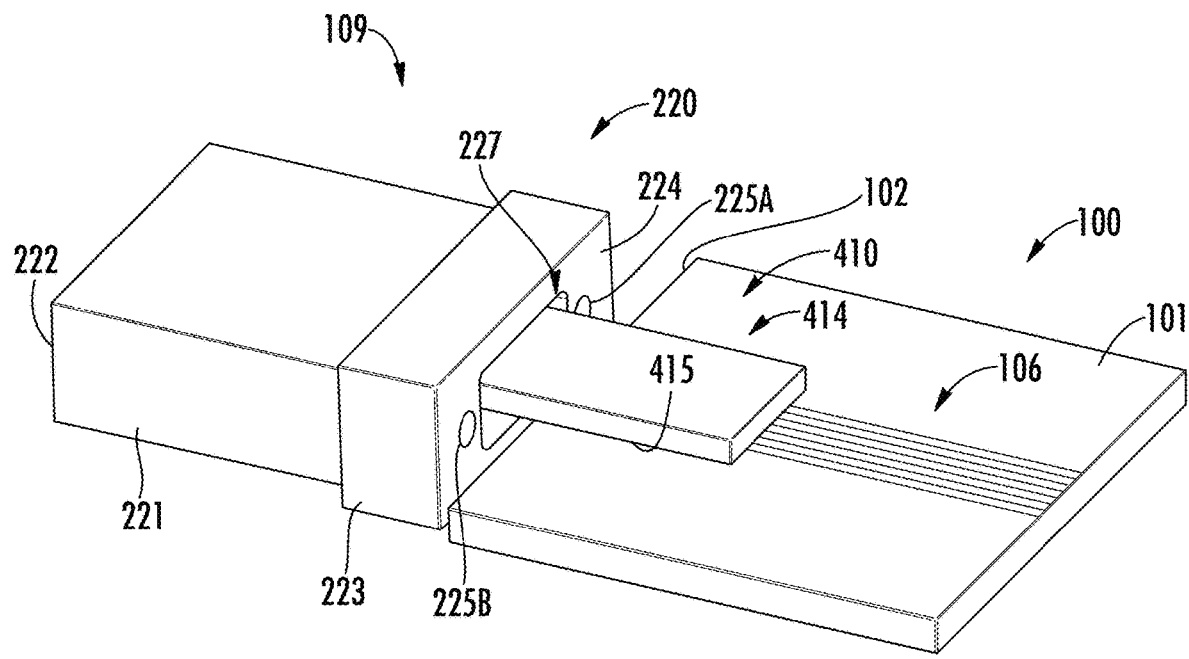
FIG. 13 schematically depicts a perspective view of another example optical assembly according to one or more embodiments described and illustrated herein.

Referring now to FIG. 13, an example optical assembly comprising an optical connector 409 and an optical chip 100 is schematically illustrated. The optical connector 409 comprises a ferrule 220 and a waveguide support 410. It should be understood that embodiments are not limited to the configuration of the ferrule depicted in FIG. 13, and that other ferrule configurations are possible, such as the ferrule depicted in FIG. 1A, for example. The waveguide support 410 comprises a cover portion 414 and has a length such that a bottom surface 415 is disposed on a surface 101 of the optical chip 100. The bottom surface 415 may be bonded to the surface 101 of the optical chip 100 using a thereto-stable adhesive, as described herein. As shown in FIG. 13, the waveguide support 410 covers end portions of the chip waveguides 106 proximate the edge 102 of the optical chip 100. In some embodiments, a support portion (not shown) of the waveguide support 410 may also be provided to increase the bonding area of the waveguide support 410 to the optical chip 100 at the edge 102 of the optical chip 100.

Figure 14A:
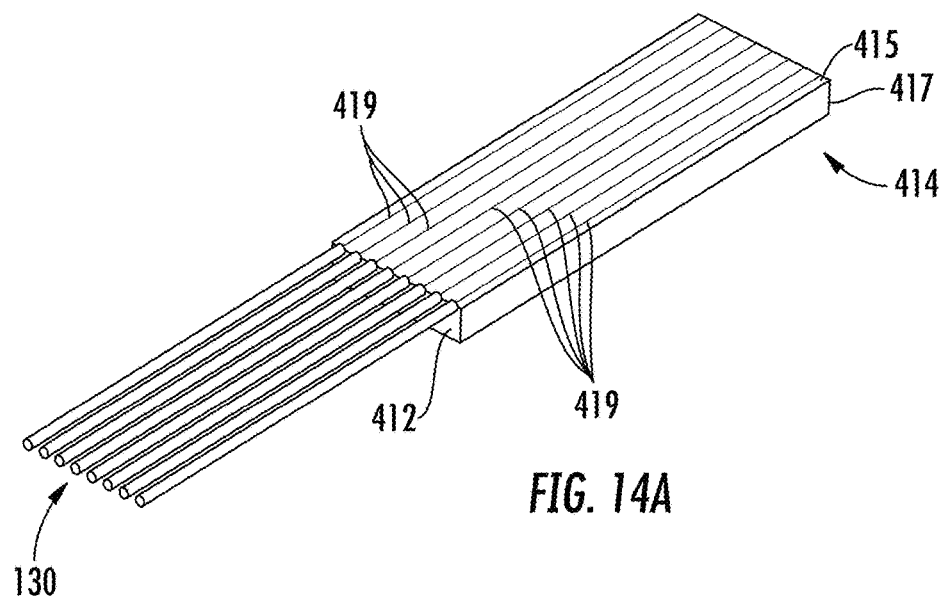
FIG. 14A schematically depicts a perspective view of a bottom surface of an example cover portion of an example waveguide support according to one or more embodiments described and illustrated herein.

Referring to FIG. 14A, the bottom surface 415 of the cover portion 414 of the waveguide support 410 is schematically illustrated. The bottom surface 415 includes a plurality of support waveguides 419 extending from a first end 412 to a second end 417. A plurality of optical fibers 130 are butt-coupled to the first end 412 such that the plurality of waveguides 130 (i.e., optical fibers) are optically coupled to the plurality of support waveguides 419. It should be understood that any number of support waveguides 419 and optical fibers 130 may be provided.

The bottom surface 415 of the cover portion 414 of the waveguide support 410 is disposed on the upper surface 101 of the optical chip 100 such that the plurality of support waveguides 419 are disposed on, and make contact with, the plurality of chip waveguides 106. The plurality of support waveguides 419 is optically coupled to the plurality of chip waveguides 106 by evanescent coupling such that optical signals propagating within the plurality of optical fibers 130 toward the optical chip 100 are gradually coupled into the plurality of chip waveguides 106 over the length of the overlapping plurality of support waveguides 419 and the plurality of chip waveguides 106. Similarly, optical signals propagating within the plurality of chip waveguides 106 toward the plurality of optical fibers 130 are gradually coupled into the plurality of support waveguides 419 over the length of the overlapping plurality of support waveguides 419 and the plurality of chip waveguides 106. Any suitable optical fiber 130 may be used such as a round fiber with a flat surface formed on a side or D-shaped fiber to aid with the evanescent optical coupling.

Figure 14B:
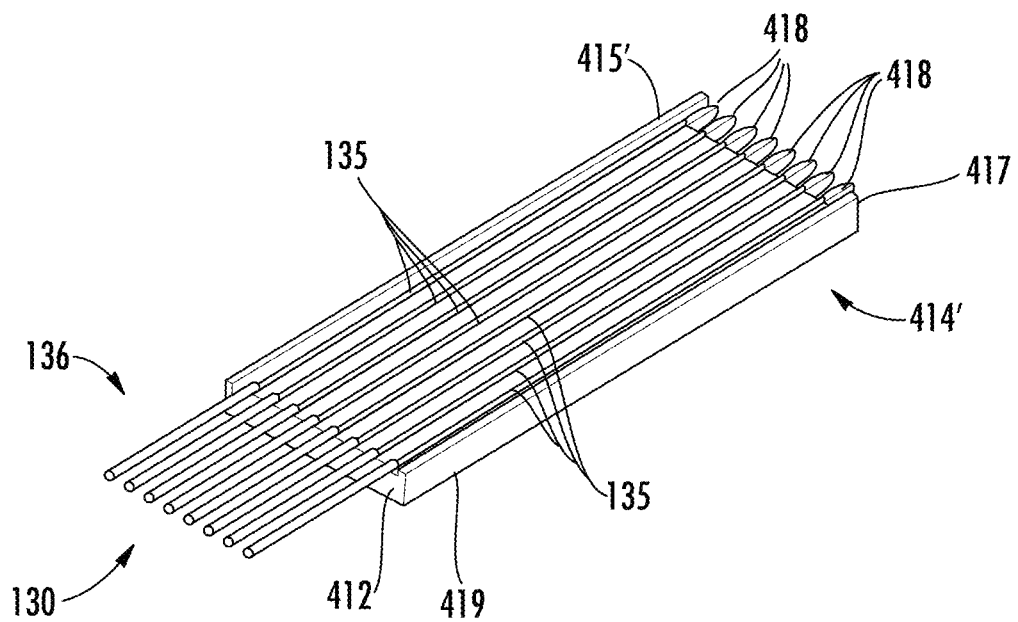
FIG. 14B schematically depicts a perspective view of a bottom surface of another example cover portion of an example waveguide support according to one or more embodiments described and illustrated herein.
Figure 14C:
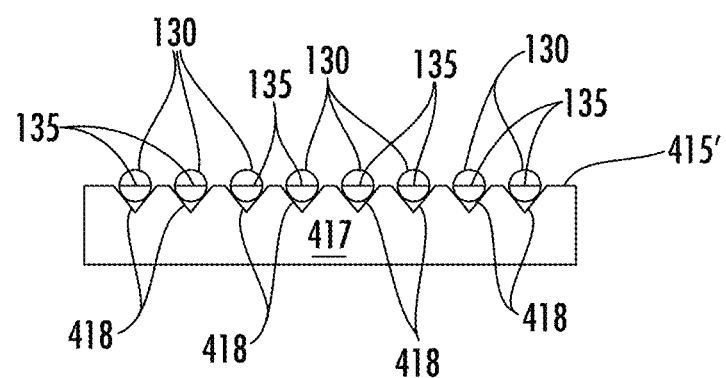
FIG. 14C schematically depicts a front view of the example cover portion depicted in FIG. 14B according to one or more embodiments described and illustrated herein.

FIG. 14B schematically depicts a bottom surface 415' of an alternative cover portion 414' of an example waveguide support 410'. FIG. 14C is an end view of the cover portion 414' depicted in FIG. 14B. The bottom surface 415' comprises a plurality of grooves 418, which may be V-shaped as shown in FIG. 14B or take on other shapes. The plurality of optical fibers 130 is disposed within the plurality of grooves 418. The portions of the plurality of optical fibers 130 have a planar surface 135. As such, the planar surface 135 of the optical fibers give them a "D-shaped" configuration. In embodiments, the cores of the optical fibers 130 at the planar surfaces 135 are exposed. The plurality of optical fibers 130 is disposed within the plurality of grooves 418 such that the planar surfaces 135 are substantially in a plane defined by the bottom surface 415'.

The bottom surface 415' is disposed on the upper surface 101 of the optical chip 100 such that the planar surfaces 135 of the plurality of optical fibers 130 are disposed on the plurality of chip waveguides 106. Thus, the plurality of optical fibers 130 are optically coupled to the plurality of chip waveguides 106 by evanescent coupling between the planar surfaces 135 and the plurality of chip waveguides 106.

Figure 15:
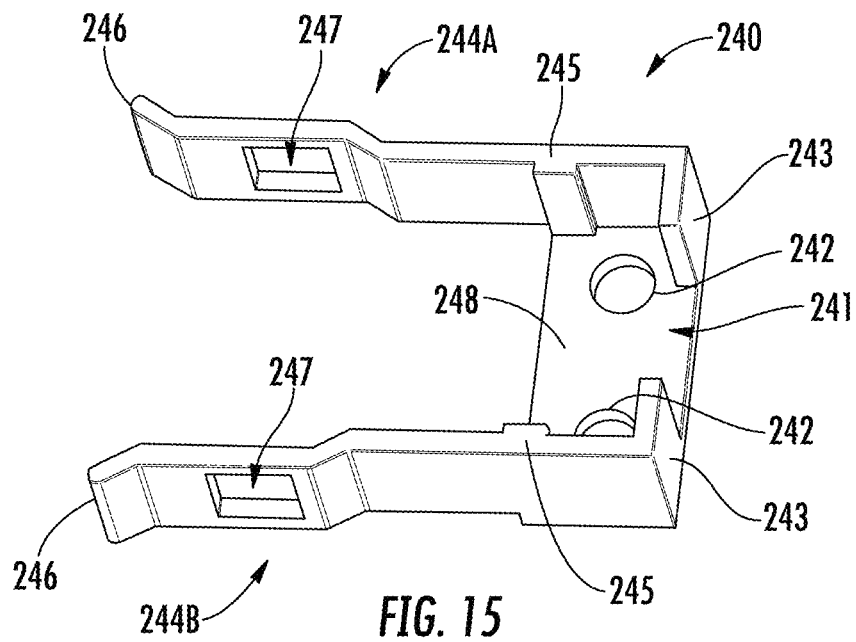
FIG. 15 schematically depicts a perspective view of an example receptacle for the example optical connector depicted in FIG. 9 according to one or more embodiments described and illustrated herein.
Figure 16:
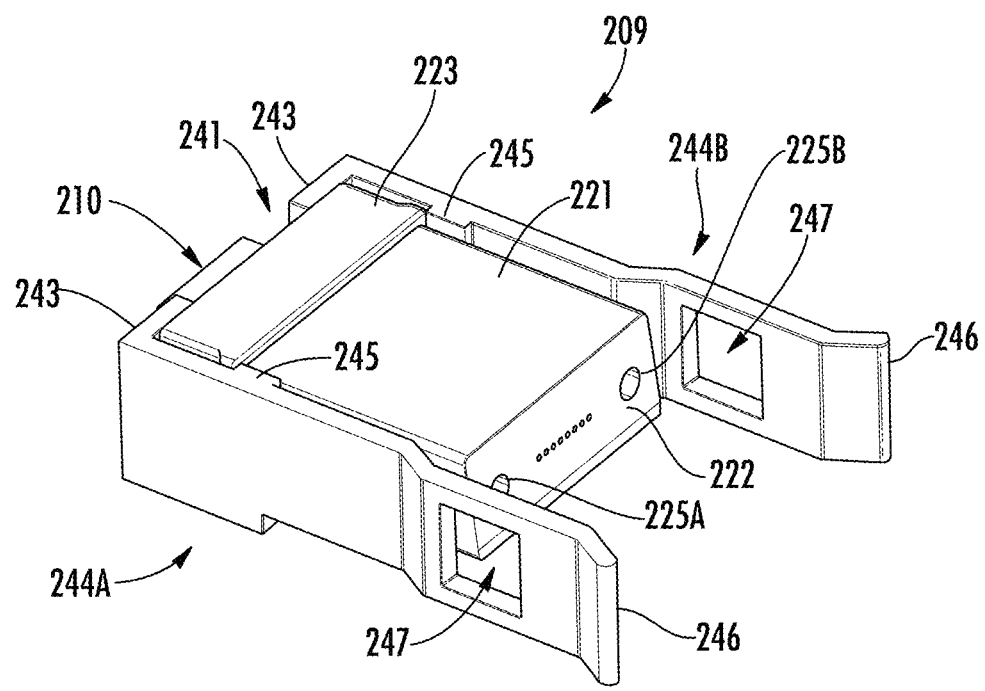
FIG. 16 schematically depicts a perspective view of the example optical connector depicted in FIG. 9 disposed within the receptacle depicted in FIG. 15 according to one or more embodiments described and illustrated herein.

The optical connectors disclosed herein may further include a receptacle for securing a cooperating connector for making an optical connection between connectors. FIGS. 15 and 16 schematically illustrate perspective views of an example receptacle 240 configured to receive a suitable ferrule such as ferrule 220. FIG. 15 illustrates the receptacle 240 without the ferrule 220. FIG. 16 illustrates the ferrule 220 disposed within the receptacle for securing an optical connection. Receptacles may have any suitable configuration for receiving ferrule to make an optical connection. Referring to both FIGS. 15 and 16, the receptacle 240 of this embodiment generally comprises a seat 248, a wall 243 extending from the seat 248, a first arm 244A extending from the seat 248 and the wall 243, and a second arm 244B extending from the seat 248 and the wall 243. The receptacle 240 may be formed from a thermally stable metal such as, without limitation, Invar or other suitable material. The receptacle 240 may be formed by a stamping process or may be machined, for example.

The receptacle 240 may include additional features for mounting to a substrate, such as a base substrate to which the optical chip 100 is mounted. As shown in FIG. 15, the seat 248 comprises two holes 242, which may be configured to mate with corresponding features of a base substrate (not shown) to which the receptacle 240 is mounted. Other types of mechanical features may be provided on the receptacle 240 for attachment to a base substrate, such as protruding pins operable to be inserted into corresponding holes of the base substrate.

The example receptacle 240 includes a protrusion 245 extending from an inner surface of each of the first and second arms 2444, 244B. As shown in FIG. 16, the flange portion 223 of the ferrule 220 is disposed on the seat 248 such that the flange portion 223 is further positioned between the wall 243 and the protrusions 245. The flange portion 223 of the ferrule 220 may be coupled to the receptacle 240 by an interference fit with the wall 243 and the protrusions 245. The ferrule 220 may also be bonded to the receptacle 240 by a thermally stable adhesive, for example.

The wall 243 of the example receptacle 240 includes a notch 241. As shown in FIG. 16, the waveguide support 210 is disposed within the notch 241 such that the waveguide support 210 protrudes beyond the wall 243.

The first and second arms 244A, 244B are configured to flex outwardly when a mated plug connector is inserted into the receptacle 240, as described in more detail below. As shown in the example receptacle 240 depicted in FIGS. 15 and 16, the first and second arms 244A, 244B may have a flared end 246 that flare outwardly away from the ferrule 220 to assist in guiding the mated plug connector toward the ferrule 220. The example first and second arms 244A, 244B each include an engagement feature configured as an opening 247 operable to receive a detent feature 257 of a corresponding mated plug connector 250 as described in more detail below. It should be understood that embodiments may include other engagement features for removably engaging a mated optical connector.

Figure 17:
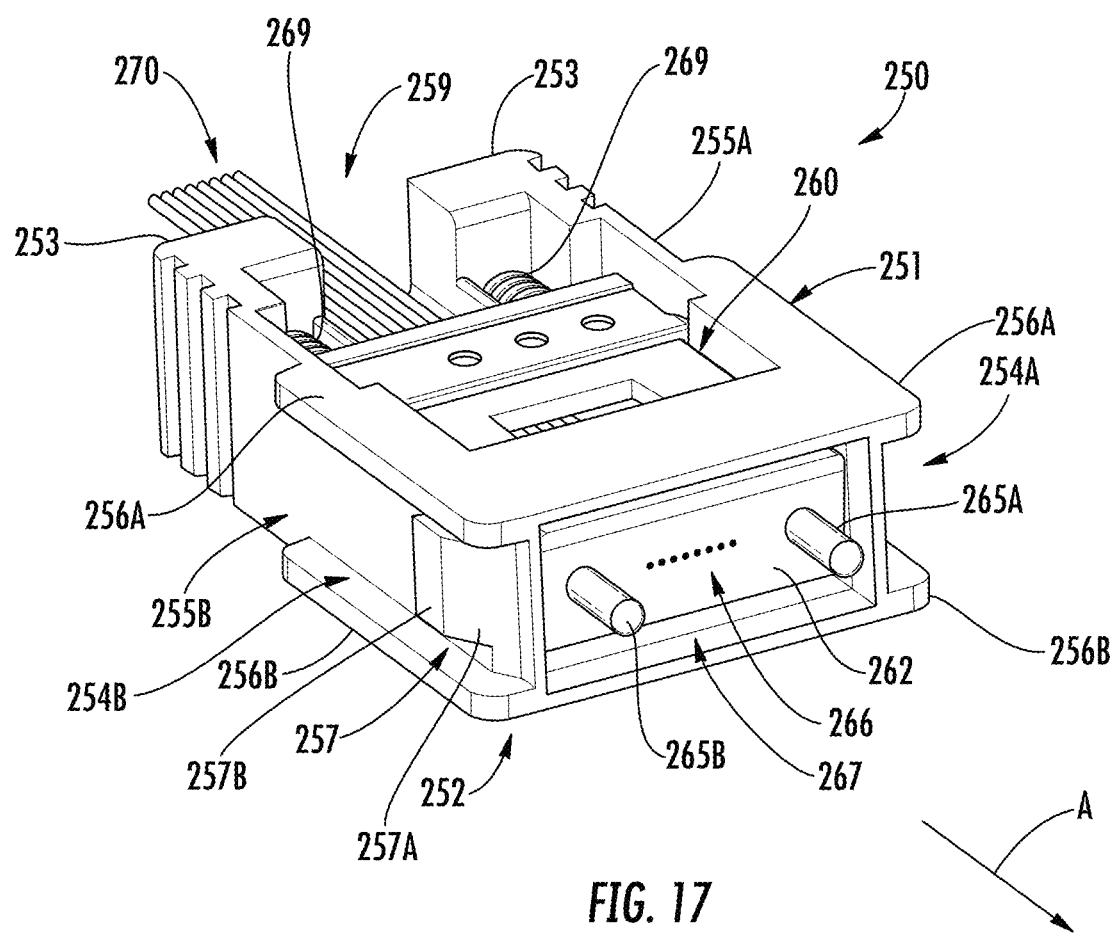
FIG. 17 schematically depicts a perspective view of an example plug connector operable to mate with the example receptacle depicted in FIGS. 15 and 16 according to one or more embodiments described and illustrated herein.

Also disclosed are plug connectors that cooperate with the optical connectors 109, 209, 209' and 209" FIG. 17 schematically depicts an example plug connector 250 operable to be removably connected to the example optical connector 209 depicted in FIG. 16. It should be understood that the plug connector 250 depicted in FIG. 17 is for illustrative purposes only and that other configurations are also possible. Generally, the plug connector 250 comprises a plug connector body 251 and a plug ferrule 260 disposed within the connector body 251. The plug connector body 251 has a first side 255A and a second side 255B each having a detent feature 257 proximate a front end 252 of the plug connector body 251. The plug connector body 251 may further include first flanges 256A and second flanges 256B extending over the first side 255A and the second side 255B, thereby defining respective first and second channels 254A, 254B for receiving the first and second arms 244A, 244B of the receptacle 240.

The detent feature 257 may have a slope portion 257A and a mesa portion 257B such that, as the plug connector 250 is inserted into the receptacle 240, the slope portions 257A flex the first and second arms 244A, 244B outwardly until the mesa portion portions 257B are fully within the openings 247 of the first and second arms 244A, 244B, which causes the first and second arms 244A, 244B to snap back and lock the detent features 257 within the openings 247.

The plug ferrule 260 of plug connector 250 used should be compatible with the optical connector such as using a plug ferrule similar to a MPO or MT ferrule as desired. The plug ferrule 260 comprises one or more plug bores 266 operable to receive one or more plug optical fibers 270 that terminate at a plug optical coupling face 262. The rear wall 253 of the plug connector body 251 may include a notch 259 or other opening to allow the one or more plug optical fibers 270 to enter the plug connector body 251. Each of the plug optical coupling face 262 and the first surface 222 of the ferrule 220 is correspondingly tilted in the illustrated embodiment to prevent back reflection of optical signals. The plug optical coupling face 262 is exposed by an opening 267 of the plug connector body 251. The example plug connector 250 further comprises a first alignment pin 265A and a second alignment pin 265A extending from the plug optical coupling face 262 that are configured to be inserted into the first alignment bore 225A and the second alignment bore 225B of the ferrule, respectively.

In the illustrated embodiment, the plug ferrule 260 is biased in a direction A toward the front end by one or more bias members disposed between a rear wall 253 of the plug connector body 251 and the plug ferrule 260. The bias members 269 may be configured as springs, for example. Because the springs are compressed during connector mating, and the optical connector 209 is smaller than typical MTP/MPO connectors, the springs used should provide a lower force (e.g., about 4 N) than typically used in MTP/MPO connectors (e.g., about 10 N). The spring force should be minimized to just that needed to maintain physical contact in the operating temperature range of the optical assembly.

Figure 18:
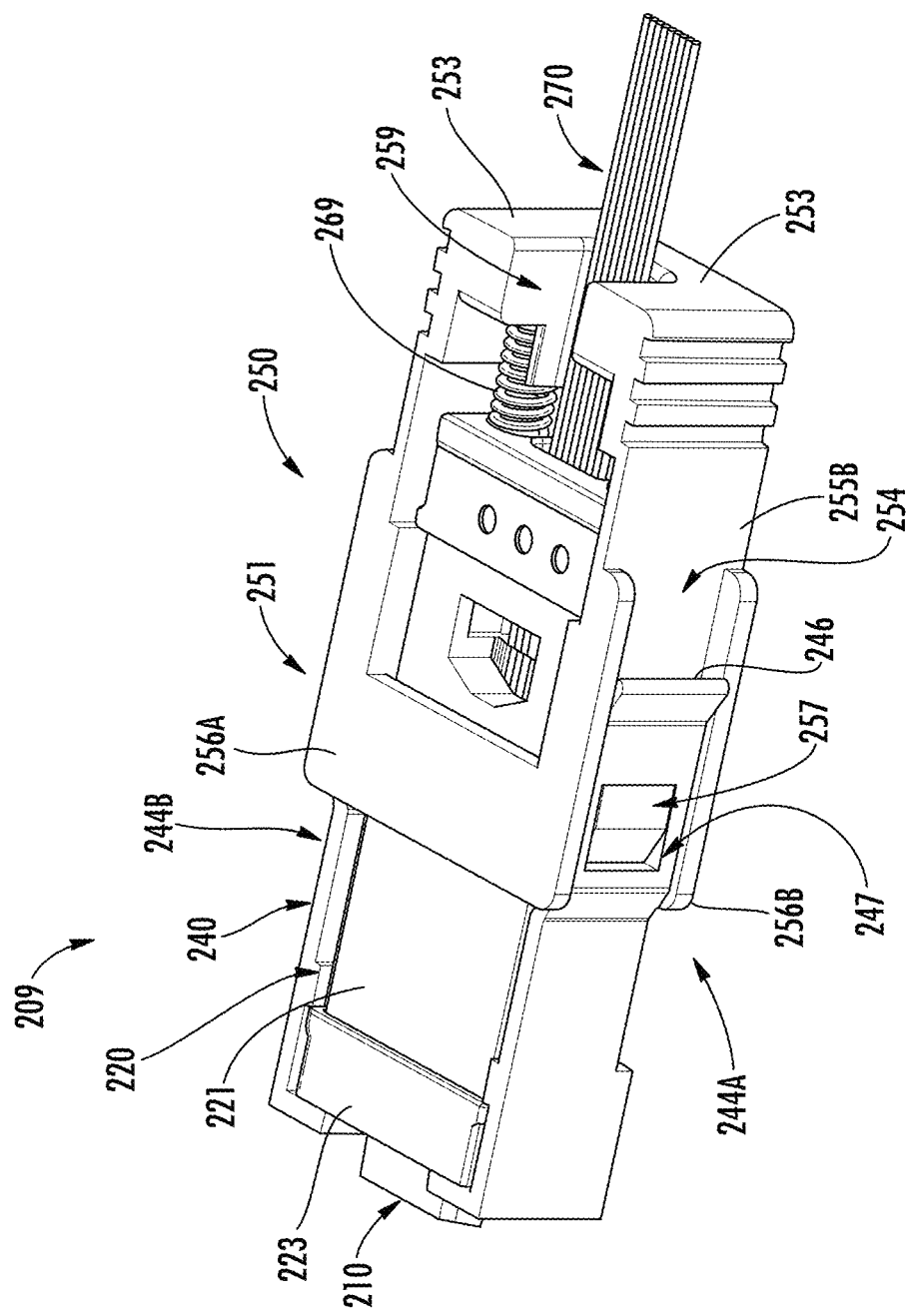
FIG. 18 schematically depicts a perspective view of the example plug connector depicted in FIG. 17 mated with the example receptacle depicted in FIGS. 15 and 16 according to one or more embodiments described and illustrated herein.

FIG. 18 schematically illustrates a plug connector 250 mated to an optical connector 209. The front end 252 of the plug connector 250 is brought between the first arm 244A and the second arm 244B of the receptacle 240 such that the first arm 244A and the and the second arm 244B are disposed within channels 254 on the first and second sides 255A, 255B of the plug connector body 251 between the first and second flanges 256A, 256B. The detent features 257 of the plug connector body 251 cause the first and second arms 244A, 244B to flex outwardly until the detent features 257 clear the openings 247 of the first and second arms 244A, 244B. Pushing the plug connector 250 into the receptacle 240 causes the bias members 269 to compress when the plug optical coupling face 262 of the plug ferrule 260 contacts the first surface 222 of the ferrule 220.

The plug ferrule 260 is allowed to float in the plug connector body 251 so that the ferrule-to-ferrule mating is not biased by the mechanical alignment of the plug connector 250 and optical connector 290 including the receptacle 240, beyond what is needed for coarse alignment. The final alignment between the plug ferrule 260 and the ferrule 220 of the optical connector 209 is provided by the first and second alignment pins 265A, 265B. However, both ferrules should be coarsely aligned prior to the first and second alignment pins 265A, 265B engaging the ferrule 220 of the optical connector 209 including the receptacle 240 to prevent the first and second alignment pins 265A, 265B from contacting the first surface 222 of the ferrule 220 and causing damage. In the design illustrated in FIGS. 15-18, the first and second flanges 256A, 256B pre-align the plug connector 250 and optical connector 209. It is noted that the engagement length of the first and second arms 244A, 244B and the first and second flanges 356A, 256B enhance the connection's resistance to angular motion in the vertical plane.

Figure 19:
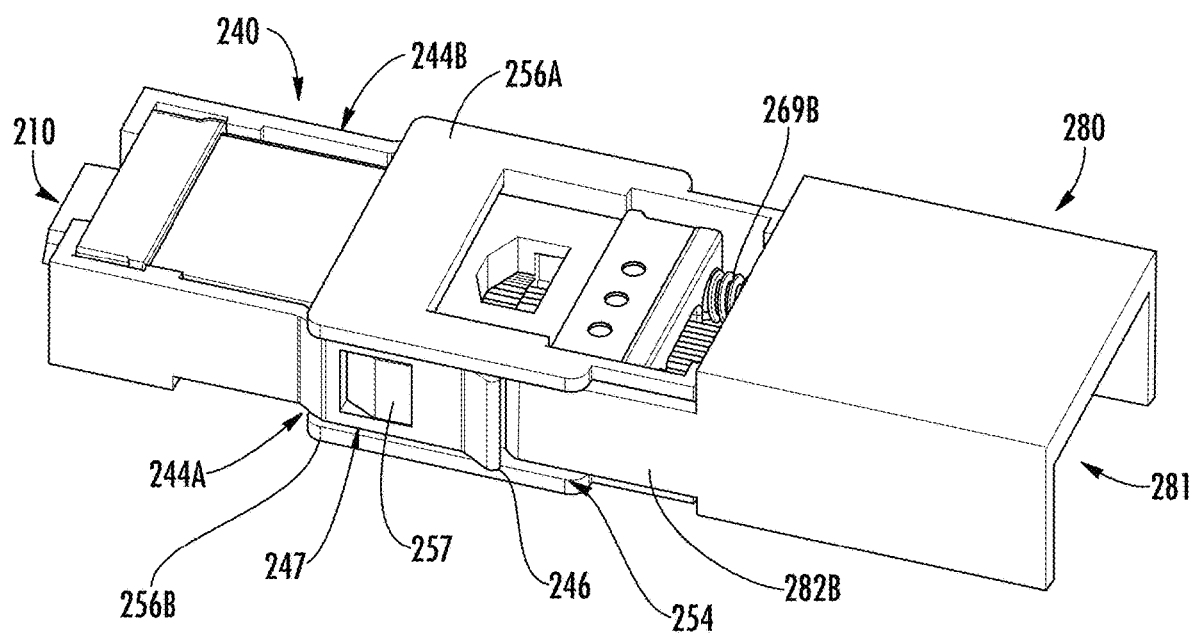
FIG. 19 schematically depicts a perspective view of an example removal tool for removing a plug connector from a receptacle according to one or more embodiments described and illustrated herein.

Plug connector 250 removal is provided by flexing the first and second arms 244A, 244B of the receptacle 240 and pulling back on the plug connector 250 away from the receptacle 240. Plug connector 250 removal may be assisted by a removal tool 280 as illustrated in FIG. 19. The removal tool 280 comprises a first removal prong 282A (not visible in FIG. 19) and a second removal prong 282B that are inserted into the channels 254 to flex the first and second arms 244A, 244B of the receptacle 240 outward so that the bias members 269 may assist in pulling the plug connector 250 away from the receptacle 240 and the detent features 257 may clear the openings 247.

Figure 20:
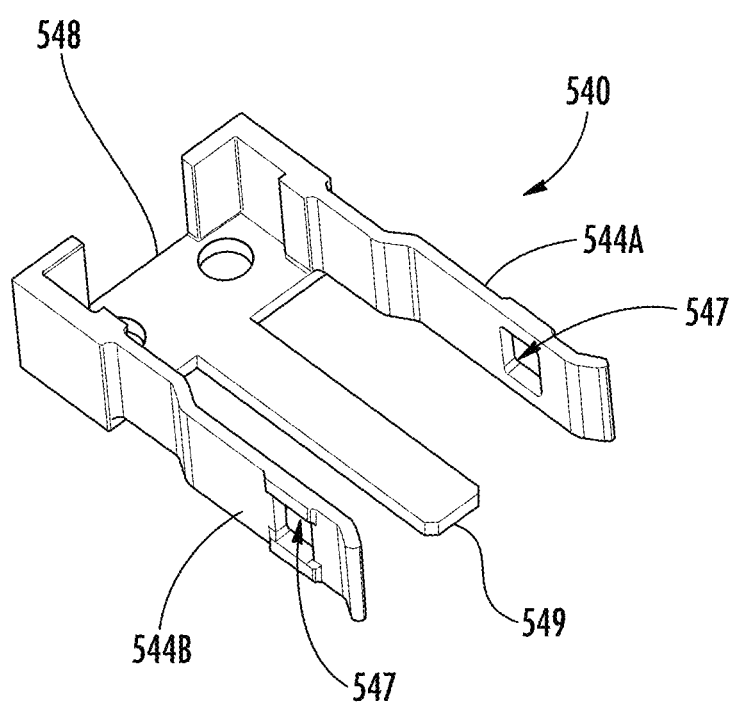
FIG. 20 schematically depicts a perspective view of another example receptacle for the example optical connector depicted in FIG. 9 according to one or more embodiments described and illustrated herein.

Other configurations of the receptacle and plug connector are also possible. Referring now to FIG. 20, an example receptacle 540 is schematically depicted. The example receptacle 540 is similar to the example receptacle 240 depicted in FIGS. 15 and 16 in that it includes first and second arms 544A and 544B extending from a seat 548. The receptacle 540 depicted in FIG. 20 further comprises at least one centering arm 549 also extending from the seat 548. As described in more detail below, the centering arm 549 is operable to be received by a corresponding centering feature (e.g., a centering notch) of a plug connector (e.g., the centering feature 553 depicted in FIGS. 22 and 24) for the prevention of rotation of the mated receptacle and plug connector upon mating. Although only one centering arm 549 is illustrated, it should be understood that more than one centering arm 549 may be provided. Further, additional engagement features (ridges, notches, posts, and the like) may also be provided on or within the centering arm 549 for engagement with the plug connector. In the illustrated embodiment, a top surface of the at least one centering arm 549 is in a plane defined by the top surface of the seat 548.

Figure 21:
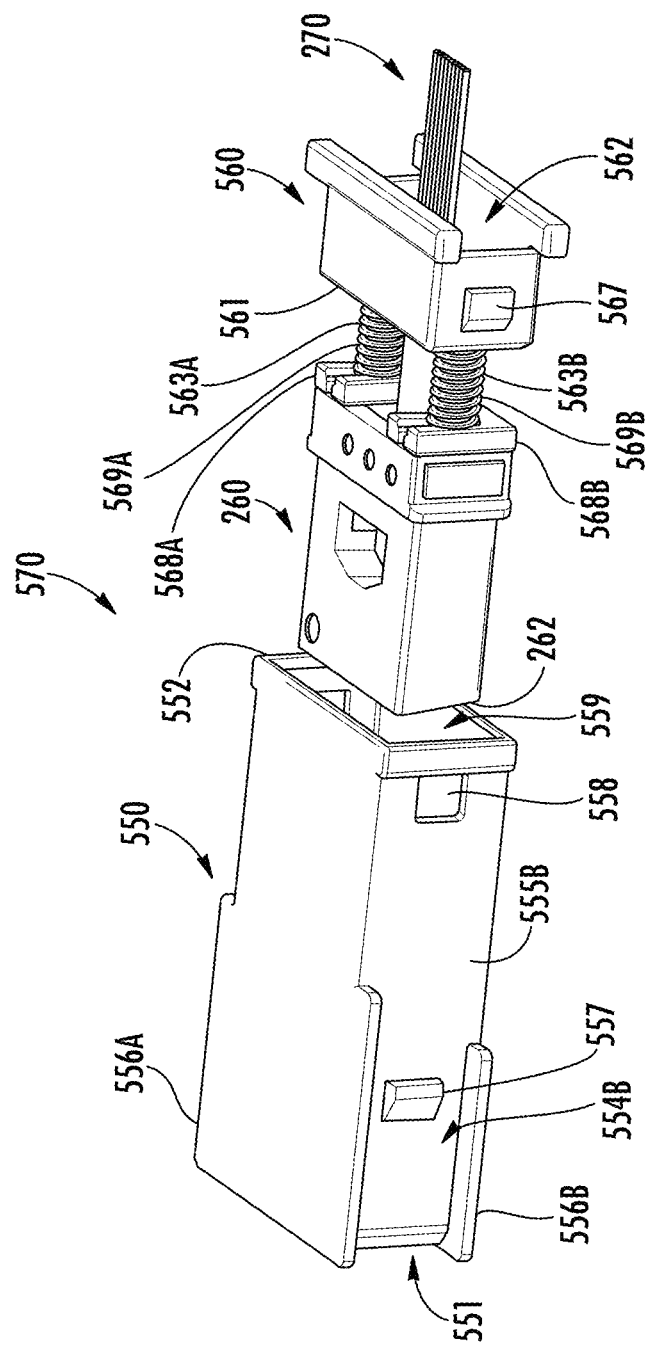
FIG. 21 schematically depicts a partial exploded perspective view of an example plug connector operable to mate with the example receptacle depicted in FIG. 20 according to one or more embodiments described and illustrated herein.
Figure 22:
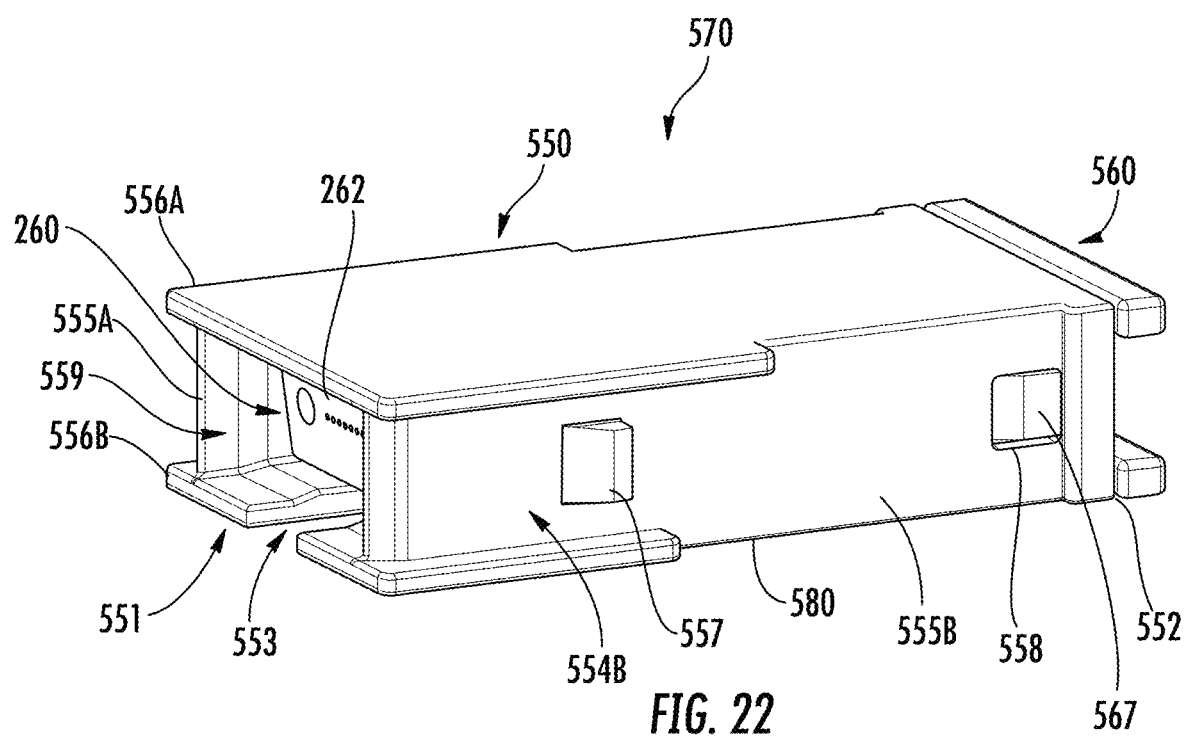
FIG. 22 schematically depicts a perspective view of the example plug connector depicted in FIG. 21 in an assembled state according to one or more embodiments described and illustrated herein.

FIGS. 21 and 22 schematically depict another example plug connector 570 operable to mate with the receptacle 540 depicted in FIG. 20. FIG. 21 depicts a plug ferrule 260 and a second plug connector body 560 prior to insertion into a first plug connector body 550. In this embodiment, the plug connector body is formed from more than one component. FIG. 22 depicts the plug connector 570 in an assembled state.

Referring to FIG. 21, the plug connector 570 generally includes a first plug connector body 550, a plug ferrule 260, a second plug connector body 560 and one or more plug optical fibers 270. The first plug connector body 550 of the example plug connector 570 fully encloses the plug ferrule 260. However, it should be understood that the first plug connector body 550 may also expose at least a portion of the plug ferrule 260. The first plug connector body 550 comprises a plug opening 559 that extends from a first end 551 to a second end 552 of the first plug connector body 550. The plug ferrule 260 is inserted into the plug opening 559 of the first plug connector body 550 through the second end 552.

The first plug connector body 251 has a first side 555A and a second side 555B, each having a detent feature 557 proximate a first end 551 of the first plug connector body 550. The openings 547 of the first and second arms 544A, 544B of the receptacle 540 are operable to receive the decent features 557, thereby securing the plug connector 570 to the receptacle 540.

The first plug connector body 550 may further include first flanges 556A and second flanges 556B extending over the first side 555A and the second side 555B, thereby defining respective first and second channels 554A, 554B for receiving the first and second arms 544A, 544B of the receptacle 540. Each of the first side 555A and the second side 555B of the first plug connector body 550 includes a body opening 558 for receiving a corresponding second detent feature 567 of the second connector body 560 to secure the second plug connector body 560 to the first plug connector body 550.

Still referring to FIG. 21, the plug ferrule 260 may be coupled to the second plug connector body 560 by first and second bias members 569A, 569B, which are illustrated as springs in the example embodiment. The first and second bias members 569A, 569B may be coupled to the plug ferrule 260 and the second plug connector body 560 by any suitable means. In the illustrated embodiment, the first and second bias members 569A, 569B are secured to the plug ferrule 260 by first and second clips 568A, 568B, respectively, to a front face 561 of the second connector body 560 by first and second posts 563A, 563B, respectively. Other means of securing the first and second bias members 569A, 569B to the plug ferrule 260 and the second connector body 560 are also possible. The one or more plug optical fibers 270 extend through an opening 562 of the second plug connector body 560, the ends of which are secured within the plug ferrule 260.

Referring to now FIG. 22, the plug ferrule 260 and the second plug connector body 560 are inserted into the plug opening 559 of the first plug connector body 550 such that the second detent features 567 are disposed within the body openings 558, thereby securing the second plug connector body 560 to the first plug connector body 550. The plug ferrule 260 is enclosed by the first plug connector body 550 and biased toward the first end 551 by first and second bias members 569A, 569B. The plug optical coupling face 262 of the plug ferrule 260 is exposed at the first end 551.

Figure 23:
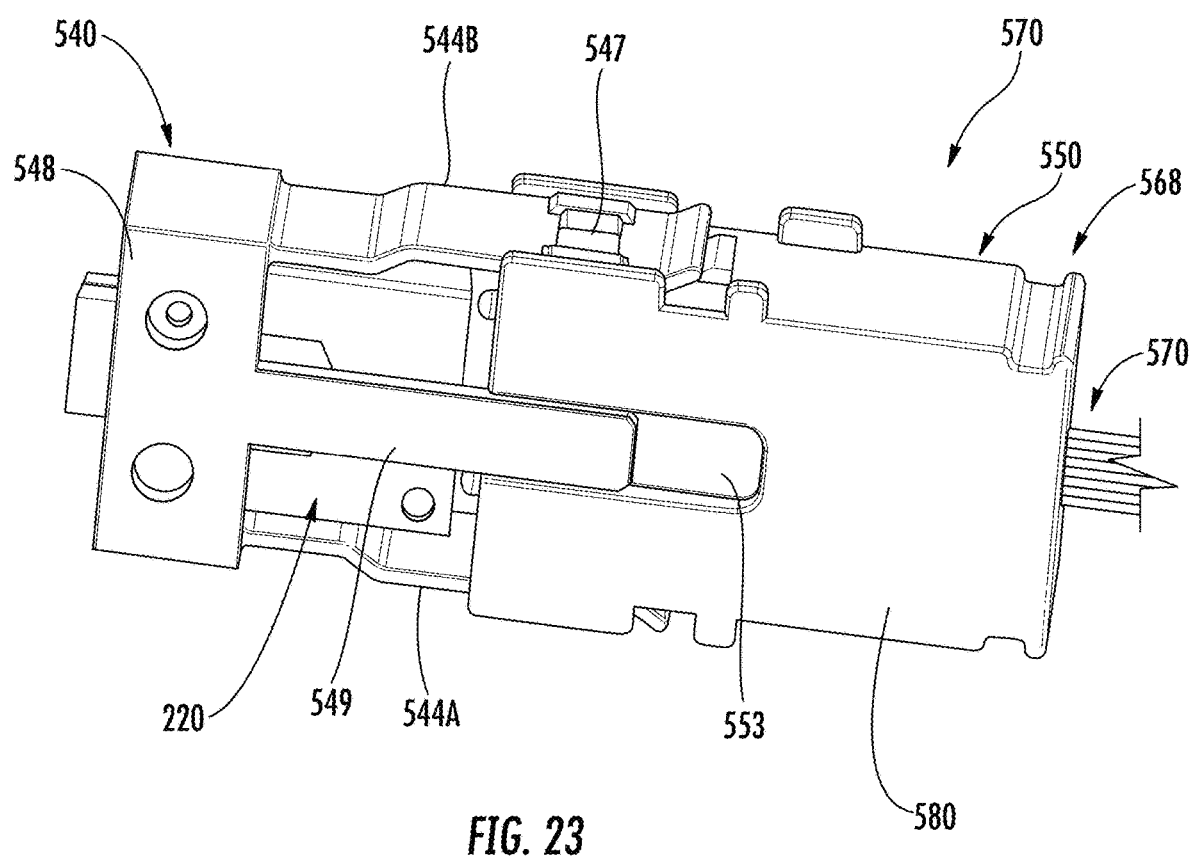
FIG. 23 schematically depicts a bottom perspective view of the example receptacle depicted in FIG. 20 mated to the example plug connector depicted in FIGS. 21 and 22 according to one or more embodiments described and illustrated herein.

As stated above, the first plug connector body 550 comprises a centering feature 553 located at a bottom surface 580 of the first connector body 550 and extending from the first end 551. Referring to FIG. 23, the centering feature 553 is configured to receive the centering arm 549 of the receptacle 540 when the plug connector 570 is inserted into the receptacle 540. In the illustrated embodiment, the centering feature 553 is configured as a notch within the bottom surface 580 of the first plug connector body 550. The centering feature 553 and the centering arm 549 cooperate to prevent lateral movement of the plug connector 570 when the plug connector 570 is mated to the receptacle 540. It is noted that the connectors are prone to rock or otherwise move sideways on entry into a receptacle when the arms of the receptacle deflect. The centering feature 553 and the centering arm 549 may inhibit such movement.

Figure 24:
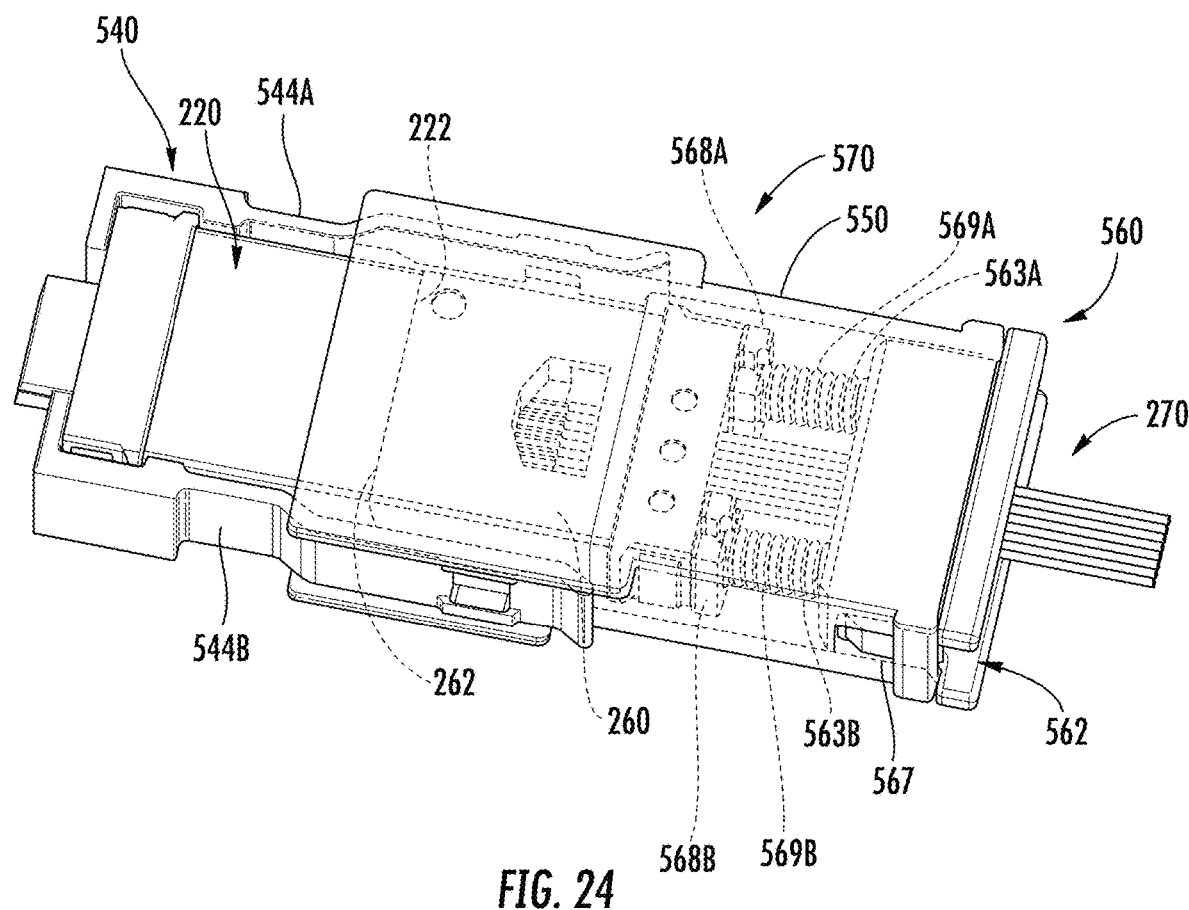
FIG. 24 schematically depicts a perspective view of the example receptacle and plug connector depicted in FIG. 23 according to one or more embodiments described and illustrated herein.

Referring now to FIG. 24, the example plug connector and receptacle of FIGS. 20-23 are schematically depicted in a mated state such that the ferrule 220, the plug ferrule 260, the first and second bias members 569A, 569B, and the second connector body 560 are visible within the first connector body. As shown in FIG. 24, the plug optical coupling face 262 of the plug ferrule 260 is coupled to the first surface 222 of the ferrule 220 of the receptacle 540 such that the one or more optical fibers 270 within the plug ferrule 260 are optically coupled to the one or more waveguides (not shown) within the ferrule 220 of the receptacle 540.

Figure 25:
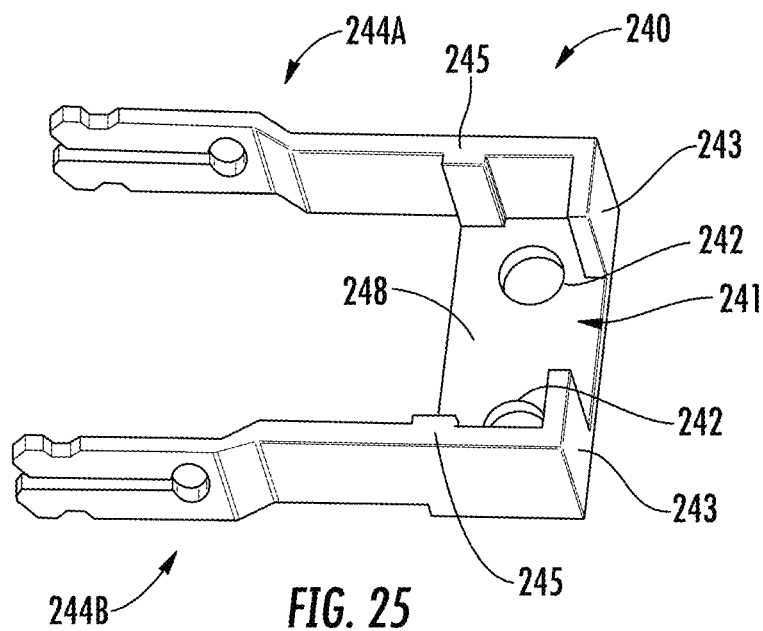
FIG. 25 schematically depicts a perspective view of another example receptacle for the example optical connector depicted in FIG. 9.
Figure 26:
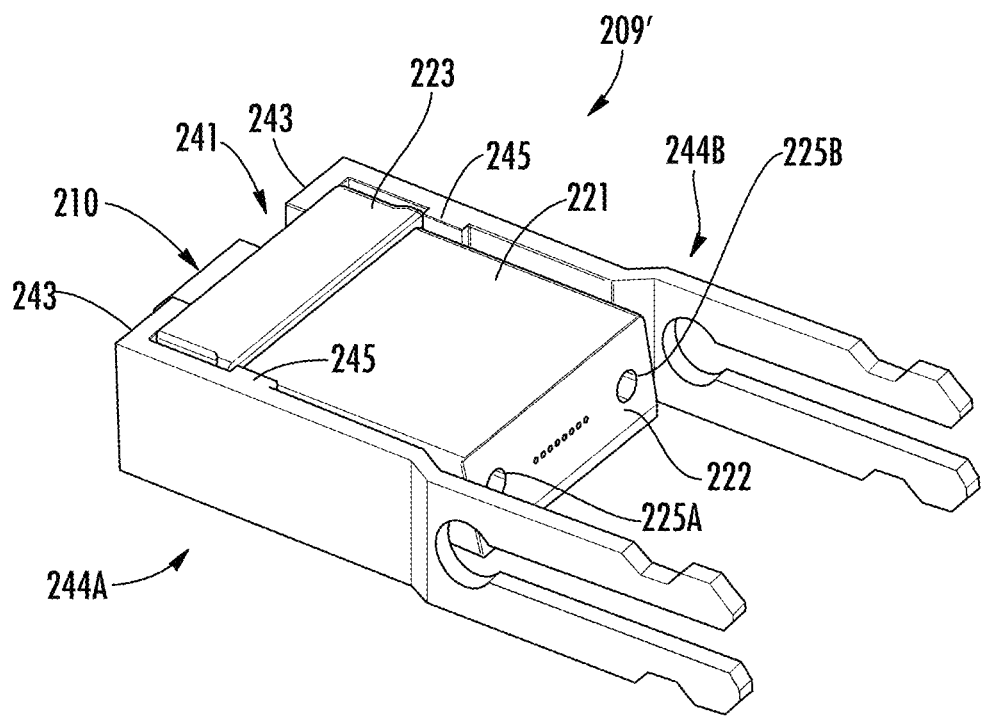
FIG. 26 schematically depicts a perspective view of the example optical connector depicted in FIG. 9 disposed within the receptacle depicted in FIG. 25.

FIGS. 25 and 26 schematically illustrate perspective views of another example receptacle 240 configured to receive a suitable ferrule such as ferrule 220, similar to the receptacle of FIG. 15. FIG. 25 illustrates the receptacle 240 without the ferrule 220. FIG. 26 illustrates the ferrule 220 disposed within the receptacle for securing an optical connection. Receptacles may have any suitable configuration for receiving ferrule to make an optical connection and may be attached to any suitable structure. Referring to both FIGS. 25 and 26, the receptacle 240 of this embodiment generally comprises a seat 248, a wall 243 extending from the seat 248, a first arm 244A extending from the seat 248 and the wall 243, and a second arm 244B extending from the seat 248 and the wall 243. The receptacle 240 may be formed from a thermally stable metal such as, without limitation, Invar or other suitable material. The receptacle 240 may be formed by a stamping process or may be machined, for example.

The receptacle 240 may include additional features for mounting to a substrate, such as a base substrate to which the optical chip 100 is mounted. As shown in FIG. 25, the seat 248 comprises two holes 242, which may be configured to mate with corresponding features of a base substrate (not shown) to which the receptacle 240 is mounted. Other types of mechanical features may be provided on the receptacle 240 for attachment to a base substrate, such as protruding pins operable to be inserted into corresponding holes of the base substrate.

The example receptacle 240 includes a protrusion 245 extending from an inner surface of each of the first and second arms 2444, 244B. As shown in FIG. 26, the flange portion 223 of the ferrule 220 is disposed on the seat 248 such that the flange portion 223 is further positioned between the wall 243 and the protrusions 245. The flange portion 223 of the ferrule 220 may be coupled to the receptacle 240 by an interference fit with the wall 243 and the protrusions 245. The ferrule 220 may also be bonded to the receptacle 240 by a thermally stable adhesive, for example. The wall 243 of this example receptacle 240 includes a notch 241. As shown in FIG. 26, the waveguide support 210 is disposed within the notch 241 such that the waveguide support 210 protrudes beyond the wall 243.

The first and second arms 244A, 244B are configured to flex or deflect when a mated plug connector is inserted into the receptacle 240, as described in more detail below. As shown in the example receptacle 240 depicted in FIGS. 25 and 26, the first and second arms 244A, 244B may have a slot (not numbered) to assist in guiding the mated plug connector toward the ferrule 220. The example first and second arms 244A, 244B may each include one or more engagement features configured as a notch (not numbered) operable to receive a detent feature 257' of a corresponding mated plug connector 250 as described in more detail below. It should be understood that embodiments may include other engagement features for removably engaging a mated optical connector.

Figure 27:
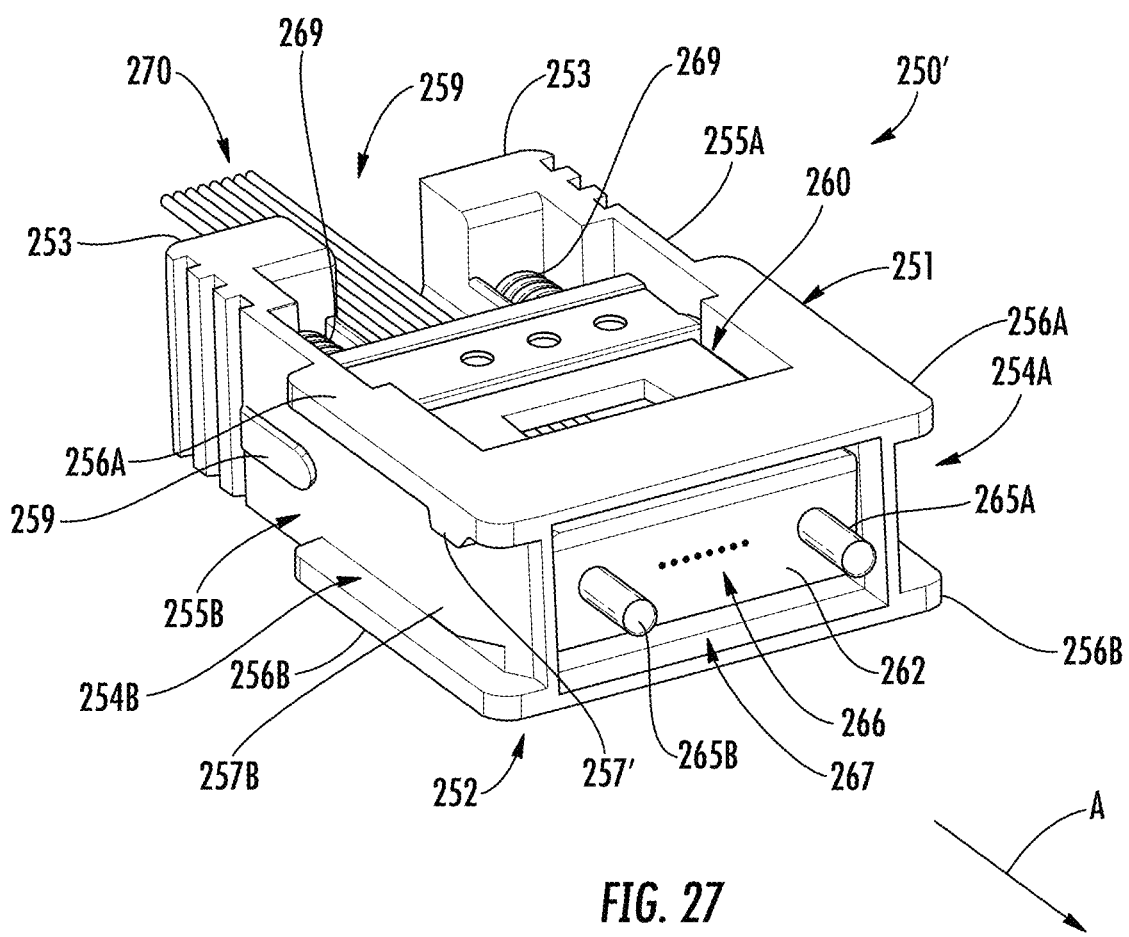
FIG. 27 schematically depicts a perspective view of an example plug connector operable to mate with the example receptacle depicted in FIG. 26.
Figure 28:
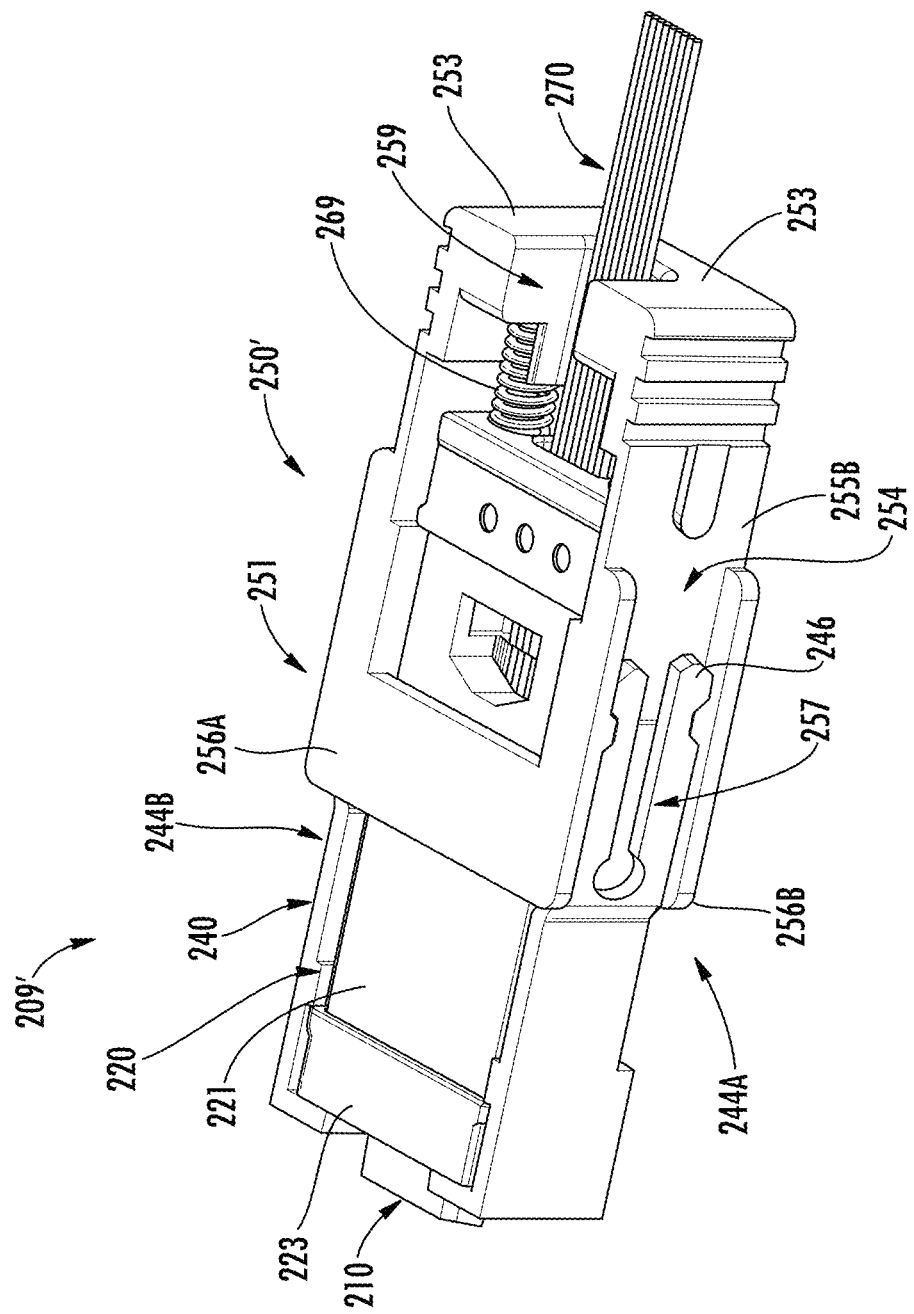
FIG. 28 schematically depicts a perspective view of the example plug connector depicted in FIG. 27 mated with the example receptacle depicted in FIG. 26.

Also disclosed are plug connectors that cooperate with the optical connectors 109, 209, 209' and 209" FIG. 27 schematically depicts an example plug connector 250' operable to be removably connected to the example optical connector 209' depicted in FIG. 26. It should be understood that the plug connector 250' depicted in FIG. 27 is explanatory and still other configurations are also possible. Generally, the plug connector 250' comprises a plug connector body 251 and a plug ferrule 260 disposed within the connector body 251. The plug connector body 251 has a first side 255A and a second side 255B each having a detent feature 257' proximate a front end 252 of the plug connector body 251. The plug connector body 251 may further include first flanges 256A and second flanges 256B extending over the first side 2554 and the second side 255B, thereby defining respective first and second channels 254A, 254B for receiving the first and second arms 244A, 244B of the receptacle 240'. FIG. 28 depicts the plug connector 250' mated with the optical connector 209'.

The embodiments described herein enable repeatable connection of optical fibers to an optical chip configured as a light wave circuit. The optical connectors described herein may be directly bonded to a surface of an optical chip, such as those used in silicon photonics communications applications, and also be configured to withstand elevated temperatures of a solder reflow process or a thereto-compression bonding process. After the solder reflow process, optical fibers of a plug connector may be repeatedly connected and disconnected as needed, such as to make different connections within a data center. Because the optical connector is capable of withstanding the solder reflow process, it may be fully tested prior to final assembly. Of course, the concepts may be used in other applications as well.

The CTE of the components of the optical connector (e.g., the ferrule or the waveguide support) substantially matches within a range the CTE of the material of the optical chip and/or active optical chip to reduce or inhibit stress at the joined interface between the optical connector and the optical chip due to thermal changes. Additionally, the edge of the optical chip to which the optical connector is bonded is mechanically protected by optical connector.

The ferrule of the optical connector provides a connection interface providing a relatively low loss. By way of example, an insertion loss of 0.5 dB or less may be possible, and the insertion loss may even be lower such as 0.25 dB or less for an angled connection interface. Further, there is a low loss interface between the optical connector and the optical chip because of an index matching interface and active alignment process. The total coupling loss provided by both interfaces may be less than 1 dB, and in some embodiments the total coupling loss is 0.5 dB or less. The alignment process may be active or passive depending on optical chip design and fabrication. The plug connector may be connected to the optical chip of the optical assembly before or after the optical assembly is packaged into a larger optical communications module (e.g., a multi-chip optical communications module or a silicon photonics module).

Embodiments of the present disclosure may also incorporate one or more additional mechanical components to provide mechanical support between the optical chip 100 and the waveguide support 110 and/or the ferrule 220. These additional mechanical components may reduce misalignment between optical elements due to elevated temperatures, such as during a solder reflow process (e.g., a peak of 260° C. for 10 seconds), or misalignment due to external forces, such as external forces due to mating and/or demating of the ferrule 220 with a connector.

Figure 29A:
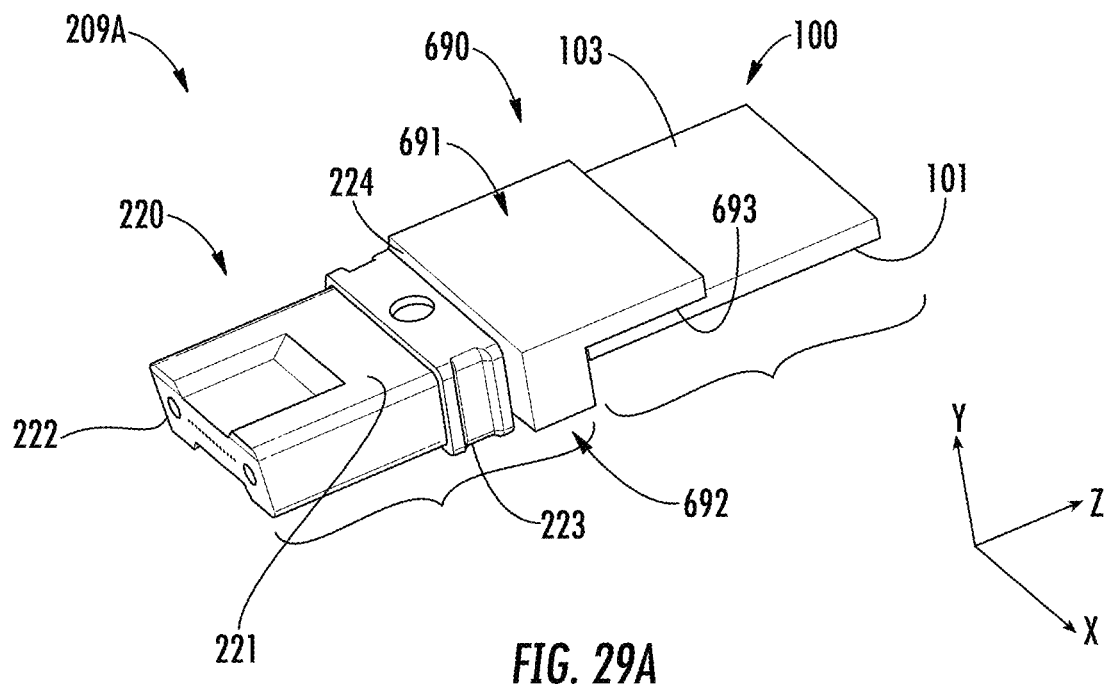
FIG. 29A schematically depicts a top perspective view of an example optical connector and optical chip comprising an example connector support according to one or more embodiments described and illustrated herein.
Figure 29B:
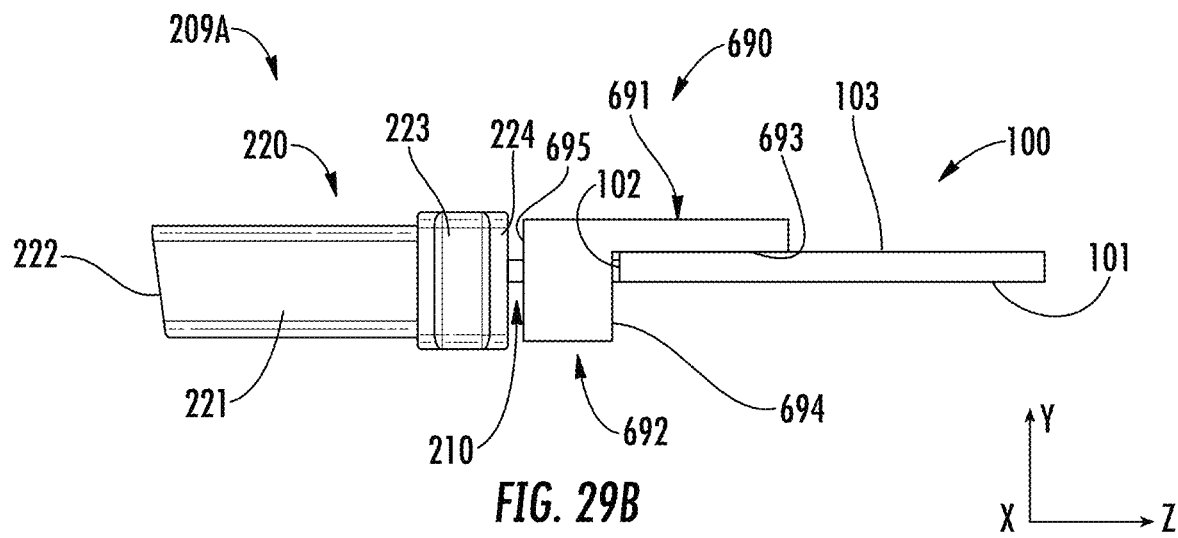
FIG. 29B schematically depicts a side elevation view of the optical connector, optical chip, and connector support depicted by FIG. 29A.
Figure 29C:
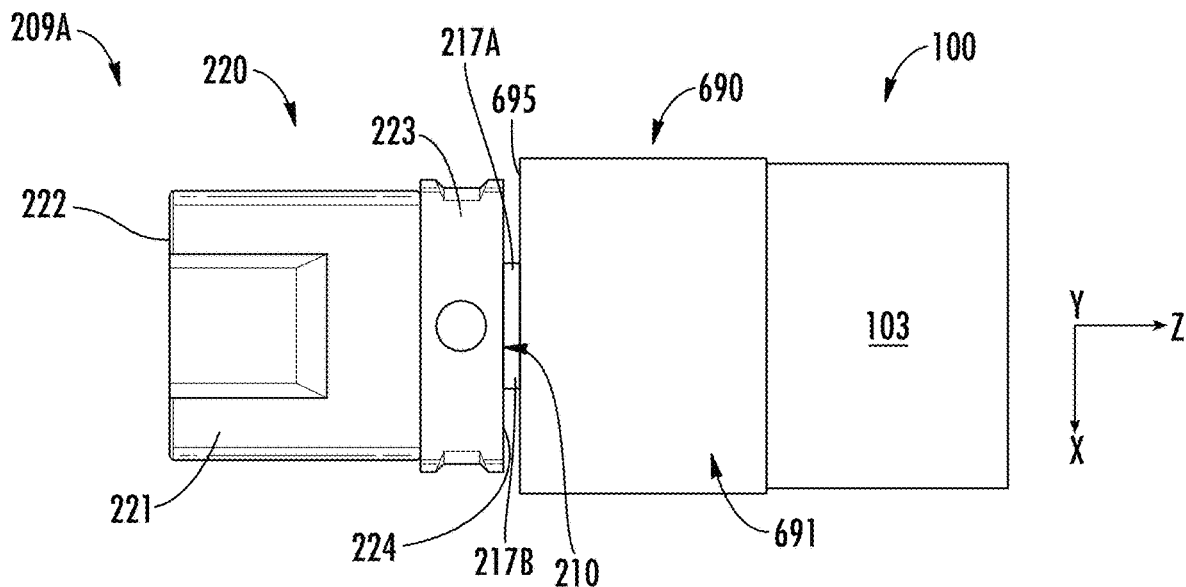
FIG. 29C schematically depicts a top view of the optical connector, optical chip, and connector support depicted by FIG. 29A.
Figure 29D:
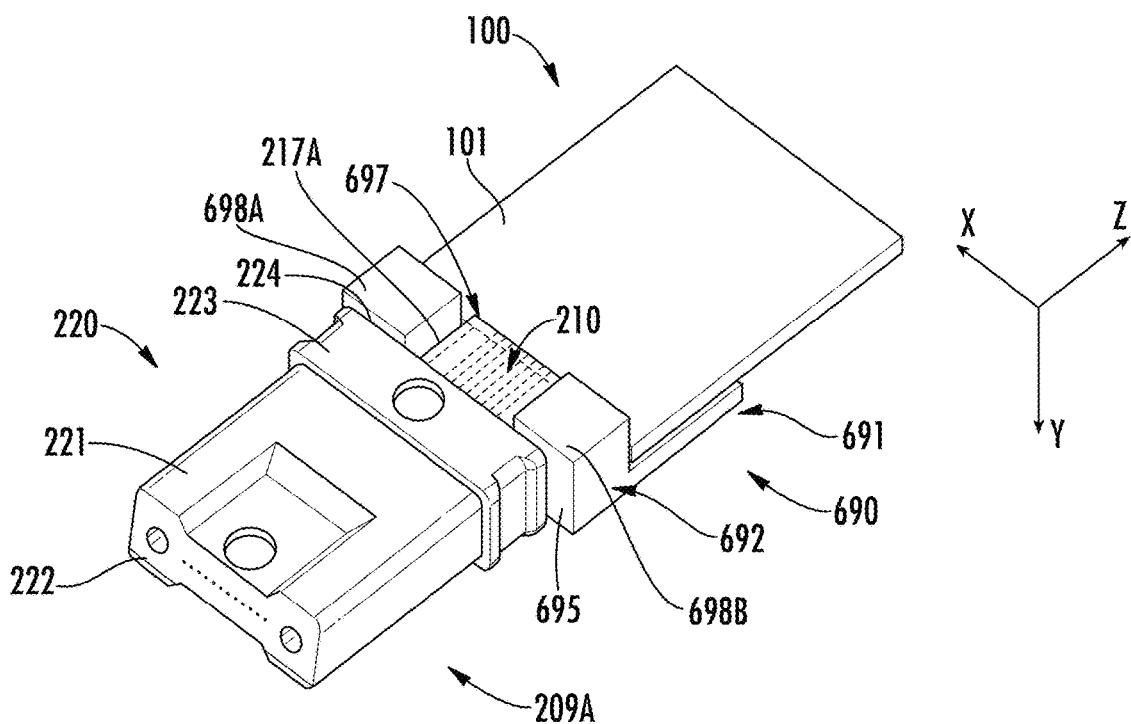
FIG. 29D schematically depicts a bottom perspective view of the optical connector, optical chip, and connector support depicted by FIG. 29A.

Referring now to FIGS. 294-29D, an example optical connector 209A and an example optical chip 100 are schematically illustrated. FIG. 29A is a top perspective view, FIG. 29B is a side elevation view, FIG. 29C is a top view, and FIG. 29D is a bottom perspective view. The example optical connector 209A comprises a ferrule 220 and a waveguide support 210 such as described above and illustrated by FIG. 7. As described with respect to FIG. 7, the chip coupling surface 212 of the waveguide support 210 is coupled to the edge 102 of the optical chip 100 such that the one or more waveguides 230 of the waveguide support 210 are optically coupled to the one or more chip waveguides 106 of the optical chip 100.

The example optical connector 209A further comprises a connector support 690 that is coupled to the optical chip 100 and the waveguide support 210 to provide a more robust mechanical connection between the waveguide support 210 and the optical chip 100. In the illustrated example, the connector support 690 comprises a first portion 691 and a second portion 692. The first portion 691 is orthogonal to the second portion 692 such that the connector support. 690 has an "L" shape. However, embodiments are not limited thereto. For example, the first portion 691 may be transverse to the second portion 692 but not orthogonal thereto. The connector support 690 may be fabricated from a material (or a plurality of materials) having a CTE that closely matches the CTE of the optical chip 100 and/or the ferrule such as, without limitation, silicon or glass.

The first portion 691 has a bottom surface 693 that is coupled to a surface 103 of the optical chip 100. Surface 103 is the surface of the optical chip 100 that is opposite of the surface 101 proximate the one or more chip waveguides 106. The bottom surface 693 of the first portion 691 may be secured to the surface 103 of the optical chip 100 by an adhesive, for example.

Referring to FIG. 29D, the second portion 692 comprises a first tab 698A and a second tab 698B defining a notch 697 therebetween. The notch 697 provides a space to receive the waveguide support 210. The bottom surface 693 of the first portion 691 is also coupled to a top surface of the waveguide support 210. Further, the first tab 698A is coupled to a first side 217A of the waveguide support 210 and the second tab 698B is coupled to a second side 2173 of the waveguide support 210. The second portion 692 may be coupled to the waveguide support 210 by an adhesive, for example.

The connector support 690 provides multiple mechanical interfaces between the optical connector 209A and optical chip 100, and therefore a large bond area for the adhesive. Thus, the connector support 690 provides a strong lateral mechanical plane that avoids mechanical stress to the optical interface between the edge 102 of the optical chip 100 and the chip coupling surface 212 of the waveguide support 210.

Figure 30A:
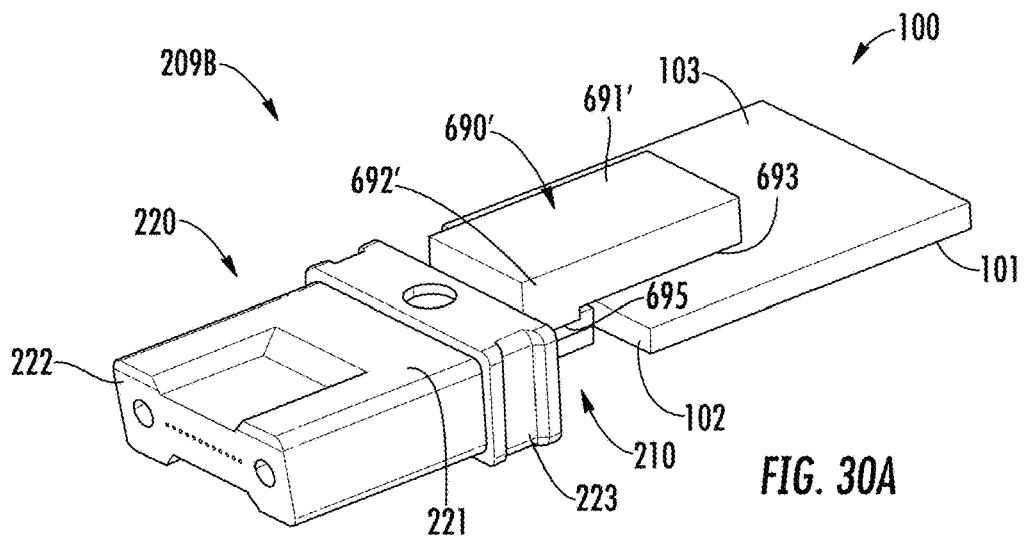
FIG. 30A schematically depicts a top perspective view of an example optical connector and optical chip comprising another example connector support according to one or more embodiments described and illustrated herein.
Figure 30B:
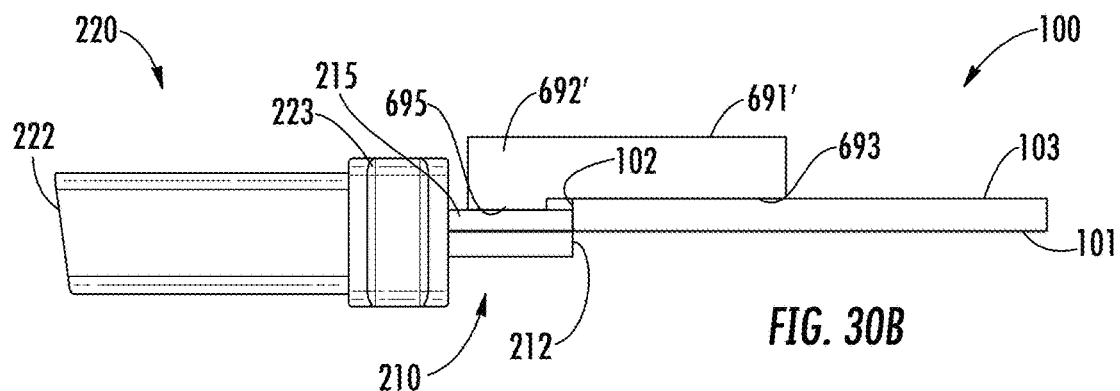
FIG. 30B schematically depicts a side elevation view of the optical connector, optical chip, and connector support depicted by FIG. 30A.
Figure 30C:
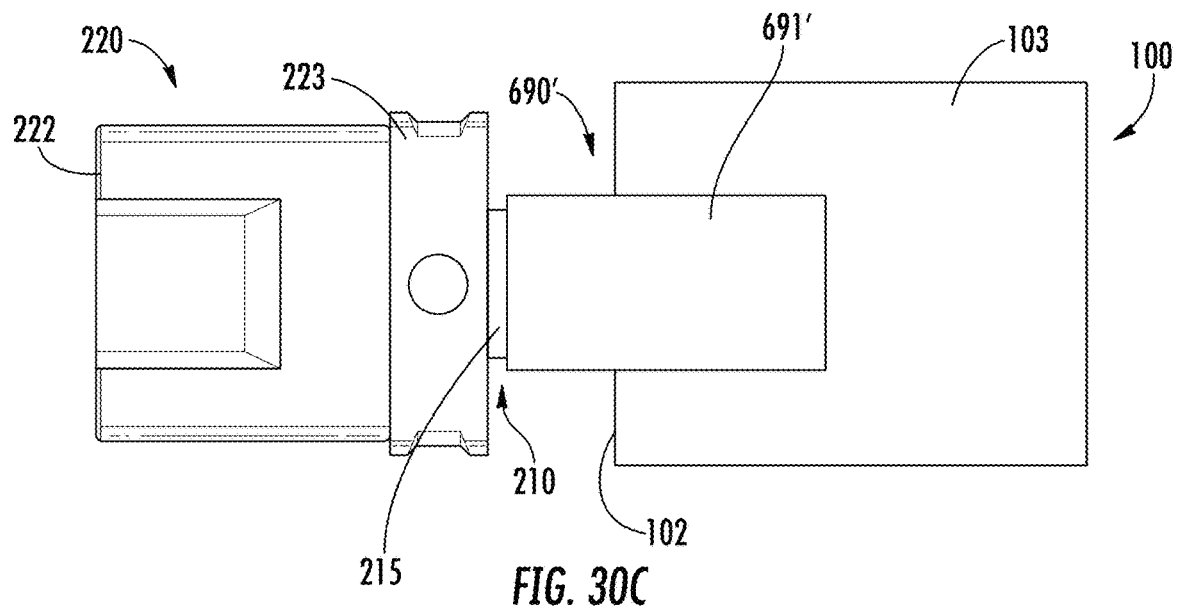
FIG. 30C schematically depicts a top view of the optical connector, optical chip, and connector support depicted by FIG. 30A.

FIGS. 30A-30C schematically illustrate another optical connector 209B with another example connector support 690'. The example connector support 690' has a first portion 691' and a second portion 692' similar to the connector support 690 depicted in FIGS. 29A-29D. However, the second portion 692' does not include tabs 698A. 698B. Rather, a bottom surface 695 of the second portion 692' is coupled to a surface 215 of the waveguide support 210 (e.g., by an adhesive). The contact between the connector support 690' and the optical chip 100 and the waveguide support 210 provides additional mechanical support providing a more robust connection between the optical connector 209B and the optical chip 100.

Figure 31A:
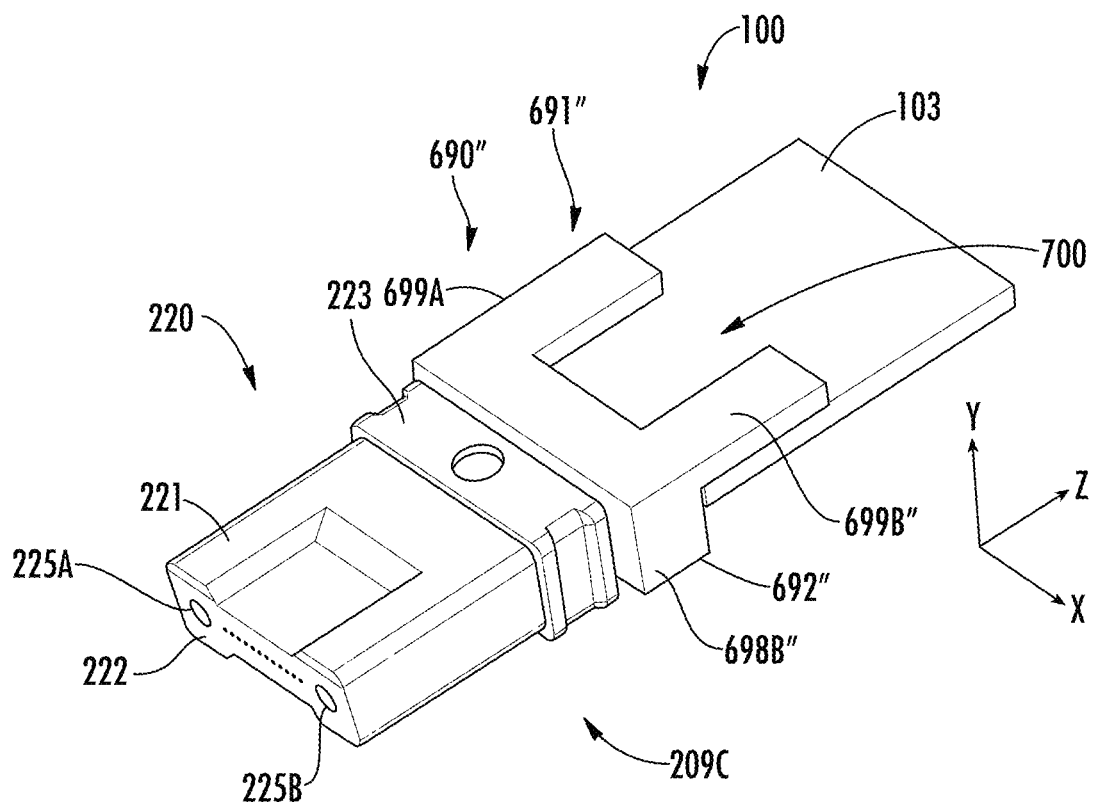
FIG. 31A schematically depicts a top perspective view of an example optical connector, optical chip and another example connector support according to one or more embodiments described and illustrated herein.
Figure 31B:
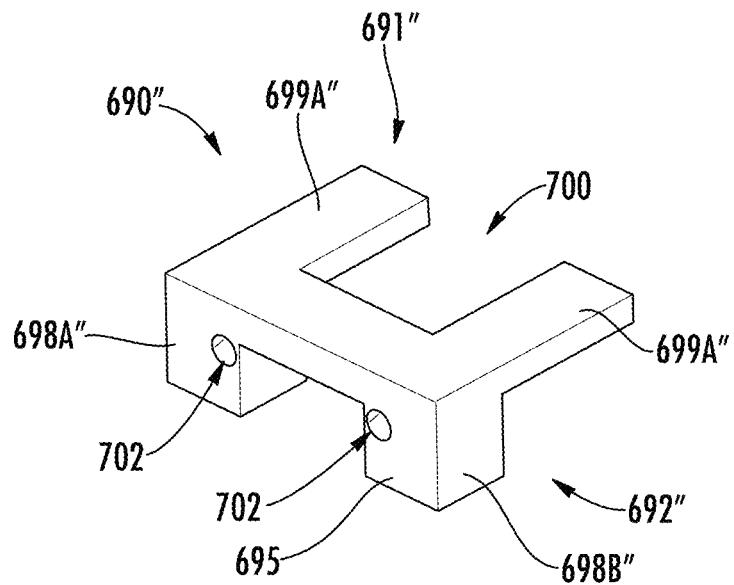
FIG. 31B schematically depicts a top perspective view of the example connector support depicted by FIG. 31A.
Figure 31C:
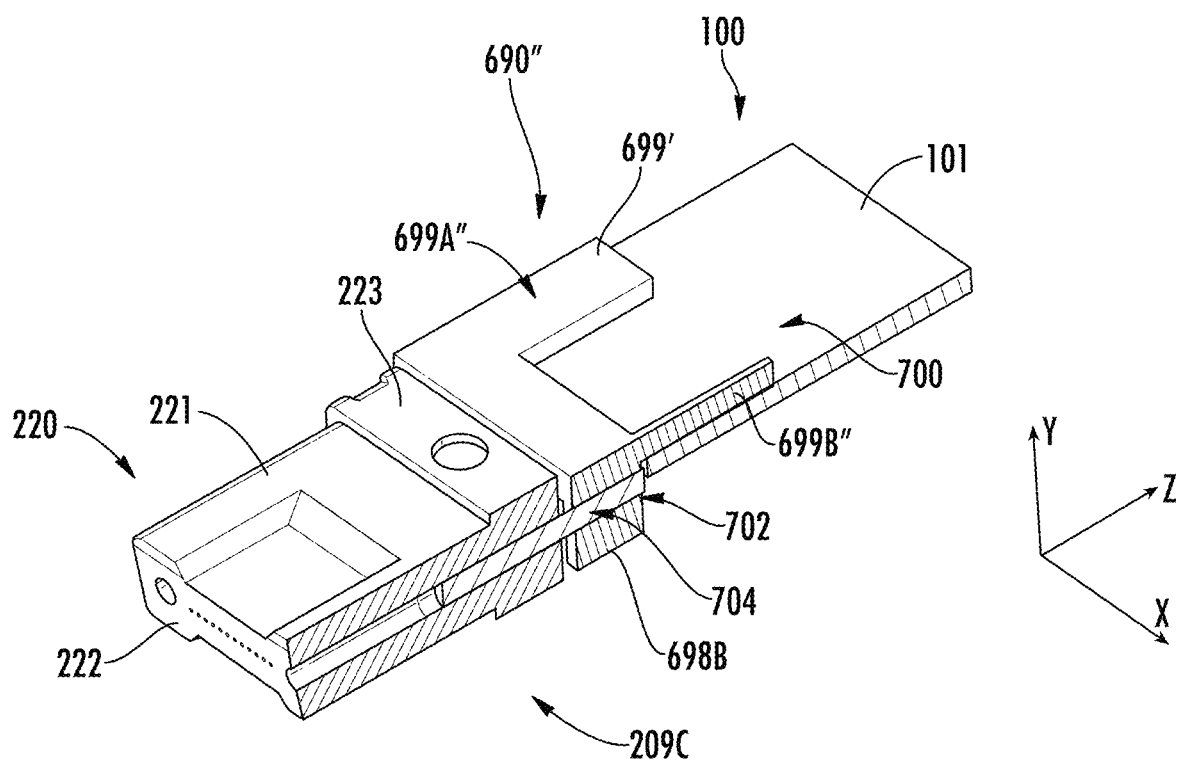
FIG. 31C schematically depicts a top perspective, cut-away view of the optical connector, optical chip and connector support depicted by FIG. 31A.

Other configurations for the connector support are also possible. FIGS. 31A-31C schematically illustrate another optical connector 209C with another example connector support 690". The example connector support 690" comprises a first portion 691" and a second portion 691". The second portion 691" includes first and second tabs 698A" and 6983" similar to the connector support 690 illustrated by FIGS. 29A-29D. The first portion 691" comprises a cutout region 700. One or more cutout regions 700 may be provided to accommodate other components that may be present on the surface 103 of the optical chip 100 (e.g., electrical components, optical components, and/or mechanical components). In the illustrated embodiment, the cutout region 700 is disposed between a first arm 699A" and a second arm 699B". It should be understood that one or more cutout regions 700 may be provided in any of the embodiments described herein (e.g., the embodiment depicted in FIGS. 30A-30C.

Other components may also be provided to increase mechanical robustness of the connection between the optical connector 209C and the optical chip 100. FIGS. 31B and 31C depict connector bores 702 within the second portion 692" of the connector support 690". In the illustrated embodiment, a connector bore 702 is within the first tab 698A" and the second tab 698B".

Alignment pins 704 are disposed within the ferrule 220 and are configured to be inserted into the connector bores 702 of the connector support 690". The cooperation between the alignment pins 704 and connector bores 702 may prevent misalignment due to CTE mismatches and external forces during mating and demating of an external connector to the optical connector 209C. This provides a strong mechanical axis and protects the misalignment of the connector support 690" and the ferrule 220 against tilt and lateral shift.

It should be understood that alignment pins and alignment bores may be provided in any of the embodiments described herein. Although not shown in FIGS. 31A-31C, the optical chip 100 may also include chip bores that are aligned with the connector bores 702 and configured to receive the alignment pins 704.

Figure 32A:
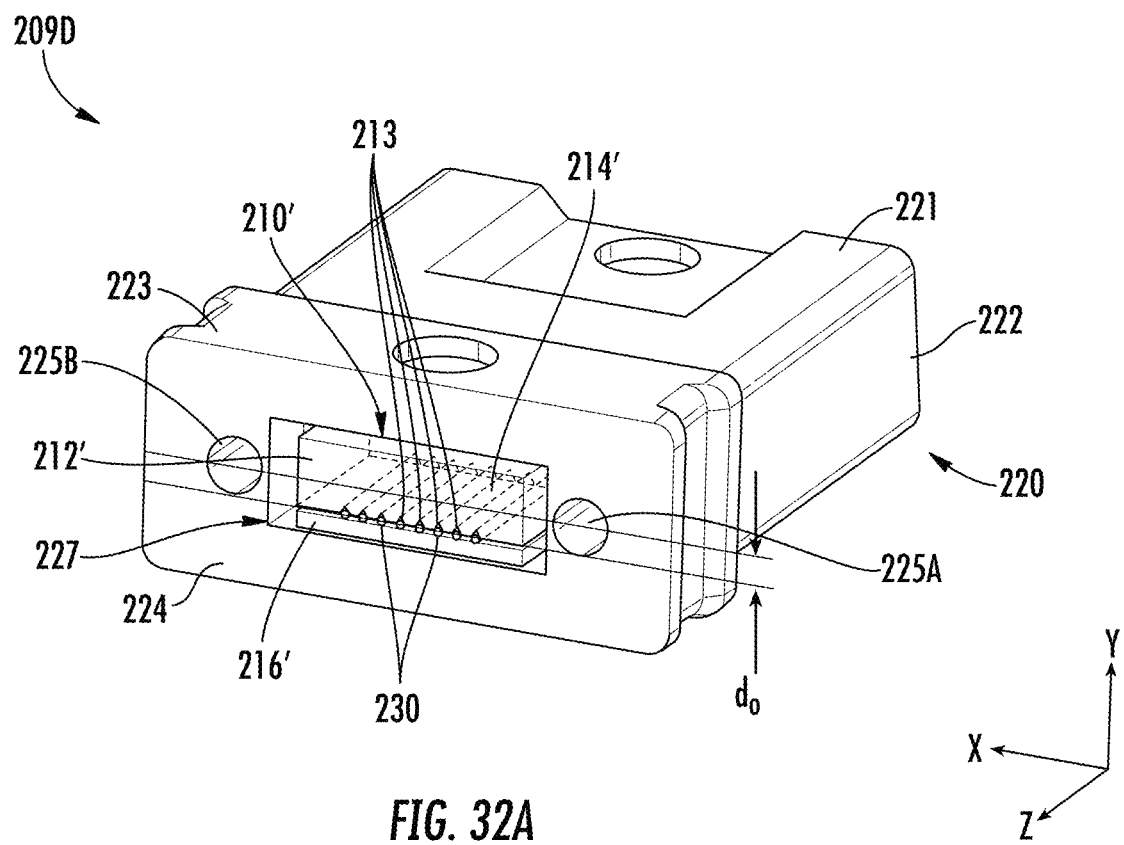
FIG. 32A schematically depicts a perspective view of an example connector including an example ferrule and an example waveguide support according to one or more embodiments described and illustrated herein.

FIGS. 32A-32D schematically depict another example embodiment of an optical connector 209D and an optical chip 100. Referring to FIG. 32A, the example optical connector 209D has a ferrule 220 similar to the ferrule 220 described above with respect to FIGS. 29A-29D, 30A-30C, and 31A-31C. The waveguide support 210' is disposed within the opening 227 at the second surface 224. The example waveguide support 210' comprises a support portion 214' and a cover portion 216'. In the illustrated embodiment, the support portion 214' includes one or more grooves 213 to receive and align one or more waveguides 230, such as one or more optical fibers. It should be understood that either, both or neither of the support portion 214' and the cover portion 216' may include grooves 213. The cover portion 216' may be secured to the support portion 214' by use of an adhesive, for example. The waveguide support 210 may also be secured within the opening 227 by an adhesive. The adhesives utilized in the optical connector 209D should be thermo stable, such as such as a polymer, an organic-inorganic hybrid polymer, or by a thermo stable adhesive free bonding material such as, without limitation, a sol-gel. The adhesive can be selected that maintains suitable alignment and securing after being processed through a solder reflow process.

Figure 32B:
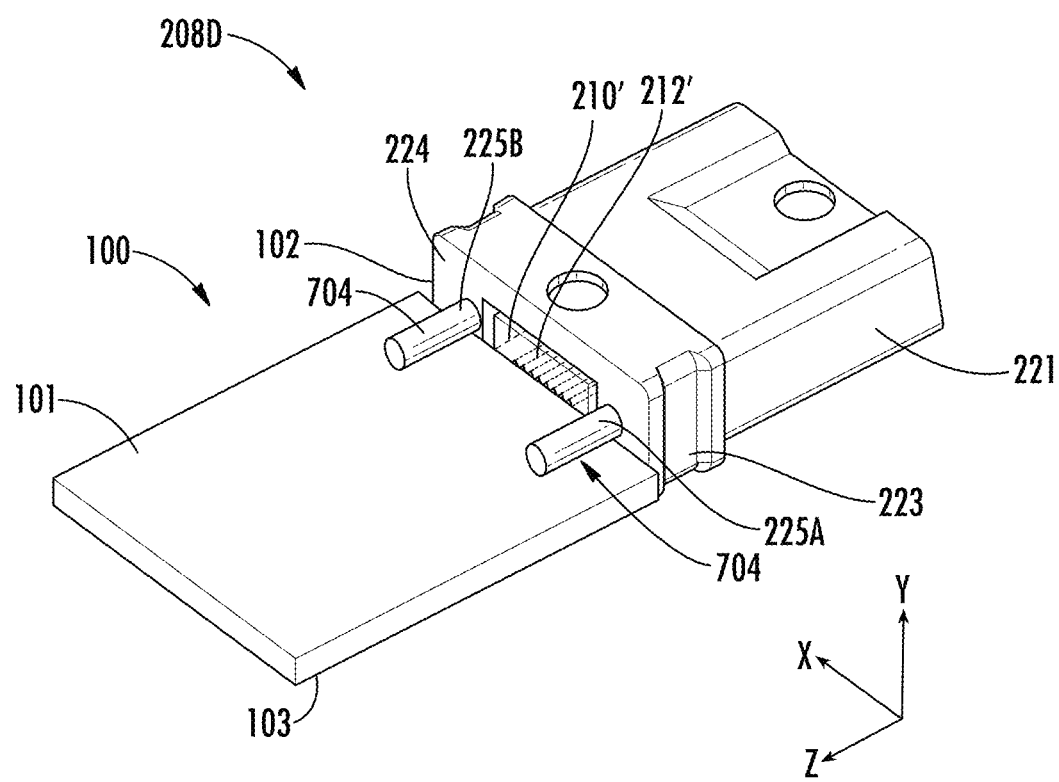
FIG. 32B schematically depicts a top perspective view of the connector depicted by FIG. 32A partially coupled to an optical chip according to one or more embodiments described and illustrated herein.

The chip coupling surface 212' of the waveguide support 210' protrudes beyond the second surface 224 of the body portion 221 of the ferrule 220 for contact with the edge 102 of the optical chip, as described with respect to FIG. 32B. The body portion 221 comprises a first alignment bore 225A and a second alignment bore 225B. The grooves 213 of the cover portion 216' of the waveguide support 210' are positioned such that the central axis of the optical fibers 130 is offset from the central axis of the first and second alignment bores 225A, 225B by an offset distance $d_o$. However, on the first surface 222 of the body portion 221, the central axis of the optical fibers 130 and the central axis of the first and second alignment bores 225A, 225B are within the same plane (see FIG. 29D). Therefore, the optical fibers 130 may be bent within the opening 227 of the body portion 221 of the ferrule 220.

Alignment pins 704 are disposed within the first and second alignment bores 225A. 225B. The optical connector 209D is coupled to the optical chip 100 such that the alignment pins 704 are disposed on the surface 101 of the optical chip proximate the chip waveguides 106, and the chip coupling surface 212' contacts the edge 102 of the optical chip 100. The chip coupling surface 212' may be secured to the edge 102 of the optical chip 100 by an adhesive, for example. The offset distance $d_o$ allows for the optical fibers 130 to be aligned with the chip waveguides 106 (not shown) in a plane parallel to the x-axis. In this embodiment, the chip waveguides 106 are close to the surface 101 of the optical chip 100 (e.g., 10 μm-30 μm).

Figure 32C:
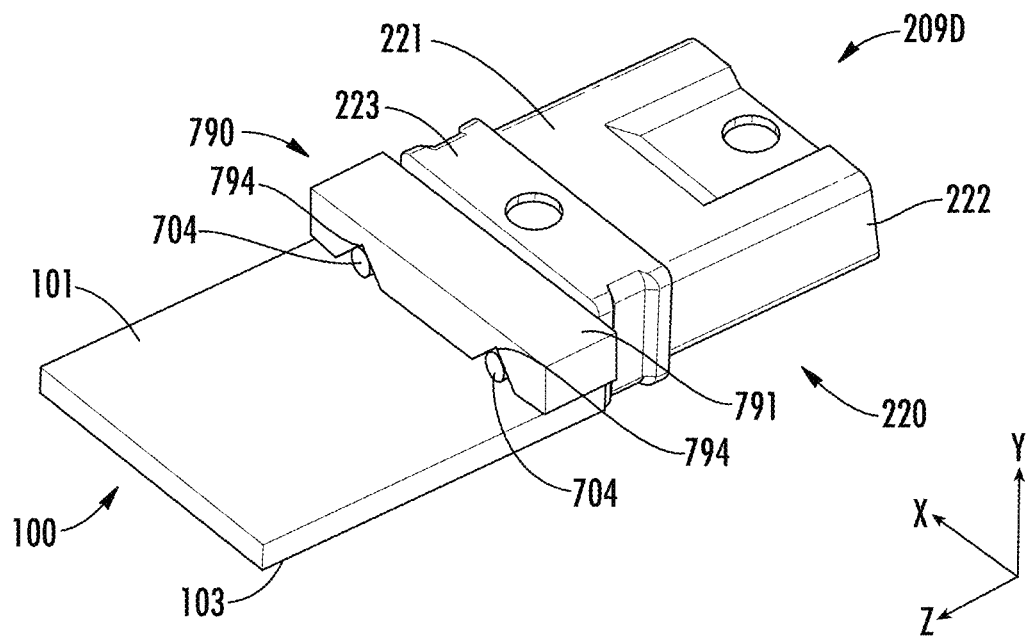
FIG. 32C schematically depicts a top perspective view of the connector coupled to the optical chip depicted by FIG. 32B utilizing an example connector support according to one or more embodiments described and illustrated herein.
Figure 32D:
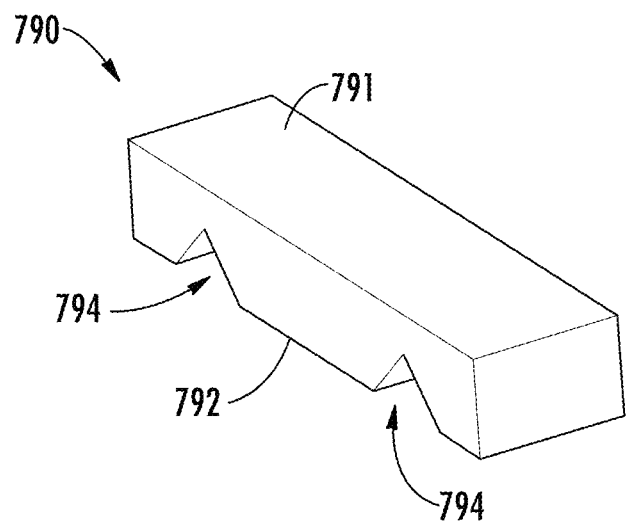
FIG. 32D schematically depicts a perspective view of the example connector support shown by FIG. 32C.

Referring to FIGS. 32C and 32D, a connector support 790 secures the alignment pins 704 to the surface 101 of the optical chip 100. The connector support 790 may be fabricated from a material having a CTE that is similar to the CTE of the optical chip and/or waveguide support 210', such as glass. The connector support 790 has an upper surface 791 and a bottom surface 792. The bottom surface 792 has alignment grooves 794, which may be configured as V-grooves, for example. The alignment pins 704 are disposed within the alignment grooves 794 such that they are between the surface 101 of the optical chip 100 and the connector support 790. The connector support 790 may be secured to the alignment pins 704, the surface 101 of the optical chip 100, and the chip coupling surface 212' of the waveguide support 210' by an adhesive.

Figure 33A:
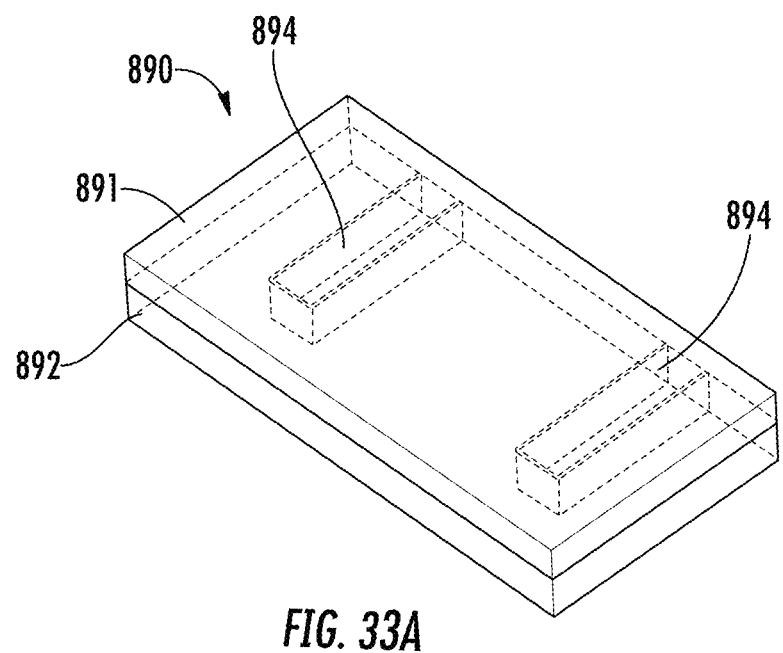
FIG. 33A schematically depicts a perspective view of another connector support according to one or more embodiments described and illustrated herein.
Figure 33B:
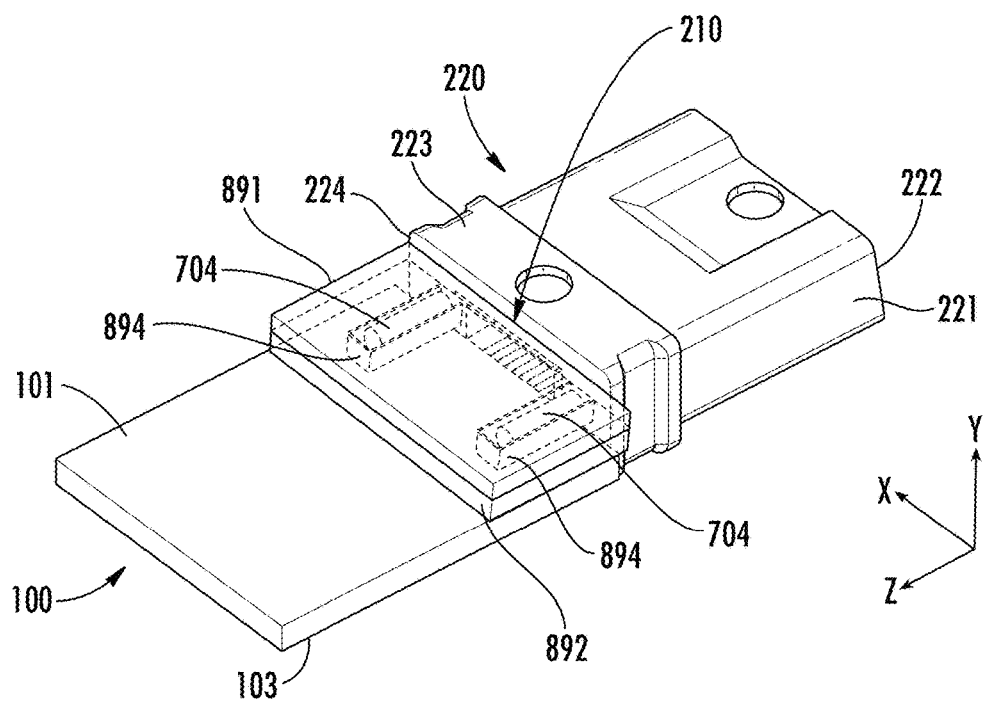
FIG. 33B schematically depicts a perspective view of an example optical connector coupled to an example optical chip using the connector support, depicted by FIG. 33A according to one or more embodiments described and illustrated herein.

FIG. 33A schematically depicts another example connector support 890 for receiving alignment pins. The example connector support 890 comprises a support portion 892 and a cover portion 891. The support portion 892 and the cover portion 891 may be fabricated from a material having a CTE that is similar to the CTE of the optical chip 100 and/or the waveguide support 210', such as glass. The support portion 892 has alignment slots 894 configured to receive alignment pins 704, as shown in FIG. 33B. The alignment slots 894 may be rectangular as shown in FIG. 33A, V-grooved, curved, or any other shape. The alignment slots 894 have dimensions that correspond to the dimensions of the alignment pins 704. The cover portion 891 is coupled to the support portion 892 such that the alignment pins 704 are within the alignment slots 894 and are disposed between the support portion 892 and the cover portion 891 as shown in FIG. 33B. The connector support 890 may be coupled to the surface 101 of the optical chip by an adhesive. The cover portion 891 may also be coupled to the support portion 892 by an adhesive. In all embodiments described herein, the bond gap of the adhesive should be minimized to avoid any misalignment because of adhesive expansion or shrinkage during thermal treatment or curing.

Figure 34A:
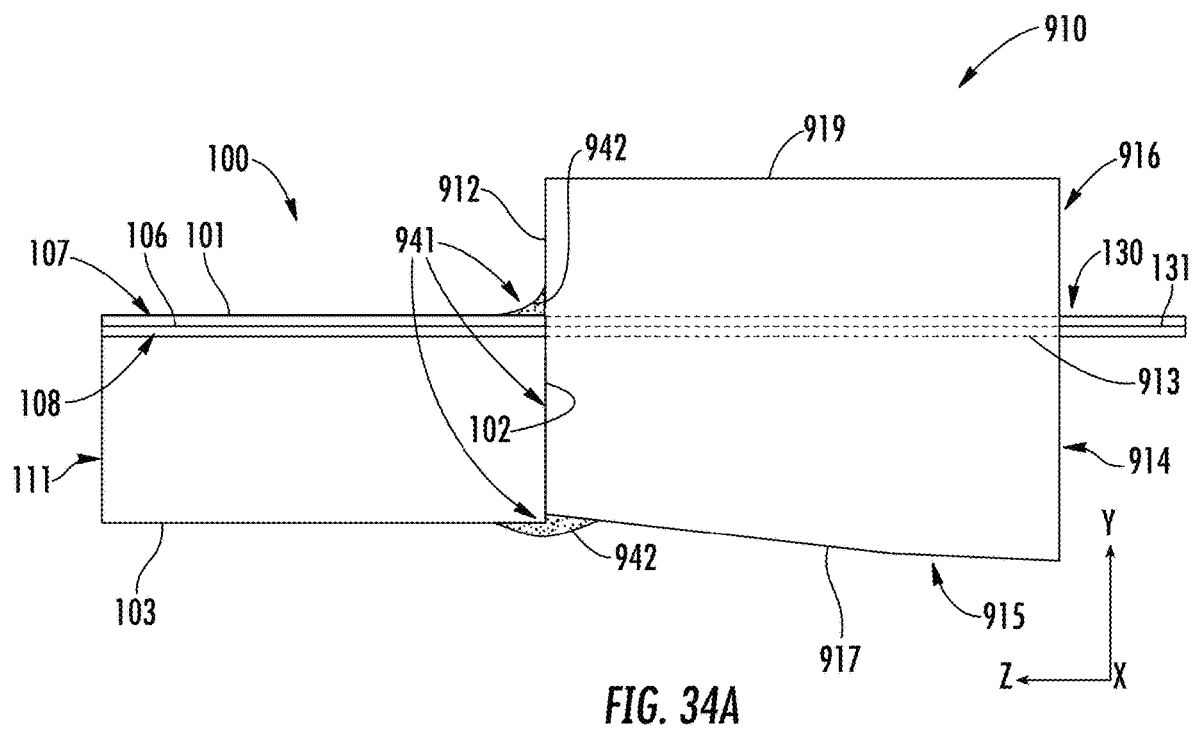
FIG. 34A schematically depicts a side elevation view of an example optical chip coupled to an example waveguide support having a support portion with an angled surface according to one or more embodiments described and illustrated herein.

Another approach to using a connector support to reinforce a connector/optical chip interface comprises wedged surfaces on the connector support and the waveguide support. FIG. 34A schematically depicts an edge 102 of an example optical chip 100 coupled to a chip coupling surface 912 of an example waveguide support 910 by an adhesive 941, such as a thermal cured or UV-cured adhesive as described herein. However, adhesive fillets 942 may form at the top and bottom of the interface between the chip coupling surface 912 and the edge 102 of the optical chip 100.

In the illustrated embodiment, the optical chip 100 comprises an overclad layer 107, an underclad layer 108 and one or more chip waveguides 106 therebetween. The underclad layer 108 is coupled to a substrate 111, such as a silicon or glass substrate.

The example waveguide support 910 has a first surface 915 defined by the support portion 914 and a second surface 919 defined by the cover portion 916. The first surface 915 is opposite from the first surface 915. The first surface 915 has an angled portion 917 that is angled with respect to the second surface. In other words, the angled portion 917 is angled with respect to a plane parallel to the z-axis as shown in FIG. 34A. The entire first surface 915 may be angled or only a portion may be angled as shown in FIG. 34A. The advantage of the angled portion 917 is that the need for precision alignment is avoided because lateral movement of the connector support 990 (FIG. 34B) can cause the gap between the edge 102 of the optical chip 100 and the chip coupling surface 912 of the waveguide support 910 to be adjusted. As non-limiting examples, the angle of the angled portion 917 may be greater than 0 degrees and less than or equal to 10 degrees, greater than or equal to 2 degrees and less than or equal to 8 degrees, greater than or equal to 3 degrees and less than or equal to 8 degrees, or 6 degrees with respect to the z-axis. Other angles may be provided. 6 degrees may provide a balance between vertical tuning distance and horizontal substrate length.

Figure 34B:
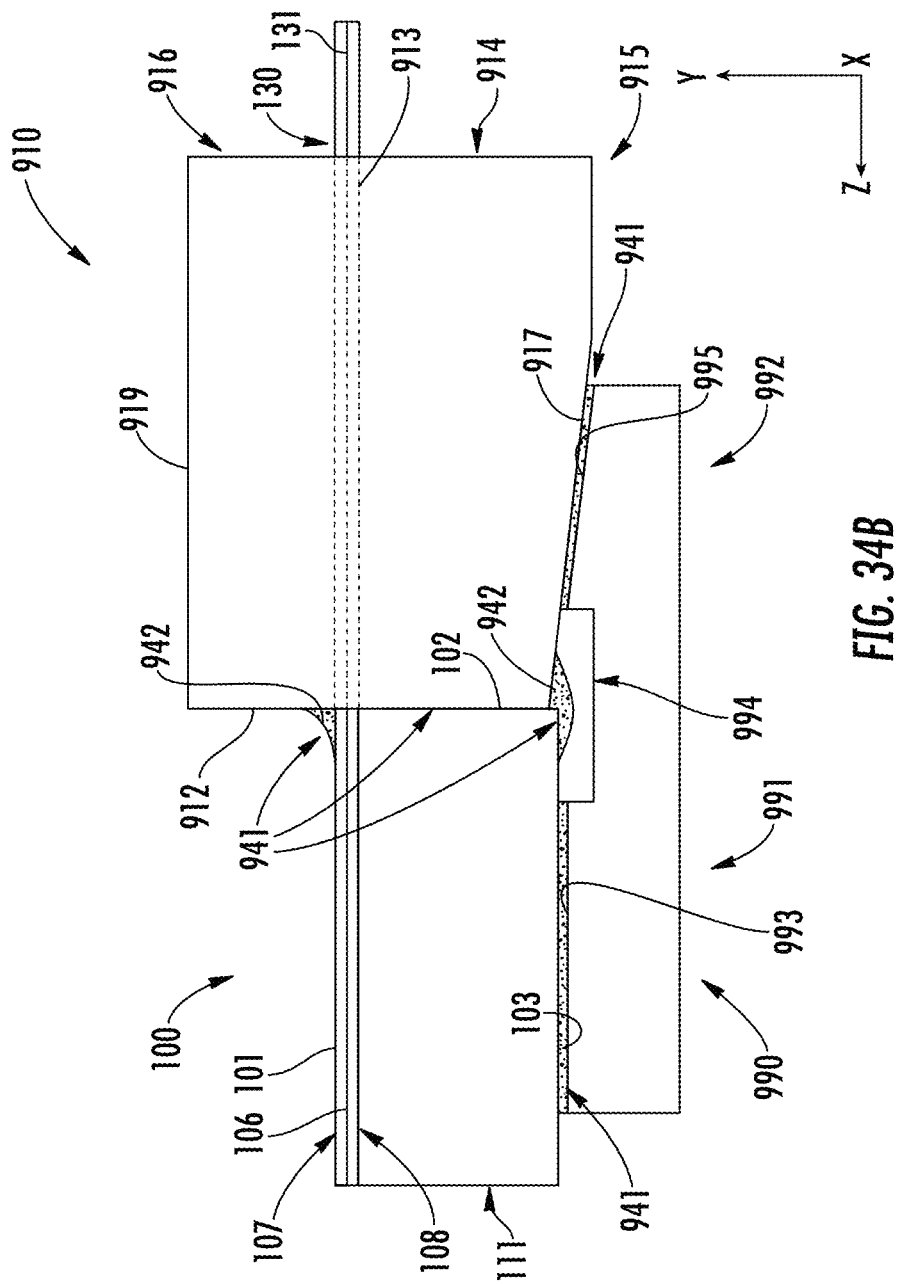
FIG. 34B schematically depicts a side elevation view of an example connector support coupled to the optical chip and the waveguide support depicted by FIG. 34A according to one or more embodiments described and illustrated herein.

Referring to FIG. 34B, the example connector support 990 is coupled to the optical chip 100 and the waveguide support 910. The connector support 990 includes a first portion 991 and a second portion 992. The second portion 992 has an angled surface 995 having an angle that corresponds to the angle of the angled portion 917 of the waveguide support 910. For example, the angled portion 917 has an angle of negative x degrees with respect the z-axis, the angled surface 995 has an angle of positive x degrees with respect to the z-axis. The angled surface 995 and the angled portion 917 of the waveguide support 910 are coupled together by an adhesive 941. Thus, in the illustrated embodiment, the connector support 990 is coupled to the support portion 914 of the waveguide support 910.

The first portion 991 of the connector support 990 has a surface 993 that is coupled to a surface 103 of the optical chip 100. The example connector support 990 includes a recessed channel 994 between the first portion 991 and the second portion 992. The recessed channel 994 provides clearance for the adhesive fillet(s) 942 to form, which may reduce the amount of adhesive 941 at the interface between the edge 102 of the optical chip 100 and the chip coupling surface 912 of the waveguide support 910. Reduction of the thickness of this adhesive layer may reduce optical misalignment due to CTE mismatch between the adhesive and the optical chip 100 and the waveguide support 910.

Figure 35A:
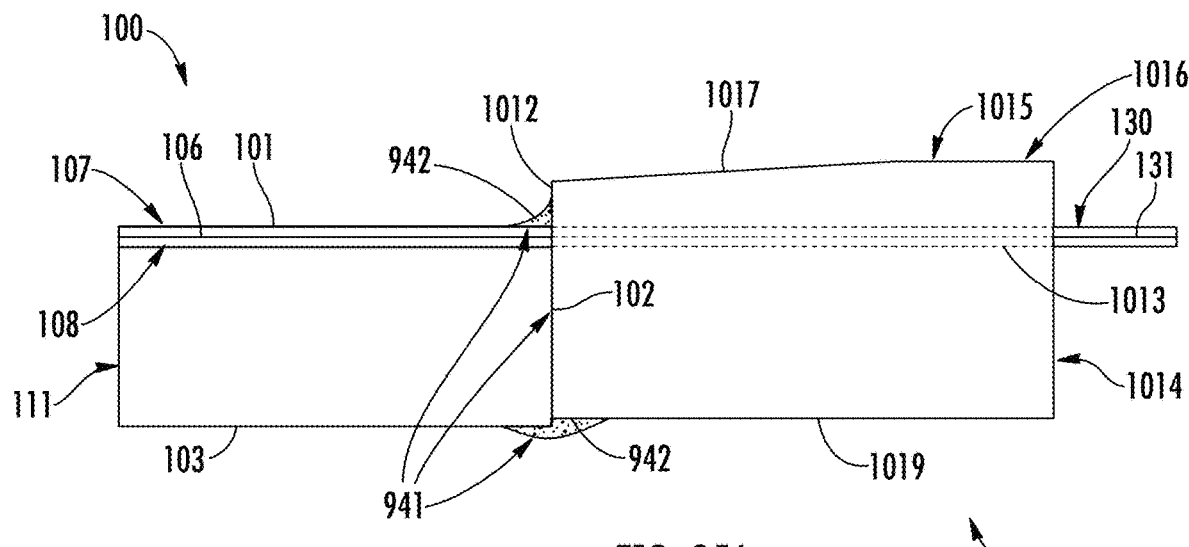
FIG. 35A schematically depicts a side elevation view of an example optical chip coupled to an example waveguide support having a cover portion with an angled surface according to one or more embodiments described and illustrated herein.

The connector support may also be coupled to the cover portion rather than the support portion of the waveguide support. FIG. 35A illustrates an example embodiment wherein a waveguide support 1010 includes a cover portion 1016 defining a first surface 1015 having an angled portion 1017. The angled portion 1017 may have an angle with respect to the z-axis similar to as described above regarding angled portion 917. The support portion 1014 defines a second surface 1019 that is opposite the first surface 105. The edge 102 of the optical chip 100 is coupled to the chip coupling surface 1012 of the waveguide support 1010 by an adhesive 941. As described above with respect to FIG. 34A, fillets 942 of adhesive 941 may form above and below the interface between the edge 102 of the optical chip 100 and the chip coupling surface of the waveguide support 1010.

Figure 35B:
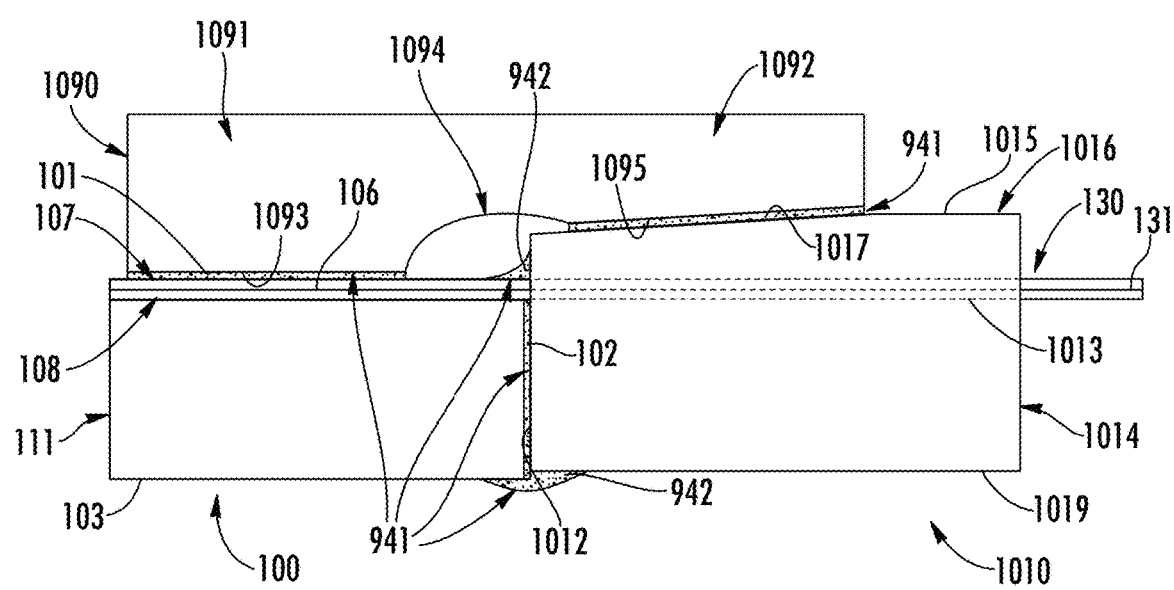
FIG. 35B schematically depicts a side elevation view of an example connector support coupled to the optical chip and the waveguide support depicted by FIG. 35A according to one or more embodiments described and illustrated herein.

Referring to FIG. 35B, the example connector support 1090 is coupled to surface 101 of the optical chip 100 and the first surface 1015 of the cover portion 1016 of the waveguide support 1010. The connector support 1090 includes a first portion 1091 and a second portion 1092. The second portion 1092 has an angled surface 1095 having an angle that corresponds to the angle of the angled portion 1017 of the waveguide support 1010. For example, the angled portion 1017 has an angle of negative x degrees with respect the z-axis, the angled surface 1095 has an angle of positive x degrees with respect to the z-axis. The angled surface 1095 and the angled portion 1017 of the waveguide support 1010 are coupled together by an adhesive 1041. Thus, in the illustrated embodiment, the connector support 1090 is coupled to the cover portion 1016 of the waveguide support 910.

The first portion 1091 of the connector support 1090 has a surface 1093 that is coupled to a surface 101 of the optical chip 100 (e.g., a surface of the overclad layer 107). The example connector support 1090 includes a recessed channel 1094 between the first portion 1091 and the second portion 1092. The channel 1094 provides clearance for the adhesive fillet(s) 942 to form, which may reduce the amount of adhesive 941 at the interface between the edge 102 of the optical chip 100 and the chip coupling surface 1012 of the waveguide support 1010. Reduction of the thickness of this adhesive layer may reduce optical misalignment due to CTE mismatch between the adhesive and the optical chip 100 and the waveguide support 910. As shown in FIG. 35B, the channel 1094 may be curved in shape, or rectangular as shown in FIG. 34B.

In some embodiments, a connector support is coupled to both surfaces of the optical chip 100 and the waveguide support 910 or 1010 such that two connector supports are utilized.

Figure 36A:
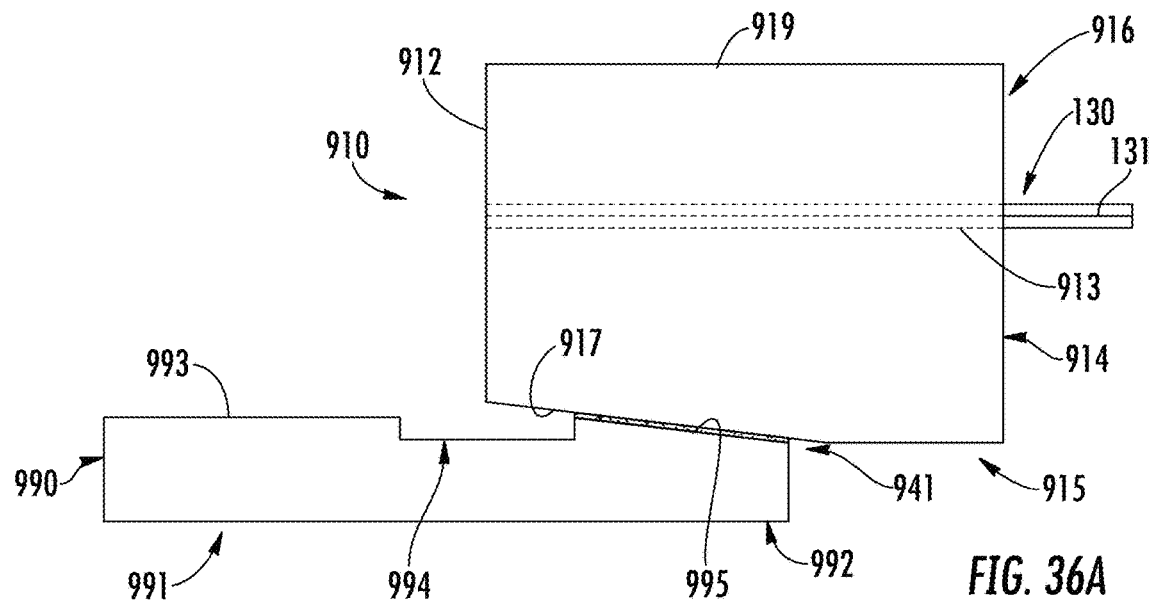
FIG. 36A schematically depicts a side elevation view of the example connector support coupled to the example waveguide support depicted by FIG. 34A prior to coupling an optical chip according to one or more embodiments described and illustrated herein.
Figure 36B:
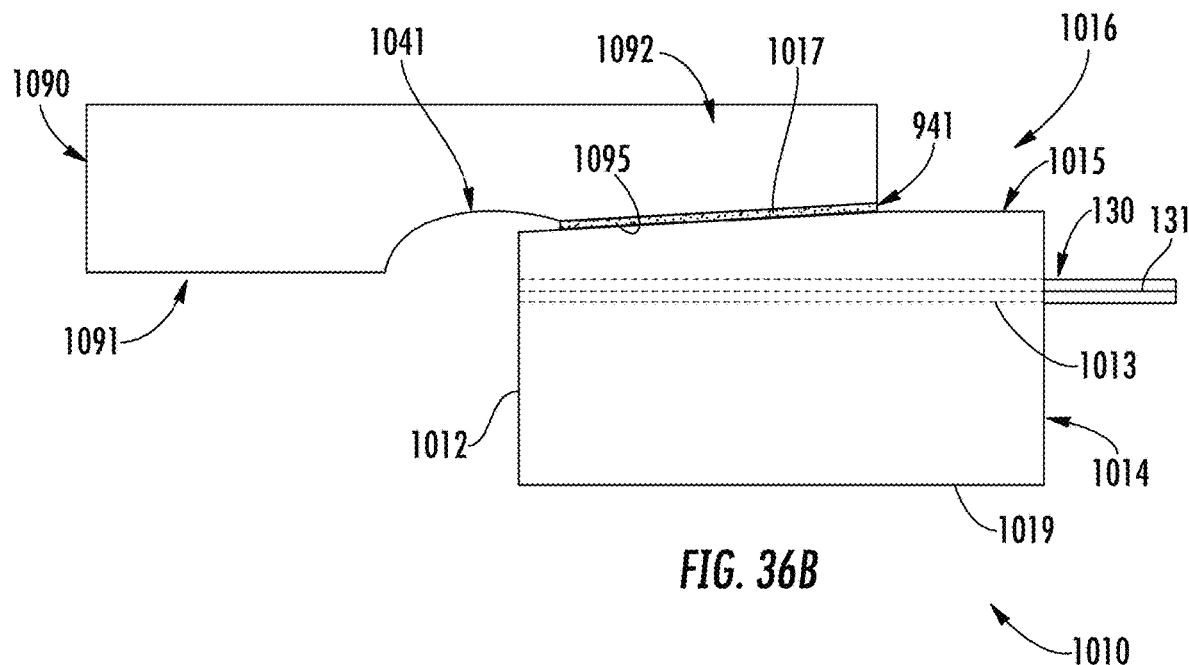
FIG. 36B schematically depicts a side elevation view of the example connector support coupled to the example waveguide support depicted by FIG. 35A prior to coupling an optical chip according to one or more embodiments described and illustrated herein.

The connector supports described herein may be coupled to the waveguide support before or after the optical chip is coupled to the waveguide support. FIG. 36A depicts an example wherein the connector support 990 shown in FIG. 34B is coupled to the angled portion 917 of the support portion 914 prior to attachment of the optical chip 100. FIG. 36B depicts an example wherein the connector support 1090 shown in FIG. 35B is coupled to the angled portion 1017 of the cover portion 1016 of the waveguide support 1010 prior to attachment of the optical chip 100.

Although FIGS. 35A, 35B, 36A, 36B illustrate optical fiber pigtails, it should be understood that the illustrated waveguide supports may be used with connector.

Figure 37:
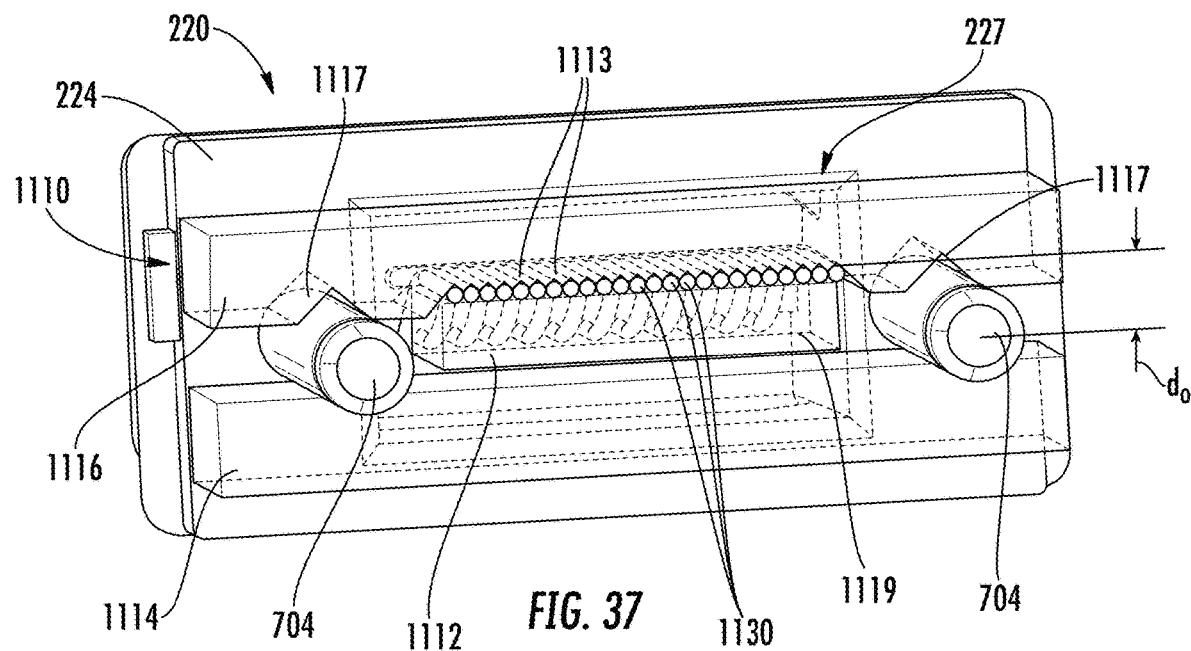
FIG. 37 schematically depicts a perspective view of an example ferrule and an example waveguide support according to one or more embodiments described and illustrated herein.
Figure 39A:
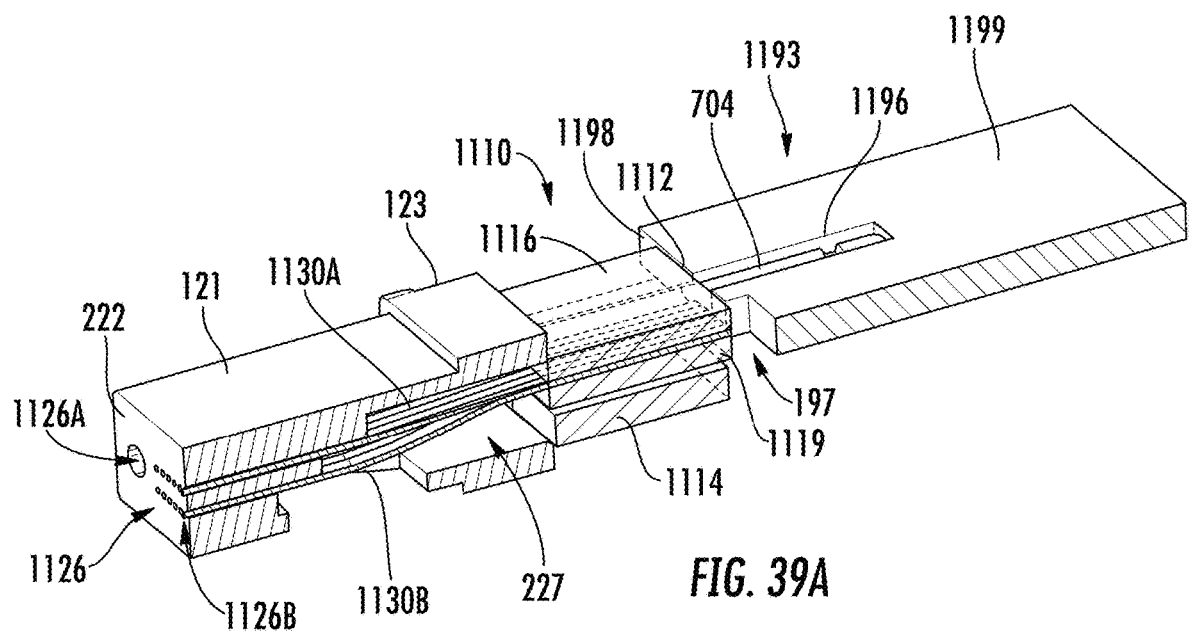
FIG. 39A schematically depicts a side perspective, cut-away view of an example ferrule, an example waveguide support, and an example chip carrier substrate according to one or more embodiments described and illustrated herein.
Figure 39B:
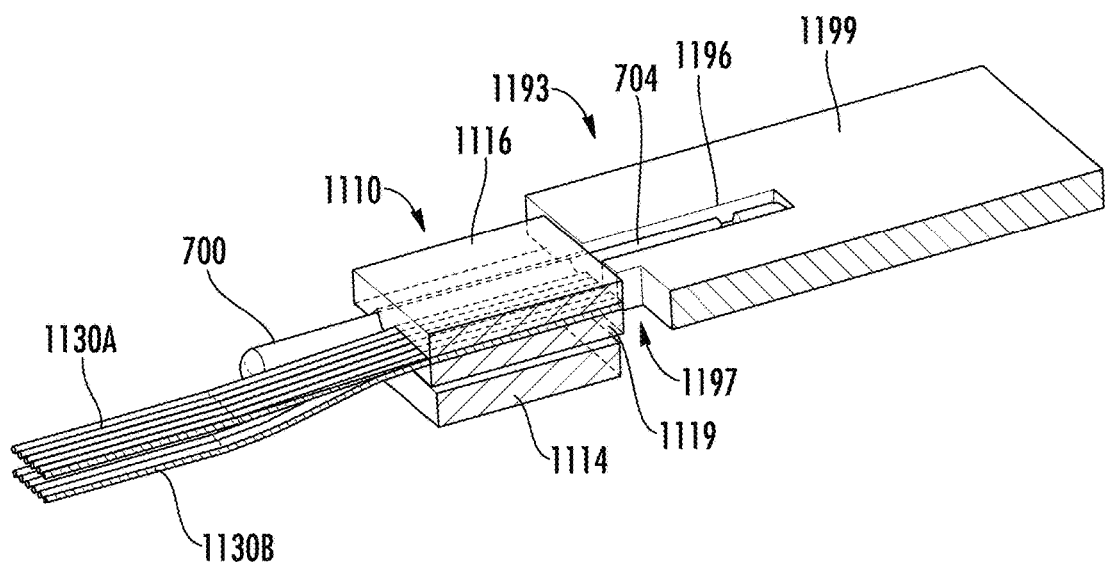
FIG. 39B schematically depicts a side perspective, cut-away view of a plurality of optical fibers, the waveguide support, the alignment pin and the chip carrier substrate depicted by FIG. 39A.
Figure 39C:
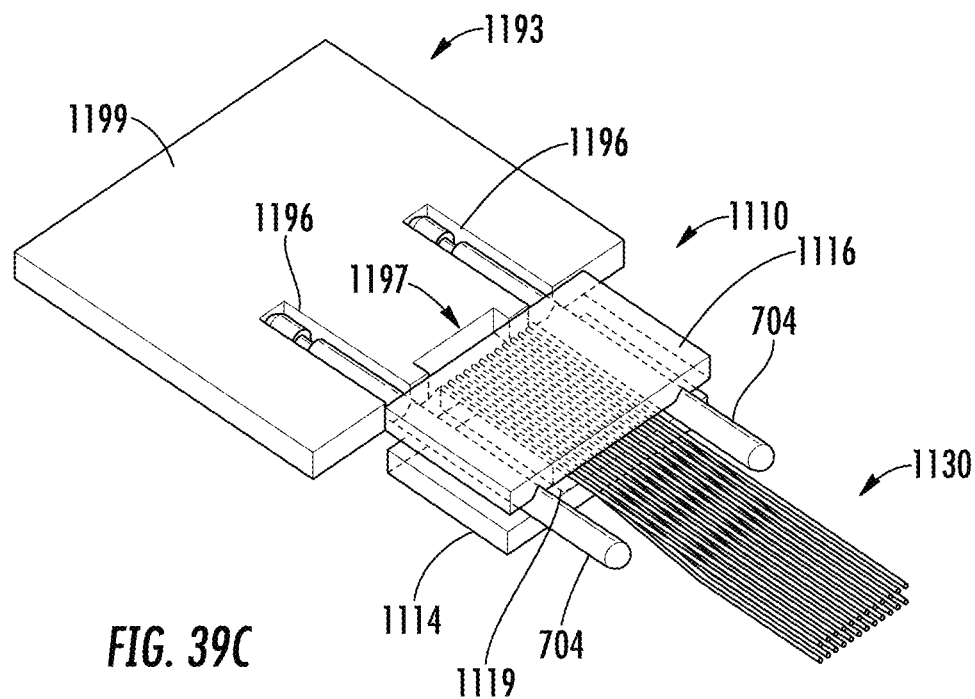
FIG. 39C schematically depicts a top perspective view of the plurality of optical fibers, the waveguide support, alignment pins and the chip carrier depicted by FIG. 39A.
Figure 39D:
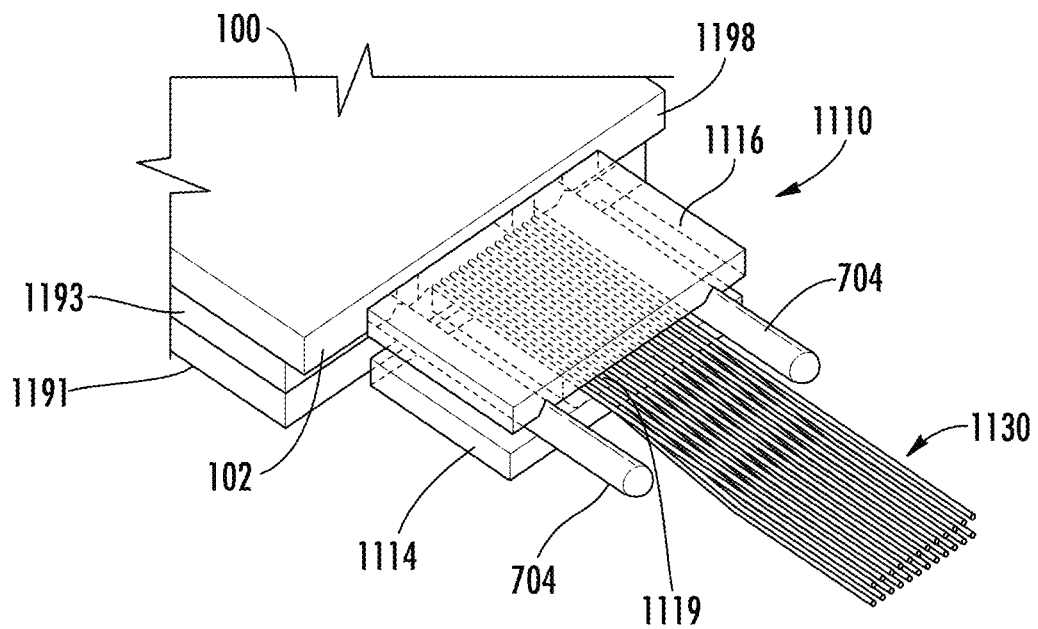
FIG. 39D schematically depicts a top perspective view of the plurality of optical fibers, the waveguide support, the alignment pins, the chip carrier substrate, a base substrate and an optical chip depicted by FIG. 39A.

In other embodiments, the waveguide support is attached to a second surface of the ferrule rather than disposed within an opening. FIG. 37 depicts an example embodiment wherein a waveguide support 1110 is coupled to a second surface 224 of the ferrule 220. The example waveguide support 1110 comprise a groove portion 1116 comprising at least one optical fiber groove 1113, and alignment pin grooves 1117. The alignment pin grooves 1117 may be V-grooves as shown in FIG. 37 or other configurations. At least one optical fiber 1130 is disposed within the at least one optical fiber groove 1113. In the illustrated embodiment, there are twenty-four optical fiber grooves 1113 to arrange twenty-four optical fibers 1130 in a single row. It should be understood that more or fewer optical fibers 1130 may be utilized. Referring briefly to FIG. 39A, the first surface 222 of the example ferrule 220 has two rows of twelve bores 1126. Thus, a first set of the optical fibers 1130A are in a first row of bores 1126A and a second set of the optical fibers 1130B are in a second row of bores 1126B. The first and second sets of optical fibers 1130A, 1130B transition to a single row within the opening 227 of the ferrule 220. First ends of the optical fibers 1130 are exposed at the first surface 222 of the ferrule 220, and second ends of the optical fibers 1130 are exposed at the chip coupling surface 1112 of the waveguide support 1110.

Referring once again to FIG. 37, the example waveguide support 1110 further comprises a fiber support portion 1119 coupled to the groove portion 1116 such that the optical fibers are disposed between the groove portion 1116 and the fiber support portion 1119 within the grooves 1113. The fiber support portion 1119 may be secured to the groove portion 1116 by an adhesive, such as an adhesive as described above. The fiber support portion 1119 is positioned between the alignment pin grooves 1117.

The example waveguide support 1110 further comprises an alignment pin support portion 1114 that is also secured to the second surface 224 of the ferrule 220. The alignment pin support portion 1114 is offset from the groove portion 1116 to provide clearance for alignment pins 704. The alignment pins 704 disposed within the alignment pin grooves 1117 and between the groove portion 1116 and the alignment pin support portion 1114.

The groove portion 1116, the fiber support portion 1119 and the alignment pin support portion 1114 may be made of a material having a CTE similar to the CTE of the optical chip 100, such as glass, for example.

Figure 38:
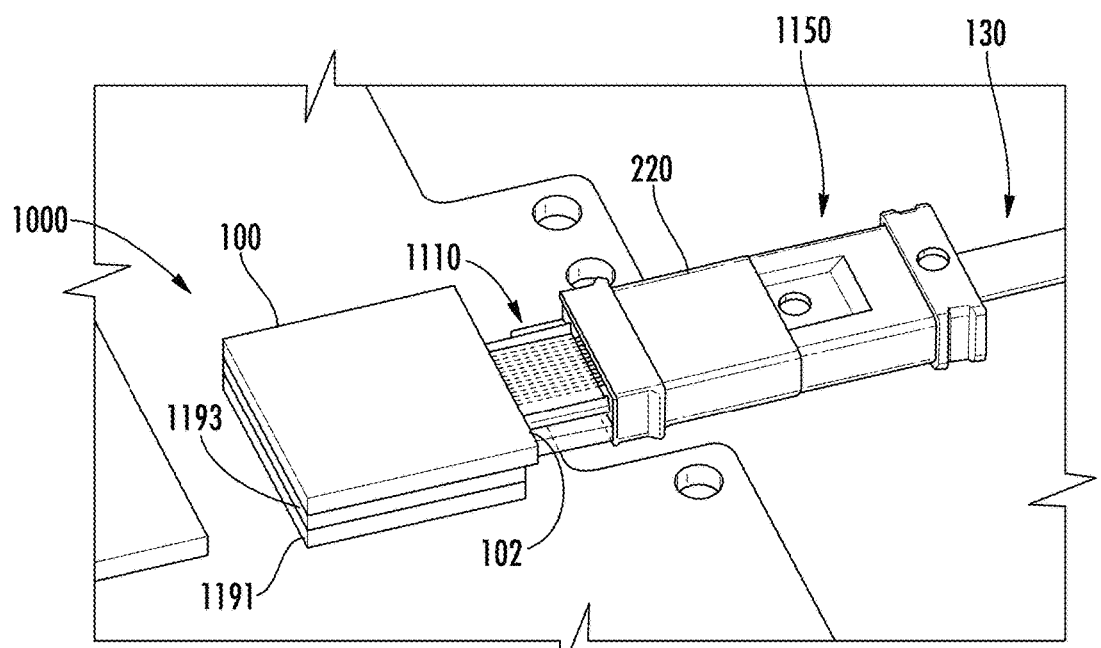
FIG. 38 schematically depicts a perspective view of an example optical chip coupled to a substrate, an example optical connector coupled to the optical chip, and a connector coupled to the optical connector according to one or more embodiments described and illustrated herein.

FIG. 38 schematically illustrates a connector 1150 comprising a ferrule 220 and a waveguide support 1110 as shown in FIG. 37 that is coupled to an integrated optical engine 1000 comprising a stacked optical chip 100, chip carrier substrate 1193 and a base substrate 1191. The integrated optical engine 1000 may only include only one of the chip carrier substrate 1193 and the base substrate 1191. The chip carrier substrate 1193 and/or the base substrate 1191 may physically support the optical chip 100 and, in some embodiments, include electronic components for operation of optical communication provided by the optical chip 100. The chip carrier substrate 1193 and the base substrate 1191 may be made of a material having a CTE similar to the CTE of the waveguide support 1110 and/or the optical chip 100 (e.g., glass).

In other embodiments, the integrated optical engine 1000 may be flipped from its orientation shown in FIG. 38. For example, the optical chip 100 may be on the bottom, with the chip carrier substrate 1193 and/or the base substrate 1191 on top.

Referring now to FIGS. 39A-39G, the chip coupling surface 1112 of the waveguide support 1110 is coupled to the edge 1198 of the chip carrier substrate 1193. The chip carrier substrate 1193 includes an alignment feature 1196 to receive each alignment pin 704. The alignment features 1196 are configured as notches within the chip carrier substrate 1193. The alignment features 1196 may also be configured as bores, particularly in embodiments that do not employ a base substrate 1191. In some embodiments, the alignment pins 704 may be secured within the alignment features 1196 by an adhesive. For example, in such embodiments, no adhesive may be present at the optical interface between the edge 102 of the optical chip 100 and the chip coupling surface 1112 of the waveguide support 1110.

As shown in FIGS. 39D-39G, the base substrate 1191 may be coupled to the chip carrier substrate 1193 such that the alignment pins 704 are disposed within the alignment features 1196 and between the base substrate 1191 and the optical chip 100.

Figure 39E:
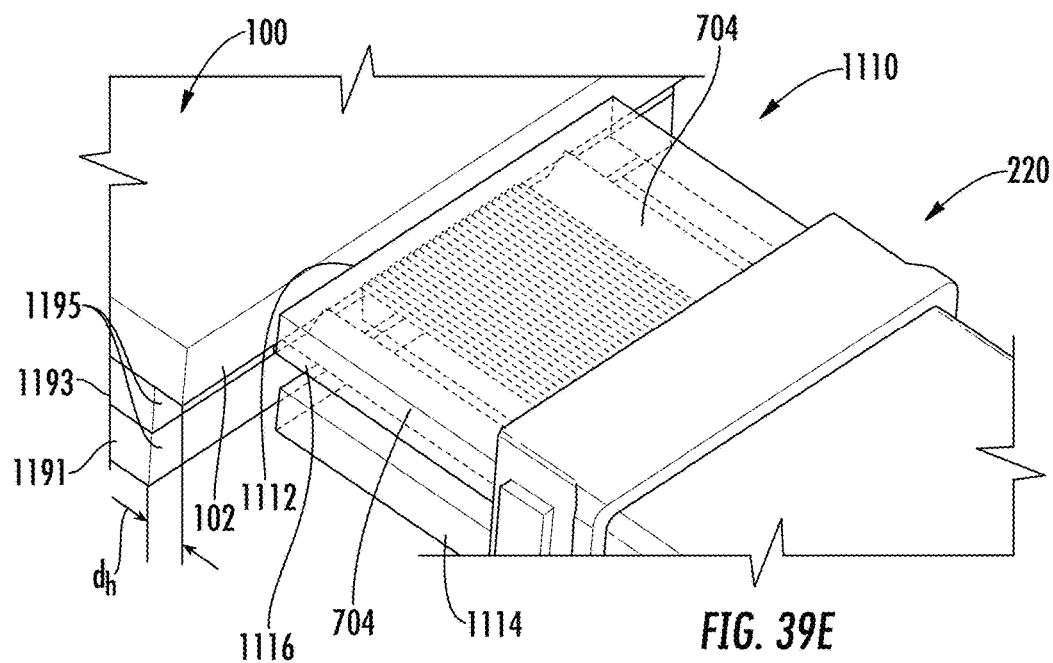
FIG. 39E schematically depicts a close-up view of the ferrule, the plurality of optical fibers, the waveguide support, the alignment pins, the chip carrier substrate, a base substrate and an optical chip depicted by FIG. 39A.
Figure 39F:
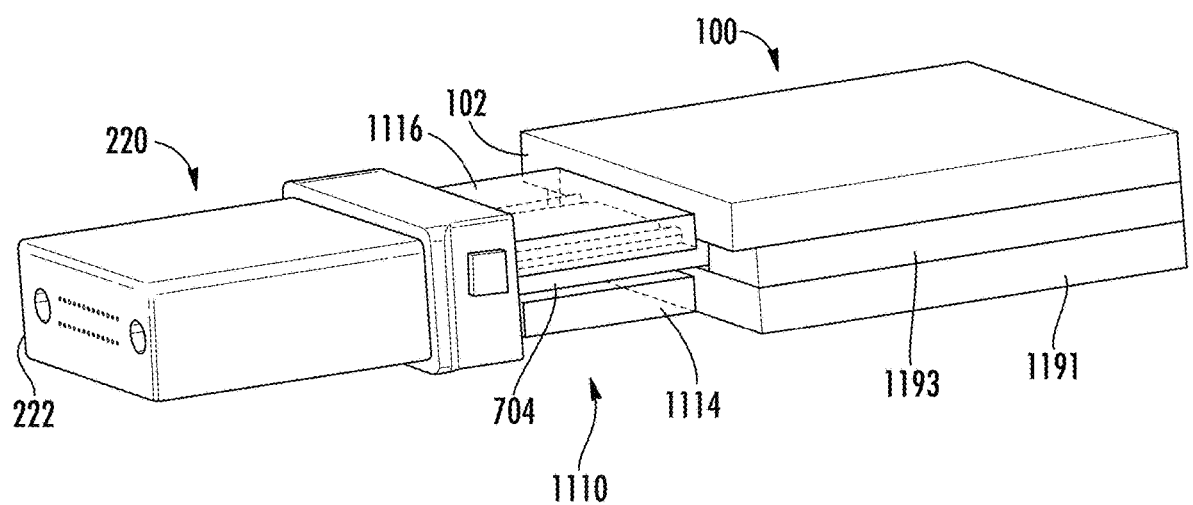
FIG. 39F schematically depicts a perspective view of the ferrule, the waveguide support the alignment pins, the optical chip, the chip carrier substrate, and the base substrate depicted by FIG. 39E.
Figure 39G:
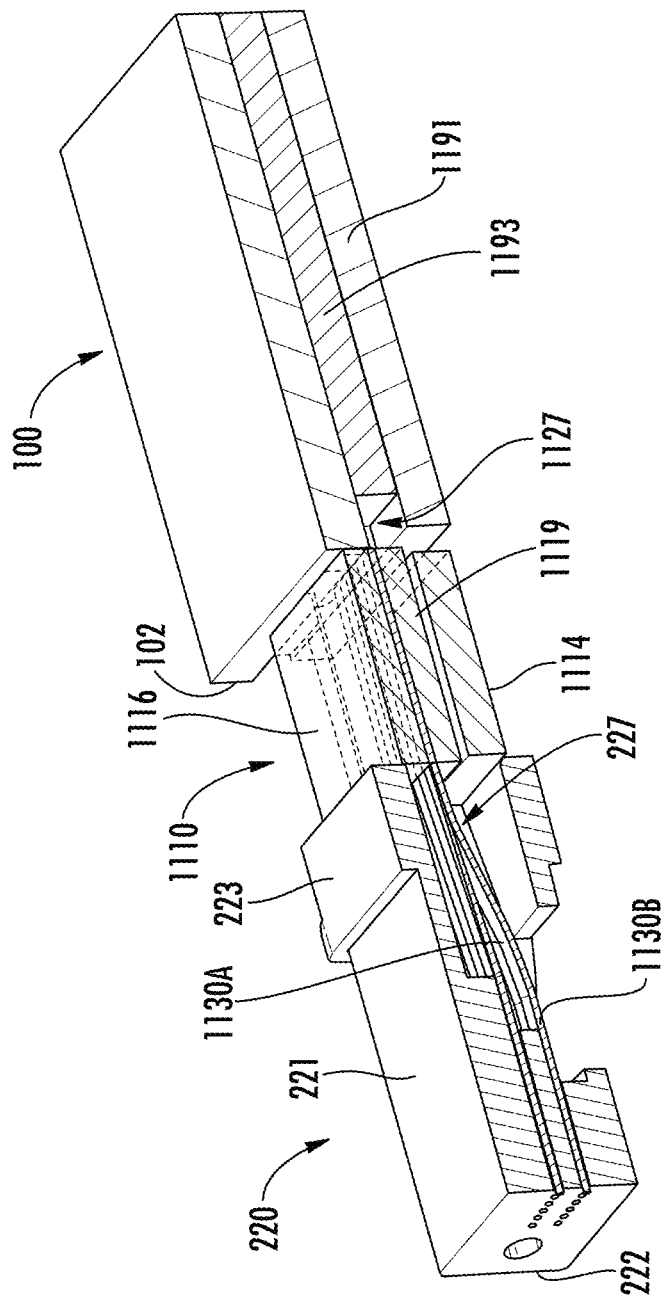
FIG. 39G schematically depicts another perspective view of the ferrule, the waveguide support the alignment pins, the optical chip, the chip carrier substrate, and the base substrate depicted by FIG. 39E.

An offset $d_o$ between a central axis of the optical fibers 1130 and a central axis of the alignment pins 704 enables the ends of the optical fibers 1130 to be positioned above a surface 1199 of the chip carrier substrate 1193 so that they may be aligned with the waveguides of the optical chip 100 when the optical chip 100 is coupled to the surface 1199 of the chip carrier substrate 1193. FIG. 39E illustrates how the chip coupling surface 1112 of the waveguide support 1110 contacts the edge 102 of the optical chip 100. In the illustrated embodiment, the optical chip 100 extends beyond an edge 1195 of both the chip carrier substrate 1193 and the base substrate 1191 by a distance $d_h$. This distance enables the waveguide support 1110 to only contact optical chip 100, thus removing potential misalignments due to increased mechanical engagement between the waveguide support 1110 and the chip carrier substrate 1193 and/or the base substrate 1191.

The edge 1198 of the chip carrier substrate 1193 may optionally include a notch 1197 between the alignment features 1196. The notch 1197 prevents the chip carrier substrate 1193 from interfering with the mating of the ends of the waveguides at the edge 102 of the optical chip 100 with the ends of the optical fibers 1130 at the chip coupling surface 1112 of the waveguide support 1110.

It will be apparent to those skilled in the art that various modifications and variations can be made without departing from the spirit or scope of the disclosure. Since modifications, combinations, sub-combinations and variations of the disclosed embodiments incorporating the spirit and substance of the disclosure may occur to persons skilled in the art, the disclosure should be construed to include everything within the scope of the appended claims and their equivalents.

The invention claimed is:

1. An optical assembly comprising:
    an optical chip comprising:
        a surface;
        an edge extending from the surface; and
        at least one chip waveguide proximate the surface and terminating at the edge;
    a waveguide support comprising a chip coupling surface;
    at least one waveguide disposed within the waveguide support and terminating at the chip coupling surface, wherein the chip coupling surface is coupled to the edge of the optical chip such that the at least one waveguide within the waveguide support is optically coupled to the at least one chip waveguide of the optical chip;
a connector support comprising:
a first portion coupled to the optical chip; and
a second portion coupled to the waveguide support; and
a ferrule comprising:
a first ferrule surface and a second ferrule surface; and
at least one bore extending from the first ferrule surface, wherein:
the waveguide support is coupled to the ferrule and extends from the second ferrule surface; and
the at least one waveguide is disposed within the at least one bore of the ferrule such that a first end of the at least one waveguide is exposed at the first ferrule surface of the ferrule and a second end of the at least one waveguide is exposed at the chip coupling surface of the waveguide support.

2. The optical assembly of claim 1, wherein:
the first portion of the connector support is coupled to the surface of the optical chip;
the second portion of the connector support comprises a first tab and a second tab;
the first tab and the second tab define a notch;
the first tab and the second tab are coupled to the edge of the optical chip such that the at least one chip waveguide is exposed within the notch; and
the chip coupling surface of the waveguide support is disposed within the notch such that the second portion of the connector support is coupled to a surface of the waveguide support, a first edge of the waveguide support, and a second edge of the waveguide support.

3. The optical assembly of claim 2, wherein the first portion is orthogonal to the second portion.

4. The optical assembly of claim 1, wherein the first portion comprises at least one cutout region.

5. The optical assembly of claim 1, wherein:
the edge of the optical chip comprises at least one chip bore; and
the second portion of the connector support comprises at least one connector bore aligned with the at least one chip bore.

6. The optical assembly of claim 1, wherein:
the waveguide support comprises a first surface and a second surface that is opposite the first surface;
a portion of the first surface of the waveguide support is angled at an angle out of a parallel plane with respect to the second surface of the waveguide support;
the first portion of the connector support is coupled to the surface of the optical chip; and
the second portion of the connector support is coupled to the first surface of the connector support.

7. The optical assembly of claim 6, wherein the second portion of the connector support is angled at the angle of the first surface of the connector support.

8. The optical assembly of claim 6, wherein the waveguide support comprises a support portion and a cover portion coupled to the support portion.

9. The optical assembly of claim 8, wherein:
the support portion comprises at least one groove disposed on a waveguide support surface opposite the first surface;
the at least one waveguide is disposed within the at least one groove; and
the cover portion is disposed on the waveguide support first surface of the waveguide support.

10. The optical assembly of claim 9, wherein:
the second surface of the waveguide support is defined by the support portion; and
the first surface of the waveguide support is defined by the cover portion.

11. The optical assembly of claim 9, wherein:
the first surface of the waveguide support is defined by the support portion; and
the second surface of the waveguide support is defined by the cover portion.

12. The optical assembly of claim 9, wherein the connector support comprises a channel between the first portion and the second portion.

13. The optical assembly of claim 1, wherein the connector support is coupled to the optical chip and the waveguide support by an adhesive.

14. The optical assembly of claim 1, wherein the edge of the optical chip is coupled to the chip coupling surface of the waveguide support by an adhesive.

15. The optical assembly of claim 1, wherein the connector support has a coefficient of thermal expansion with is within five percent of a coefficient of thermal expansion of a substrate material of the optical chip.

16. The optical assembly of claim 1, wherein the waveguide support comprises a glass material.

17. The optical assembly of claim 1, wherein:
the ferrule comprises a thermoset material or a thermoplastic material; and
the waveguide support comprises a glass material.

18. The optical assembly of claim 1, wherein:
the ferrule comprises an opening at the second ferrule surface;
a portion of the waveguide support is disposed within the opening of the ferrule; and
the waveguide support comprises:
a support portion; and
a cover portion coupled to the support portion, wherein at least one of the support portion and the cover portion comprises at least one groove, and the at least one waveguide is disposed within the at least one groove.

19. The optical assembly of claim 18, wherein a length of the cover portion of the waveguide support is greater than a length of the support portion of the waveguide support.

20. The optical assembly of claim 18, wherein the at least one waveguide comprises an optical fiber, and at least a portion of the optical fiber disposed within the at least one groove.

* * * * *

UNITED STATES PATENT AND TRADEMARK OFFICE
CERTIFICATE OF CORRECTION

PATENT NO. : 10,782,474 B2
APPLICATION NO. : 16/197845
DATED : September 22, 2020
INVENTOR(S) : Lars Martin Otfried Brusberg et al.

Page 1 of 1

It is certified that error appears in the above-identified patent and that said Letters Patent is hereby corrected as shown below:

In the Claims

In Column 32, Line 8, Claim 9, delete "first surface" and insert -- surface --, therefor.

Signed and Sealed this
Tenth Day of November, 2020

Andrei Iancu
*Director of the United States Patent and Trademark Office*